United States Patent
Duluk, Jr. et al.

(10) Patent No.: US 11,249,905 B2
(45) Date of Patent: Feb. 15, 2022

(54) TECHNIQUES FOR CONFIGURING A PROCESSOR TO FUNCTION AS MULTIPLE, SEPARATE PROCESSORS

(71) Applicant: NVIDIA CORPORATION, Santa Clara, CA (US)

(72) Inventors: Jerome F. Duluk, Jr., Palo Alto, CA (US); Gregory Scott Palmer, Cedar Park, TX (US); Jonathon Stuart Ramsey Evans, Santa Clara, CA (US); Shailendra Singh, Fremont, CA (US); Samuel H. Duncan, Arlington, MA (US); Wishwesh Anil Gandhi, Sunnyvale, CA (US); Lacky V. Shah, Los Altos, CA (US); Eric Rock, San Jose, CA (US); Feiqi Su, Cupertino, CA (US); James Leroy Deming, Madison, AL (US); Alan Menezes, San Jose, CA (US); Pranav Vaidya, San Jose, CA (US); Praveen Joginipally, San Jose, CA (US); Timothy John Purcell, Melbourne (AU); Manas Mandal, Palo Alto, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/562,361

(22) Filed: Sep. 5, 2019

(65) Prior Publication Data

US 2021/0073125 A1 Mar. 11, 2021

(51) Int. Cl.
*G06F 12/06* (2006.01)
*G06F 9/50* (2006.01)

(52) U.S. Cl.
CPC ........ *G06F 12/0646* (2013.01); *G06F 9/5016* (2013.01); *G06F 9/5077* (2013.01); *G06F 2212/1041* (2013.01)

(58) Field of Classification Search
CPC ......... G06F 12/0646; G06F 2212/1041; G06F 9/5016; G06F 9/5077
(Continued)

(56) References Cited

U.S. PATENT DOCUMENTS

| 7,272,671 | B2 | 9/2007 | Arndt et al. |
| 8,738,860 | B1 | 5/2014 | Griffin et al. |

(Continued)

OTHER PUBLICATIONS

Non-Final Office Action received for U.S. Appl. No. 16/562,359, dated Jun. 25, 2021, 24 pages.
(Continued)

*Primary Examiner* — David Yi
*Assistant Examiner* — Zubair Ahmed
(74) *Attorney, Agent, or Firm* — Artegis Law Group, LLP

(57) ABSTRACT

A parallel processing unit (PPU) can be divided into partitions. Each partition is configured to operate similarly to how the entire PPU operates. A given partition includes a subset of the computational and memory resources associated with the entire PPU. Software that executes on a CPU partitions the PPU for an admin user. A guest user is assigned to a partition and can perform processing tasks within that partition in isolation from any other guest users assigned to any other partitions. Because the PPU can be divided into isolated partitions, multiple CPU processes can efficiently utilize PPU resources.

20 Claims, 43 Drawing Sheets

(58) Field of Classification Search
USPC .......................................................... 711/173
See application file for complete search history.

(56) References Cited

U.S. PATENT DOCUMENTS

| | | | |
|---|---|---|---|
| 9,201,682 | B2 | 12/2015 | Cheng et al. |
| 10,482,562 | B2 | 11/2019 | Appu et al. |
| 2006/0075285 | A1* | 4/2006 | Madukkarumukumana ................ G06F 11/0793 714/5.11 |
| 2010/0162041 | A1 | 6/2010 | El-Shishiny et al. |
| 2013/0155073 | A1 | 6/2013 | Khodorkovsky et al. |
| 2015/0277763 | A1* | 10/2015 | Zhou ..................... G06F 3/0683 711/105 |
| 2015/0355996 | A1 | 12/2015 | Smith et al. |
| 2016/0224388 | A1* | 8/2016 | Guttahalli Krishna ..................... G06F 3/0664 |
| 2017/0046272 | A1* | 2/2017 | Farmahini-Farahani ..................... G06F 12/1441 |
| 2017/0132083 | A1* | 5/2017 | Aslot ..................... G06F 11/079 |
| 2019/0259435 | A1* | 8/2019 | Ware ........................ G11C 5/04 |
| 2019/0278355 | A1 | 9/2019 | Faasse |
| 2019/0384367 | A1 | 12/2019 | Jain et al. |

OTHER PUBLICATIONS

Langley, GPUs In the Task Manager, Jul. 21, 2017, DirectX Developer Blog (Year: 2017).
Non-Final Office Action received for U.S. Appl. No. 16/562,367, dated Nov. 9, 2021, 32 pages.

\* cited by examiner

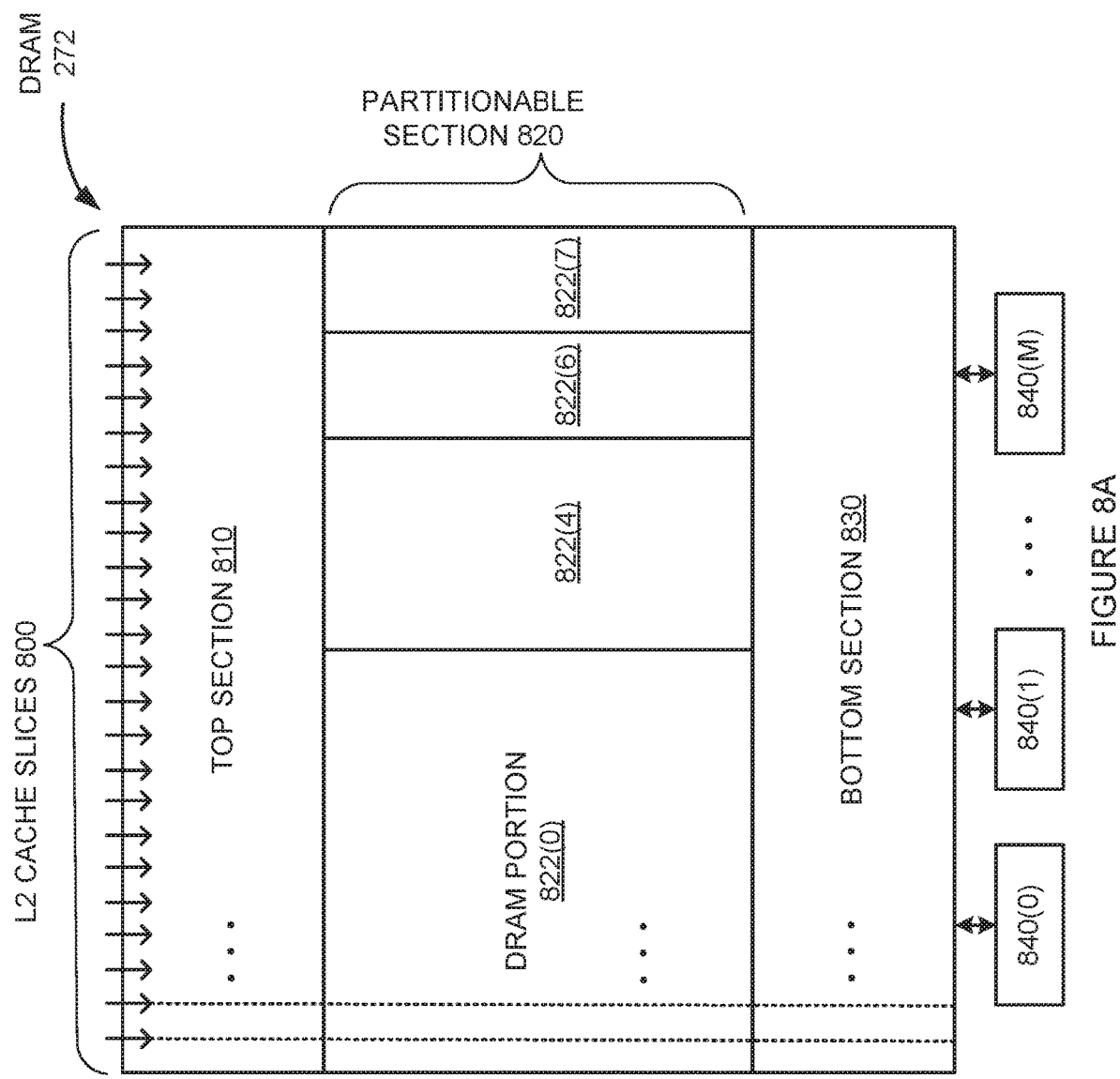

TECHNIQUES FOR CONFIGURING A PROCESSOR TO FUNCTION AS MULTIPLE, SEPARATE PROCESSORS

BACKGROUND

Field of the Various Embodiments

Various embodiments relate generally to parallel processing architectures, more specifically, to techniques for configuring a processor to function as multiple, separate processors.

Description of the Related Art

A conventional central processing unit (CPU) typically includes a relatively small number of processing cores that can execute a relatively small number of CPU processes. In contrast, a conventional graphics processing unit (GPU) typically includes hundreds of processing cores that can execute hundreds of threads in parallel with one another. Accordingly, conventional GPUs usually can perform certain processing tasks faster and more effectively than conventional CPUs given the greater amounts of processing resources that can deployed when using conventional GPUs.

In some implementations, a CPU process executing on a CPU can offload a given processing task to a GPU in order to have that processing task performed faster. In so doing, the CPU process generates a processing context on the GPU that specifies a target state for the various GPU resources that are to be implemented to perform the processing task. Those GPU resources may include processing, graphics, and memory resources, among others. The CPU process then launches a set of threads on the GPU in accordance with the processing context, and the set of threads utilizes the various GPU resources to perform the processing task. In many of these types of implementations, the GPU is configured according to only one processing context at a time. However, in some situations, the CPU needs to offload more than one CPU process to the GPU during the same interval of time. In such situations, the CPU can dynamically change the processing context implemented on the GPU at different points in time in order to service those CPU processes serially across the interval of time. One drawback of this approach, however, is that the processing tasks offloaded by certain CPU processes do not fully utilize the resources of the GPU. Consequently, when one or more processing tasks associated with those CPU processes are performed serially on the GPU, some GPU resources can go unused, which reduces the overall GPU performance and utilization.

One approach to executing multiple CPU processes simultaneously on a GPU is to generate multiple different processing subcontexts within a given "parent" processing context and to assign each different processing subcontext to a different CPU process. Multiple CPU processes can then launch different sets of threads on the GPU simultaneously, where each set of threads utilizes specific GPU resources that are configured according to a specific processing subcontext. With this approach, the GPU can be more efficiently utilized because more than one CPU process can offload processing tasks to the GPU at the same point in time, potentially avoiding situations where some GPU resources go unused.

One problem with the above approach is that CPU processes associated with different processing subcontexts can unfairly consume GPU resources that should be more evenly allocated or distributed across the different processing subcontexts. For example, a first CPU process could launch a first set of threads within a first processing subcontext that performs a large volume of read requests and consumes a large amount of available GPU memory bandwidth. A second CPU process could subsequently launch a second set of threads within a second processing subcontext that also performs a large volume of read requests. However, because much of the available GPU memory bandwidth is already being consumed by the first set of threads, the second set of threads could experience high latencies, which could cause the second CPU process to stall.

Another problem with the above approach is that, because processing subcontexts share a parent context, any faults occurring when the threads associated with one processing subcontext execute can interfere with the execution of other threads associated with another processing subcontext sharing the same parent context. For example, a first CPU process could launch a first set of threads associated with a first processing subcontext to perform a first processing task. A second CPU process could launch a second set of threads associated with a second processing subcontext, and the second set of threads could subsequently experience a fault and fail. To recover from the failure, the GPU would have to reset the parent context, which would automatically reset both the first processing subcontext and the second processing subcontext. In such a scenario, the execution of the first set of threads would be disrupted even though the fault arose from the second set of threads, not the first set of threads.

As the foregoing illustrates, what is needed in the art are more effective techniques for configuring a GPU to execute processing tasks associated with multiple contexts.

SUMMARY

Various embodiments include a computer-implemented method, including partitioning a set of hardware resources included in a processor to generate a first logical partition that includes a first subset of hardware resources, and generating a plurality of engines within the first logical partition, wherein each engine included in the plurality of engines is allocated a different portion of the first subset of hardware resources and executes in functional isolation from all other engines included in the plurality of engines.

One technological advantage of the disclosed techniques relative to the prior art is that, with the disclosed techniques, a parallel processing unit (PPU) (such as a GPU) can support multiple contexts simultaneously and in functional isolation from one another. Accordingly, multiple CPU processes can utilize PPU resources efficiently via simultaneously executing multiple different contexts, without the contexts interfering with one another.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 8A is a more detailed illustration of the DRAM of FIG. 7, according to various embodiments;

DETAILED DESCRIPTION

Figure 1:
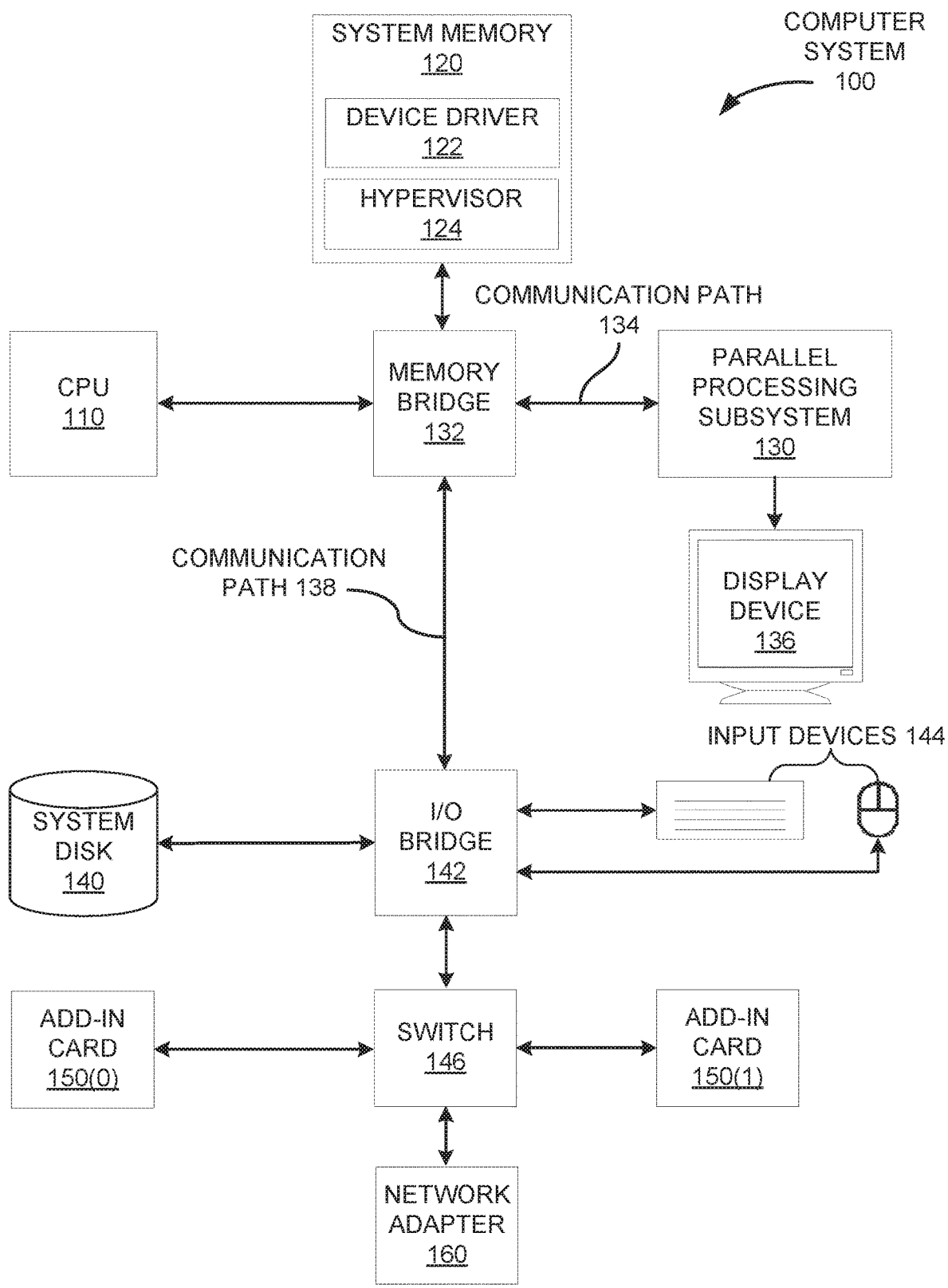
FIG. 1 is a block diagram of a computer system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, conventional GPUs usually can perform certain processing tasks faster than conventional CPUs. In some configurations, a CPU process executing on a CPU can offload a given processing task to a GPU in order to perform that processing task faster. In so doing, the CPU process generates a processing context on the GPU that specifies a target state for various GPU resources and then launches a set of threads on the GPU to perform the processing task.

In some situations, more than one CPU process may need to offload processing tasks to the GPU during the same interval of time. However, the GPU can only be configured according to one processing context at a time. In such situations, the CPU can dynamically change the processing context of the GPU at different points in time in order to service the multiple CPU processes serially across the interval of time. However, certain CPU processes may not fully utilize GPU resources when performing processing tasks, leaving various GPU resources idle at times. To address this issue, the CPU can generate multiple processing subcontexts within a "parent" processing context and assign these processing subcontexts to different CPU processes. Those CPU processes can then launch different sets of threads on the GPU at the same time, and each set of threads can utilize specific GPU resources configured according to a specific processing subcontext. This approach can be implemented to utilize GPU resources more efficiently. However, this approach suffers from several drawbacks.

First, CPU processes associated with different processing subcontexts can unfairly consume GPU resources that should be fairly shared across the different processing subcontexts, leading to situations where one CPU process can stall the progress of another CPU process. Second, because processing subcontexts share a parent processing context, any faults that occur during the execution of threads associated with one processing subcontext can disrupt the execution of threads associated with other processing subcontexts included in the same parent processing context. In some cases, a fault occurring within one processing subcontext can cause all other processing subcontexts within the same parent processing context to be reset and relaunched.

As a general matter, the above drawbacks associated with processing subcontexts limit the extent to which conventional GPUs can support multitenancy. As referred to herein, "multitenancy" refers to GPU configurations where multiple users or "tenants" perform processing operations using GPU resources simultaneously or during overlapping intervals of time. Typically, conventional GPUs provide support for multitenancy by allowing different tenants to execute different processing tasks using different processing subcontexts within a given parent processing context. However, processing subcontexts are not isolated computing environments because processing tasks executing within different processing subcontexts can interfere with one another for the various reasons discussed above. Consequently, any given tenant occupying a given GPU can negatively impact the quality of service the GPU affords to other tenants. These factors can reduce the appeal of cloud-based GPU deployments where multiple users may have access to the same GPU at the same time.

To address these issues, various embodiments include a parallel processing unit (PPU) that can be divided into partitions. Each partition is configured to execute processing tasks associated with multiple processing contexts simultaneously. A given partition includes one or more logical groupings or "slices" of GPU resources. Each slice provides sufficient compute, graphics and memory resources to mimic the operation of the PPU as a whole. A hypervisor executing on a CPU performs various techniques for partitioning the PPU on behalf of an admin user. A guest user is assigned to a partition and can then perform processing tasks within that partition in isolation from any other guest users assigned to any other partitions.

One technological advantage of the disclosed techniques relative to the prior art is that, with the disclosed techniques, a PPU can support multiple processing contexts simultaneously and in functional isolation from one another. Accordingly, multiple CPU processes can utilize PPU resources efficiently via multiple different processing contexts and without interfering with one another. Another technological advantage of the disclosed techniques is that, because the PPU can be partitioned into isolated computing environments using the disclosed techniques, the PPU can support a more robust form of multitenancy relative to prior art approaches that rely on processing subcontexts to provide multitenancy functionality. Accordingly, a PPU, when implementing the disclosed techniques, becomes more suitable for cloud-based deployments where different and potentially competing entities can be provided access to different partitions within the same PPU. These technological advantages represent one or more technological advancements over prior art approaches.

System Overview

FIG. 1 is a block diagram of a computer system configured to implement one or more aspects of the present invention. As shown, computer system 100 includes a central processing unit (CPU) 110, a system memory 120, and a parallel processing subsystem 130, coupled together via a memory bridge 132. Parallel processing subsystem 130 is coupled to memory bridge 132 via a communication path 134. One or more display devices 136 can be coupled to parallel processing subsystem 130. Computer system 100 further includes a system disk 140, one or more add-in cards 150, and a network adapter 160. System disk 140 is coupled to an I/O bridge 142. I/O bridge 142 is coupled to memory bridge 132 via communication path 144 and is also coupled to input devices 146. Add-in card(s) 150 and network adapter 160 are coupled together via a switch 148 that, in turn, is coupled to I/O bridge 142.

Memory bridge 132 is a hardware unit that facilitates communications between CPU 110, system memory 120, and parallel processing subsystem 130, among other components of computer system 100. For example, memory bridge 132 could be a Northbridge chip. Communication path 134 is a high speed and/or high bandwidth data connection that facilitates low-latency communications between parallel processing subsystem 130 and memory bridge 132 across one or more separate lanes. For example, communication path 134 could be a peripheral component interconnect express (PCIe) link, an Accelerated Graphics Port (AGP), a HyperTransport, or any other technically feasible type of communication bus.

I/O bridge 142 is a hardware unit that facilitates input and/or output operations performed with system disk 140, input devices 146, add-in card(s) 150, network adapter 160, and various other components of computer system 100. For example, I/O bridge 143 could be a Southbridge chip. Communication path 144 is a high speed and/or high bandwidth data connection that facilitates low-latency communications between memory bridge 132 and I/O bridge 142. For example, communication path 142 could be a PCIe link, an AGP, a HyperTransport, or any other technically feasible type of communication bus. With the configuration shown, any component coupled to either memory bridge 132 or I/O bridge 142 can communicate with any other component coupled to either memory bridge 132 or I/O bridge 142.

CPU 110 is a processor that is configured to coordinate the overall operation of computer system 100. In so doing, CPU 110 executes instructions in order to issue commands to the various other components included in computer system 100. CPU 110 is also configured to execute instructions in order to process data that is generated by and/or stored by any of the other components included in computer system 100, including system memory 120 and system disk 140. System memory 120 and system disk 140 are storage devices that include computer-readable media configured to store data and software applications. System memory 120 includes a device driver 122 and a hypervisor 124, the operation of which is described in greater detail below. Parallel processing subsystem 130 includes one or more parallel processing units (PPUs) that are configured to execute multiple operations simultaneously via a highly parallel processing architecture. Each PPU includes one or more compute engines that perform general-purpose compute operations in a parallel manner and/or one or more graphics engines that perform graphics-oriented operations in a parallel manner. A given PPU can be configured to generate pixels for display via display device 136. An exemplary PPU is described in greater detail below in conjunction with FIGS. 2-4.

Device driver 122 is a software application that, when executed by CPU 110, operates as an interface between CPU 110 and parallel processing subsystem 130. In particular, device driver 122 allows CPU 110 to offload various processing operations to parallel processing subsystem 130 for highly parallel execution, including general-purpose compute operations as well as graphics processing operations. Hypervisor 124 is a software application that, when executed by CPU 110, partitions various compute, graphics, and memory resources included in parallel processing subsystem 130 in order to provide separate users with independent usage of those resources, as described in greater detail below in conjunction with FIGS. 5-10.

In various embodiments, some or all components of computer system 100 may be implemented in a cloud-based environment that is potentially distributed across a wide geographical area. For example, various components of computer system 100 could be deployed across geographically disparate data centers. In such embodiments, the various components of computer system 100 may communicate with one another across one or more networks, including any number of local intranets and/or the Internet. In various other embodiments, certain components of computer system 100 may be implemented via one or more virtualized devices. For example, CPU 110 could be implemented as a virtualized instance of a hardware CPU. In some embodiments, some or all of parallel processing subsystem 130 may be integrated with one or more other components of computer system 100 in order to form a single chip, such as a system-on-chip (SoC).

Persons skilled in the art will understand that the architecture of computer system 100 is sufficiently flexible to be implemented across a wide range of potential scenarios and use-cases. For example, computer system 100 could be implemented in a cloud-computing center to expose general-purpose compute capabilities and/or general-purpose graphics processing capabilities to one or more users. Alternatively, computer system 100 could be deployed in an automotive implementation in order to perform data processing operations associated with vehicle navigation. Persons skilled in the art will further understand that the various components of computer system 100 and the connection topology between those components can be modified in any technically feasible manner without departing from the overall scope and spirit of the present embodiments.

Figure 2:
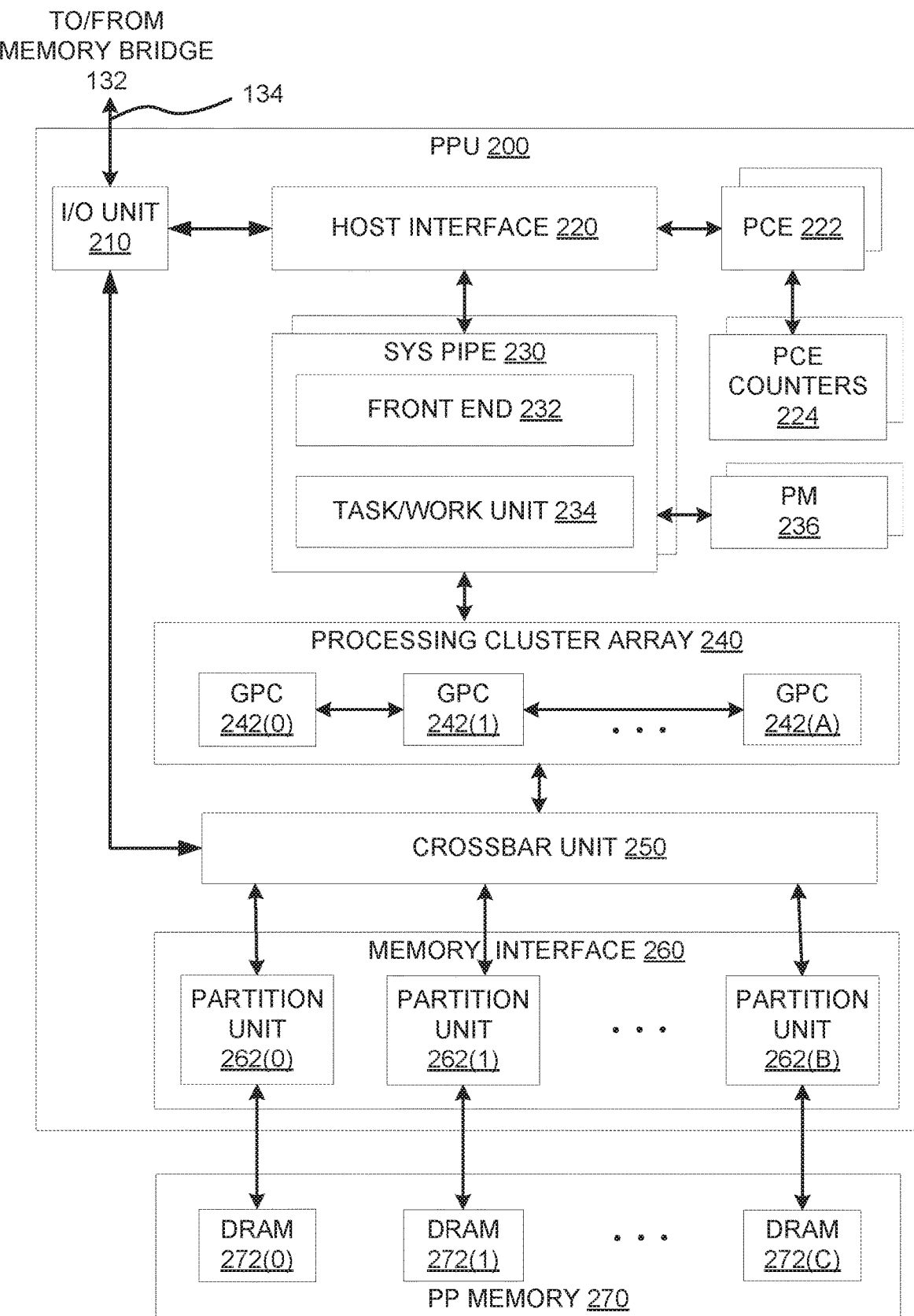
FIG. 2 is a block diagram of a parallel processing unit (PPU) included in the parallel processing subsystem of FIG. 1, according to various embodiments.

FIG. 2 is a block diagram of a PPU included in the parallel processing subsystem of FIG. 1, according to various embodiments. As shown, a PPU 200 includes an I/O unit 210, a host interface 220, sys pipes 230, a processing cluster array 240, a crossbar unit 250, and a memory interface 260. PPU 200 is coupled to a PPU memory 270. Each of the components shown can be implemented via any technically feasible type of hardware and/or any technically feasible combination of hardware and software.

I/O unit 210 is coupled via communication path 134 and memory bridge 132 to CPU 110 of FIG. 1. I/O unit 210 is also coupled to host interface 220 and to crossbar unit 250. Host interface 220 is coupled to one or more physical copy engines (PCEs) 222 that are in turn coupled to one or more PCE counters 224. Host interface 220 is also coupled to sys pipes 230. A given sys pipe 230 includes a front end 232, a task/work unit 234, and a performance monitor (PM) 236 and is coupled to processing cluster array 240. Processing cluster array 240 includes general processing clusters (GPCs) 242(0) through 242(A), where A is a positive integer. Processing cluster array 240 is coupled to crossbar unit 250. Crossbar unit 250 is coupled to memory interface 260. Memory interface 260 includes partition units 262(0) through 262(B), where B is a positive integer value. Each partition unit 262 can be separately connected to crossbar unit 250. PPU memory 270 includes dynamic random access memory (DRAMs) 272(0) through 272(C), where C is a positive integer value. To facilitate operating simultaneously on multiple processing contexts, various units within the PPU 200 are replicated as follows: (a) host interface 220 includes the PBDMAs 520(0) through 520(7); (b) sys pipe 230 including sys pipe 230(0) through 230(7), such that task/work unit 234 corresponds to SKED 500(0) through SKED 500(7); and task/work unit 234 corresponds to CWD 560(0) through 560(7).

In operation, I/O unit 210 obtains various types of command data from CPU 110 and distributes this command data to relevant components of PPU 200 for execution. In particular, I/O unit 210 obtains command data associated with processing tasks from CPU 110 and routes this command data to host interface 220. I/O unit 210 also obtains command data associated with memory access operations from CPU 110 and routes this command data to crossbar unit 250. Command data related to processing tasks generally includes one or more pointers to task metadata (TMD) that is stored in a command queue within PPU memory 270 or elsewhere within computer system 100. A given TMD is an encoded processing task that describes indices of data to be processed, operations to be executed on that data, state parameters associated with those operations, an execution priority, and other processing task-oriented information.

Host interface 220 receives command data related to processing tasks from I/O unit 210 then distributes this command data to sys pipes 230 via one or more command streams. In some configurations, host interface 210 generates a different command stream for each different sys pipe 230, where a given command stream includes pointers to TMDs relevant to a corresponding sys pipe 230.

A given sys pipe 230 performs various pre-processing operations with received command data to facilitate the execution of corresponding processing tasks on GPCs 242 within processing cluster array 240. Upon receipt of command data associated with one or more processing tasks, front end 232 within the given sys pipe 230 obtains the associated processing tasks and relays those processing tasks to task/work unit 234. Task/work unit 234 configures one or more GPCs 242 to an operational state appropriate for the execution of the processing tasks and then transmits the processing tasks to those GPCs 242 for execution. Each sys pipe 230 can offload copy tasks to one or more PCEs 222 that perform dedicated copy operations. PCE counters 224 track the usage of PCEs 222 in order to balance copy operation workloads between different sys pipes 230. PM 236 monitors the overall performance and/or resource consumption of the corresponding sys pipe 230 and can throttle various operations performed by that sys pipe 230 in order to maintain balanced resource consumption across all sys pipes 230.

Each GPC 242 includes multiple parallel processing cores capable of executing a large number of threads concurrently and with any degree of independence and/or isolation from other GPCs 242. For example, a given GPC 242 could execute hundreds or thousands of concurrent threads in conjunction with, or in isolation from, any other GPC 242. A set of concurrent threads executing on a GPC 242 may execute separate instances of the same program or separate instances of different programs. In some configurations, GPCs 242 are shared across all sys pipes 230, while in other configurations, different sets of GPCs 242 are assigned to operate in conjunction with specific sys pipes 230. Each GPC 242 receives processing tasks from one or more sys pipes 230 and, in response, launches one or more sets of threads in order execute those processing tasks and generate output data. Upon completion of a given processing task, a given GPC 242 transmits the output data to another GPC 242 for further processing or to crossbar unit 250 for appropriate routing. An exemplary GPC is described in greater detail below in conjunction with FIG. 3.

Crossbar unit 250 is a switching mechanism that routes various types of data between I/O unit 210, processing cluster array 240, and memory interface 260. As mentioned above, I/O unit 210 transmits command data related to memory access operations to crossbar unit 250. In response, crossbar unit 250 submits the associated memory access operations to memory interface 260 for processing. In some cases, crossbar unit 250 also routes read data returned from memory interface 260 back to the component requesting the read data. Crossbar unit 250 also receives output data from GPCs 242, as mentioned above, and can then route this output data to I/O unit 210 for transmission to CPU 110 or route this data to memory interface 260 for storage and/or processing. Crossbar unit 250 is generally configured to route data between GPCs 242 and from any GPC 242 to any partition unit 262. In various embodiments, crossbar unit 250 may implement virtual channels to separate traffic streams between the GPCs 242 and partition units 262. In various embodiments, crossbar unit 250 may allow non-shared paths between a set of GPCs 242 and set of partition units 262.

Memory interface 260 implements partition units 262 to provide high-bandwidth memory access to DRAMS 272 within PPU memory 270. Each partition unit 262 can perform memory access operations with a different DRAM 272 in parallel with one another, thereby efficiently utilizing the available memory bandwidth of PPU memory 270. A given partition unit 262 also provides caching support via one or more internal caches. An exemplary partition unit 262 is described in greater detail below in conjunction with FIG. 4.

PPU memory 270 in general, and DRAMs 272 in particular, can be configured to store any technically feasible type of data associated with general-purpose compute applications and/or graphics processing applications. For example, DRAMs 272 could store large matrices of data values associated with neural networks in general-purpose compute applications or, alternatively, store one or more frame buffers that include various render targets in graphics processing applications. In various embodiments, DRAMs 272 may be implemented via any technically feasible storage device.

The architecture set forth above allows PPU 200 to perform a wide variety of processing operations in an expedited manner and asynchronously relative to the operation of CPU 110. In particular, the parallel architecture of PPU 200 allows a vast number of operations to be performed in parallel and with any degree of independence from one another and from operations performed on CPU 110, thereby accelerating the overall performance of those operations.

In one embodiment, PPU 200 may be configured to perform general-purpose compute operations in order to expedite calculations involving large data sets. Such data sets may pertain to financial time series, dynamic simulation data, real-time sensor readings, neural network weight matrices and/or tensors, and machine learning parameters, among others. In another embodiment, PPU 200 may be configured to operate as a graphics processing unit (GPU) that implements one or more graphics rendering pipelines to generate pixel data based on graphics commands generated by CPU 110. PPU 200 may then output the pixel data via display device 136 as one or more frames. PPU memory 170 may be configured to operate as a graphics memory that stores one or more frame buffers and/or one or more render targets, in like fashion as mentioned above. In yet another embodiment, PPU 200 may be configured to perform both general-purpose compute operations and graphics processing operations simultaneously. In such configurations, one or more sys pipes 230 can be configured to implement general-purpose compute operations via one or more GPCs 242 and one or more other sys pipes 230 can be configured to implement one or more graphics processing pipelines via one or more GPCs 242.

With any of the above configurations, device driver 122 and hypervisor 124 interoperate in order to subdivide various compute, graphics, and memory resources included in PPU 200 into separate "PPU partitions." Alternatively, there can be a plurality of device drivers 122, each associated with a "PPU partition". Preferably, device drivers execute on a set of cores in the CPU 110. A given PPU partition operates in a substantially similar manner to PPU 200 as a whole. In particular, each PPU partition may be configured to perform general-purpose compute operations, graphics processing operations, or both types of operations in relative isolation from other PPU partitions. In addition, a given PPU partition may be configured to implement multiple processing contexts simultaneously when simultaneously executing one or more virtual machines (VMs) on the compute, graphics, and memory resources allocated to the given PPU partition. Logical groupings of PPU resources into PPU partitions are described in greater detail below in conjunction with FIGS. 5-8. Techniques for partitioning and configuring PPU resources are described in greater detail below in conjunction with FIGS. 9-10.

Figure 3:
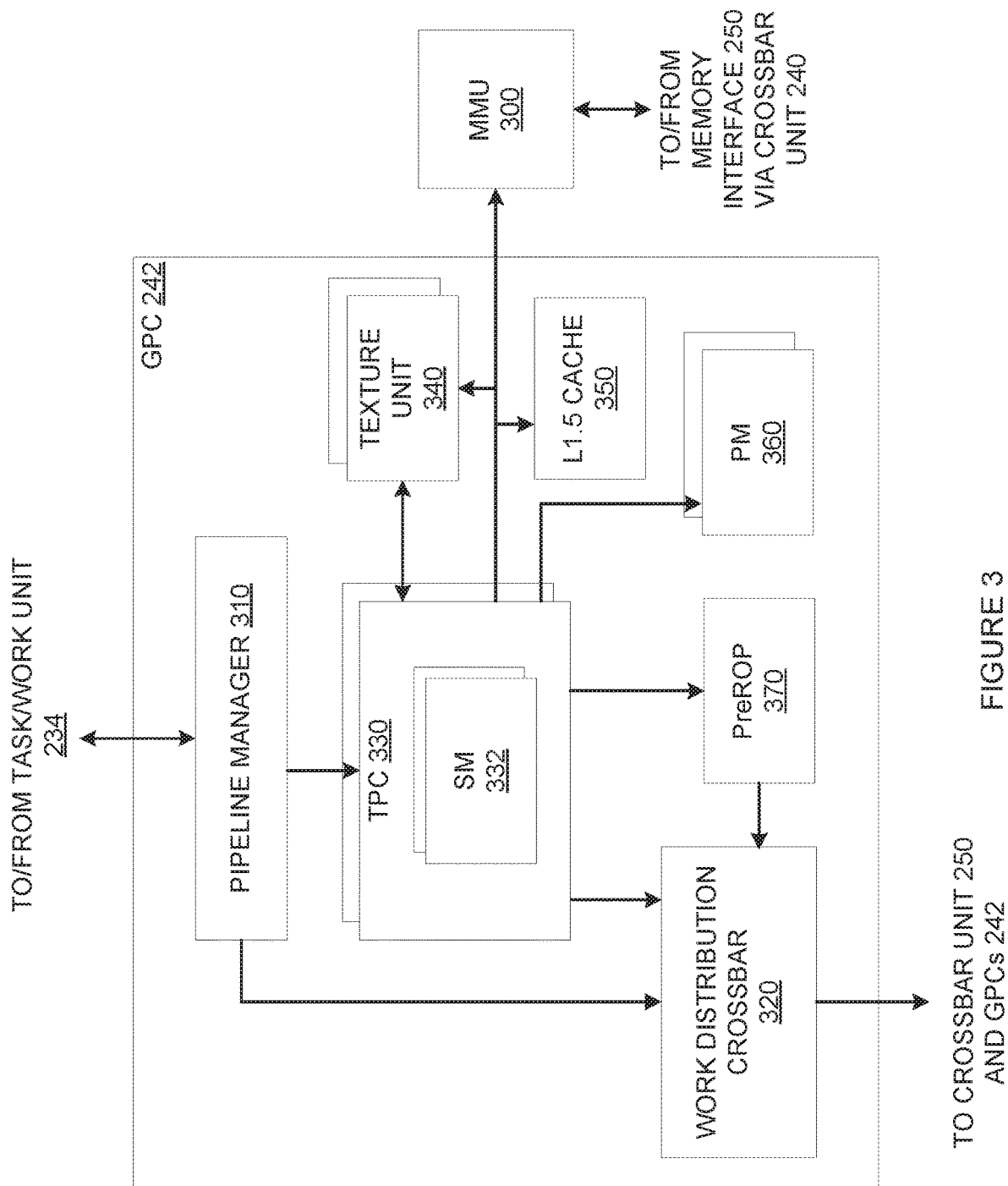
FIG. 3 is a block diagram of a general processing cluster included in the parallel processing unit of FIG. 2, according to various embodiments.

FIG. 3 is a block diagram of a GPC included in the PPU of FIG. 2, according to various embodiments of the present invention. As shown, GPC 242 is coupled to a memory management unit (MMU) 300 and includes a pipeline manager 310, a work distribution crossbar 320, one or more texture processing clusters (TPCs) 330, one or more texture units 340, a level 1.5 (L1.5) cache 350, a PM 360, and a pre-raster operations processor (preROP) 370. Pipeline manager 310 is coupled to work distribution crossbar 320 and TPCs 330. Each TPC 330 includes one or more streaming multiprocessors (SMs) 332 and is coupled to texture unit 340, MMU 300, L1.5 cache 350, PM 360, and preROP 370. Texture unit 340 and L1.5 cache 350 are also coupled to MMU 300 and to one another. PreROP 370 is coupled to work distribution crossbar 320. Each of the components shown can be implemented via any technically feasible type of hardware and/or any technically feasible combination of hardware and software.

GPC 242 is configured with a highly parallel architecture that supports the execution a large number of threads in parallel. As referred to herein, a "thread" is an instance of a particular program executing on a particular set of input data to perform various types of operations, including general-purpose compute operations and graphics processing operations. In one embodiment, GPC 242 may implement single-instruction multiple-data (SIMD) techniques to support parallel execution of a large number of threads without necessarily relying on multiple independent instruction units.

In another embodiment, GPC 242 may implement single-instruction multiple-thread (SIMT) techniques to support parallel execution of a large number of generally synchronized threads via a common instruction unit that issues instructions to one or more processing engines. Persons skilled in the art will understand that SIMT execution allows different threads to more readily follow divergent execution paths through a given program, unlike SIMD execution where all threads generally follow non-divergent execution paths through a given program. Persons skilled in the art will recognize that SIMD techniques represent a functional subset of SIMT techniques.

GPC 242 can execute large numbers of parallel threads via SMs 332 included in TPCs 330. Each SM 332 includes a set of functional units (not shown), including one or more execution units and/or one or more load-store units, configured to execute instructions associated with received processing tasks. A given functional unit can execute instructions in a pipelined manner, meaning that an instruction can be issued to the functional unit before the execution of a previous instruction has completed. In various embodiments, the functional units within SMs 332 can be configured to perform a variety of different operations including integer and floating point arithmetic (e.g., addition and multiplication, among others), comparison operations, Boolean operations (e.g. AND, OR, and XOR, among others), bit shifting, and computation of various algebraic functions (e.g., planar interpolation and trigonometric, exponential, and logarithmic functions, among others). Each functional unit can store intermediate data within a level-1 (L1) cache that resides in SM 332.

Via the functional units described above, SM 332 is configured to process one or more "thread groups" (also referred to as "warps") that concurrently execute the same program on different input data. Each thread within a thread group generally executes via a different functional unit, although not all functional units execute threads in some situations. For example, if the number of threads included in the thread group is less than the number of functional units, then the unused functional units could remain idle during processing of the thread group. In other situations, multiple threads within a thread group execute via the same functional unit at different times. For example, if the number of threads included in the thread group is greater than the number of functional units, then one or more functional units could execute different threads over consecutive clock cycles.

In one embodiment, a set of related thread groups may be concurrently active in different phases of execution within SM 332. A set of related thread groups is referred to herein as a "cooperative thread array" (CTA) or a "thread array." Threads within the same CTA or threads within different CTAs can generally share intermediate data and/or output data with one another via one or more L1 caches included those SMs 332, L1.5 cache 350, one or more L2 caches shared between SMs 332, or via any shared memory, global memory, or other type of memory resident on any storage device included in computer system 100. In one embodiment, L1.5 cache 350 may be configured to cache instructions that are to be executed by threads executing on SMs 332.

Each thread in a given thread group or CTA is generally assigned a unique thread identifier (thread ID) that is accessible to the thread during execution. The thread ID assigned to a given thread can be defined as a one-dimensional or multi-dimensional numerical value. Execution and processing behavior of the given thread may vary depending on the thread ID. For example, the thread could determine which portion of an input data set to process and/or which portion of an output data set to write based on the thread ID.

In one embodiment, a sequence of per-thread instructions may include at least one instruction that defines cooperative behavior between a given thread and one or more other threads. For example, the sequence of per-thread instructions could include an instruction that, when executed, suspends the given thread at a particular state of execution until some or all of the other threads reach a corresponding state of execution. In another example, the sequence of per-thread instructions could include an instruction that, when executed, causes the given thread to store data in a shared memory to which some or all of the other threads have access. In yet another example, the sequence of per-thread instructions could include an instruction that, when executed, causes the given thread to atomically read and update data stored in a shared memory to which some or all of the other threads may have access, depending on the thread IDs of those threads. In yet another example, the sequence of per-thread instructions could include an instruction that, when executed, causes the given thread to compute an address in a shared memory based on a corresponding thread ID in order to read data from that shared memory. With the above synchronization techniques, a first thread can write data to a given location in a shared memory and a second thread can read that data from the shared memory in a predictable manner. Accordingly, threads can be configured to implement a wide variety of data sharing patterns within a given thread group or a given CTA or across threads in different thread groups or different CTAs. In various embodiments, a software application written in the compute unified device architecture (CUDA) programming language describes the behavior and operation of threads executing on GPC 242, including any of the above-described behaviors and operations.

In operation, pipeline manager 310 generally coordinates the parallel execution of processing tasks within GPC 242. Pipeline manager 310 receives processing tasks from task/work unit 234 and distributes those processing tasks to TPCs 330 for execution via SMs 332. A given processing task is generally associated with one or more CTAs that can be executed on one more SMs 332 within one or more TPCs 330. In one embodiment, a given task/work unit 234 may distribute one or more processing tasks to GPC 242 by launching one or more CTAs that are directed to one or more specific TPCs 330. Pipeline manager 310 may receive the launched CTA from task/work unit 234 and transfer the CTA to the relevant TPC 330 for execution via one or more SMs 332 included in the TPC 330. During or after execution of a given processing task, each SM 332 generates output data and transmits the output data to various locations depending on a current configuration and/or the nature of the current processing task.

In configurations related to general-purpose computing or graphics processing, SM 332 can transmit output data to work distribution crossbar 320 and work distribution crossbar 320 then routes the output data to one or more GPCs 242 for additional processing or routes the output data to crossbar unit 250 for further routing. Crossbar unit 250 can route the output data to an L2 cache included in a given partition unit 262, to PPU memory 270, or to system memory 120, among other destinations. Pipeline manager 310 generally coordinates the routing of output data performed by work distribution crossbar 320 based on the processing tasks associated with that output data.

In configurations specific to graphics processing, SM 332 can transmit output data to texture unit 340 and/or preROP 370. In some embodiments, preROP 370 can implement some or all of the raster operations specified in a 3D graphics API, in which case preROP 370 implements some or all of the operations otherwise performed via a ROP 410. Texture unit 340 generally performs texture mapping operations, including, for example, determining texture sample positions, reading texture data, and filtering texture data among others. PreROP 370 generally performs raster-oriented operations, including, for example, organizing pixel color data and performing optimizations for color blending. PreROP 370 can also perform address translations and direct output data received from SMs 332 to one or more raster operation processor (ROP) units within partition units 262.

In any of the above configurations, one or more PMs 360 monitor the performance of the various components of GPC 242 in order to provide performance data to users, and/or balance the utilization of compute, graphics, and/or memory resources across groups of threads, and/or balance the utilization of those resources with that of other GPCs 242. Further, in any of the above configurations, SM 332 and other components within GPC 242 may perform memory access operations with memory interface 260 via MMU 300. MMU 300 generally writes output data to various memory spaces and/or reads input data from various memory spaces on behalf GPC 242 and the components included therein. MMU 300 is configured to map virtual addresses into physical addresses via a set of page table entries (PTEs) and one or more optional address translation lookaside buffers (TLBs). MMU 300 can cache various data in L1.5 cache 350, including read data returned from memory interface 260. In the embodiment shown, MMU 300 is coupled externally to GPC 242 and may potentially be shared with other GPCs 242. In other embodiments, GPC 242 may include a dedicated instance of MMU 300 that provides access to one or more partition units 262 included in memory interface 260.

Figure 4:
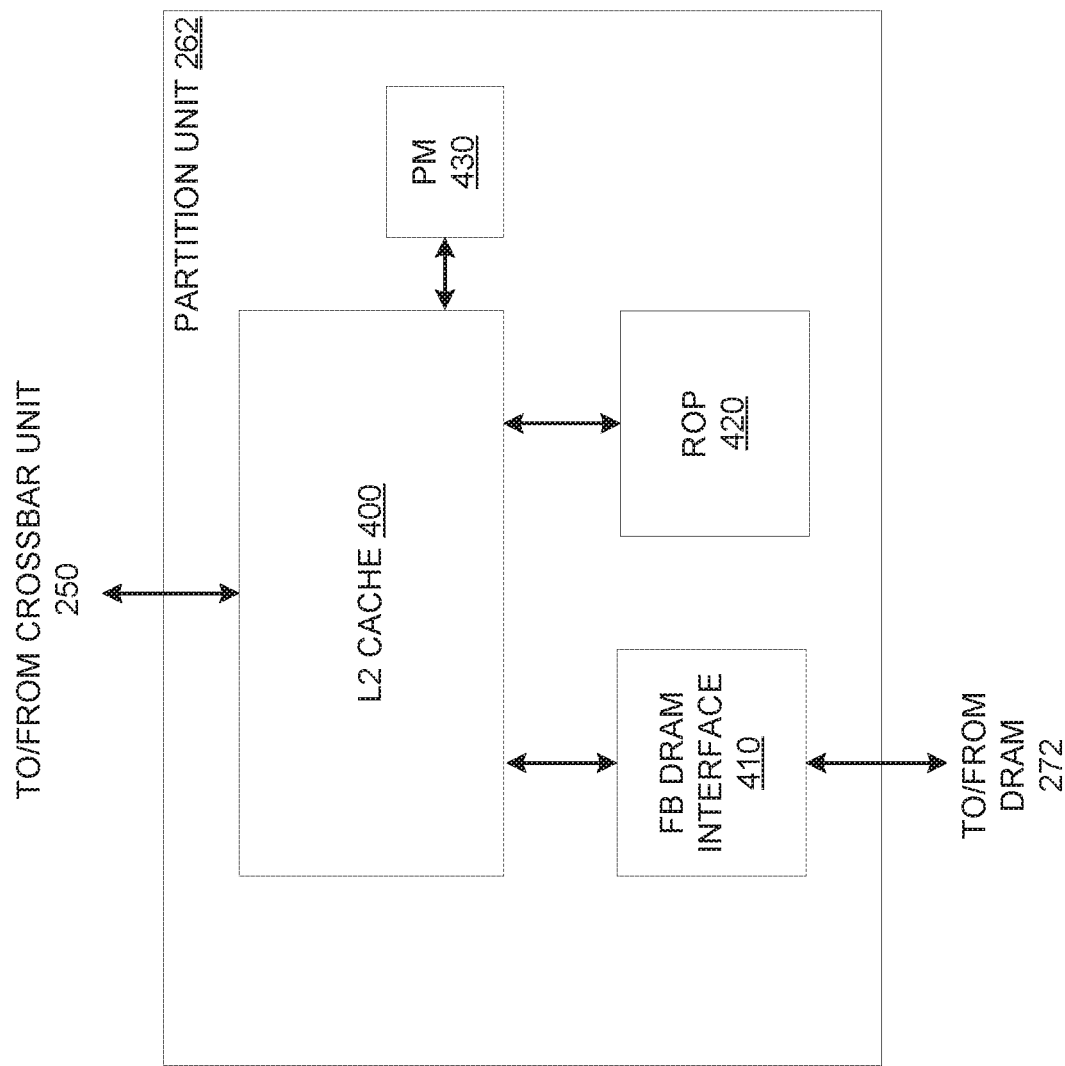
FIG. 4 is a block diagram of a partition unit included in the PPU of FIG. 2, according to various embodiments.

FIG. 4 is a block diagram of a partition unit 262 included in the PPU 200 of FIG. 2, according to various embodiments. As shown, partition unit 262 includes an L2 cache 400, a frame buffer (FB) DRAM interface 410, a raster operations processor (ROP) 420, and one or more PMs 430. L2 cache 400 is coupled between FB DRAM interface 410, ROP 420, and PM 430.

L2 cache 400 is a read/write cache that performs load and store operations received from crossbar unit 250 and ROP 420. L2 cache 400 outputs read misses and urgent writeback requests to FB DRAM interface 410 for processing. L2 cache 400 also transmits dirty updates to FB DRAM interface 410 for opportunistic processing. In some embodiments, during operation, PMs 430 monitor utilization of L2 cache 400 in order to fairly allocate memory access bandwidth across different GPCs 242 and other components of PPU 200. FB DRAM interface 410 interfaces directly with specific DRAM 272 to perform memory access operations, including writing data to and reading data from DRAM 272. In some embodiments, the set of DRAMs 272 is divided among multiple DRAM chips, where portions of multiple DRAM chips correspond to each DRAM 272.

In configurations related to graphics processing, ROP 420 performs raster operations to generate graphics data. For example, ROP 420 could perform stencil operations, z test operations, blending operations, and compression and/or decompression operations on z or color data, among others. ROP 420 can be configured to generate various types of graphics data, including pixel data, graphics objects, fragment data, and so forth. ROP 420 can also distribute graphics processing tasks to other computational units. In one embodiment, each GPC 242 includes a dedicated ROP 420 that performs raster operations on behalf of the corresponding GPC 242.

Persons skilled in the art will understand that the architecture described in FIGS. 1-4 in no way limits the scope of the present embodiments and that the techniques disclosed herein may be implemented on any properly configured processing unit, including, without limitation, one or more CPUs, one or more multi-core CPUs, one or more PPUs 200, one or more GPCs 242, one or more GPUs or other special purpose processing units, and so forth, without departing from the scope and spirit of the present embodiments.

Logical Groupings of Hardware Resources

Figure 5:
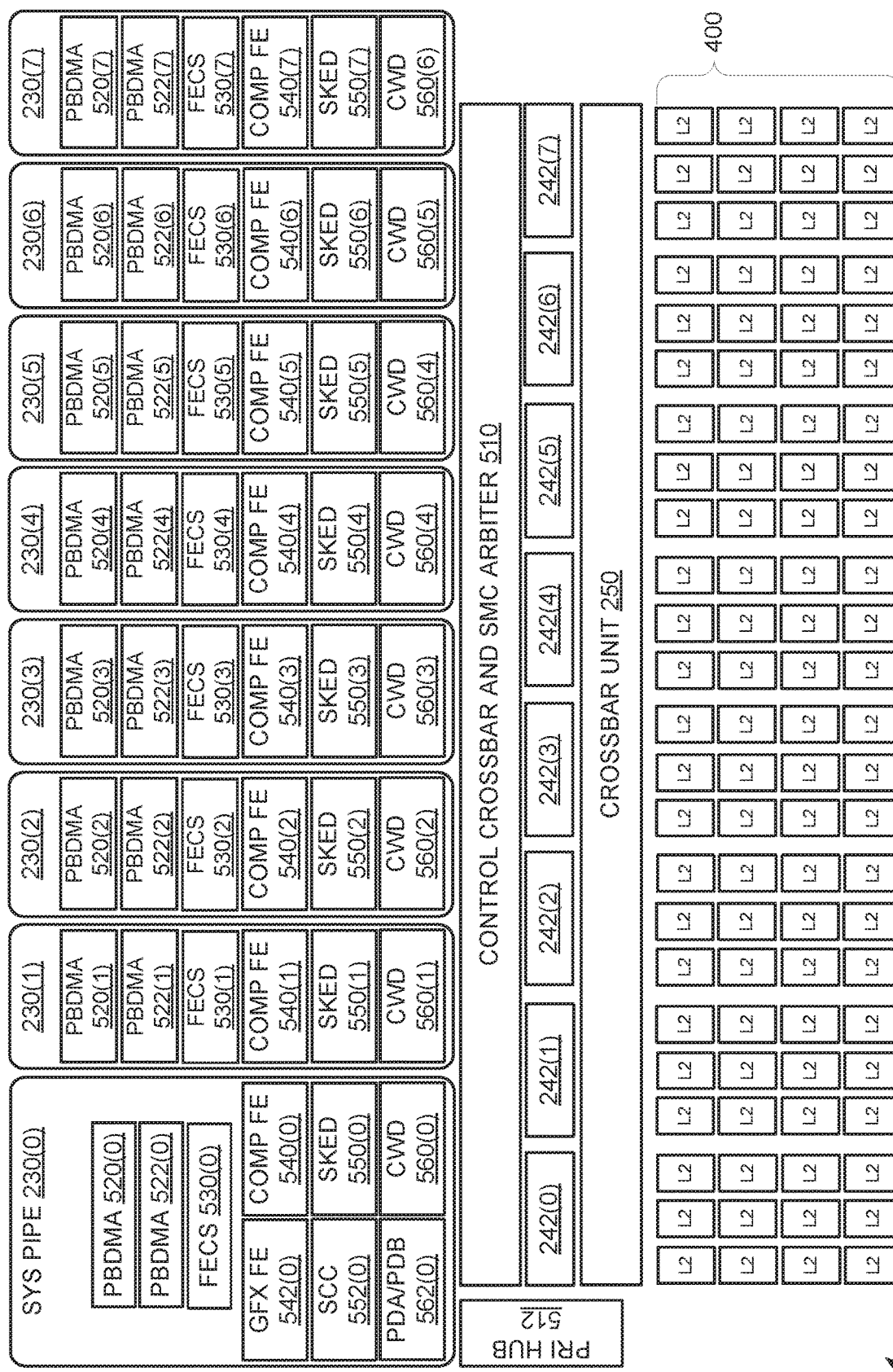
FIG. 5 is a block diagram of various PPU resources included in the PPU of FIG. 2, according to various embodiments.

FIG. 5 is a block diagram of various PPU resources included in the PPU of FIG. 2, according to various embodiments. As shown, PPU resources 500 includes sys pipes 230(0) through 230(7), control crossbar and SMC arbiter 510, privileged register interface (PRI) hub 512, GPCs 242, crossbar unit 250, and L2 cache 400. L2 cache 400 is depicted here as a collection of "L2 cache slices," each of which corresponds to a different region of DRAM 262. Sys pipes 230, GPCs 242, and PRI hub 512 are coupled together via control crossbar and SMC arbiter 510. GPCs 242 and individual slices of L2 cache 400 are coupled together via crossbar unit 250. In the example discussed herein, PPU resources 500 includes eight sys pipes 230, eight GPCs 242, and specific numbers of other components. However, those skilled in the art will understand that PPU resources 500 may include any technically feasible number of these components.

Each sys pipe 230 generally includes PBDMAs 520 and 522, a front-end context switch (FECS) 530, a compute (COMP) front end (FE) 540, a scheduler (SKED) 550, and a CUDA work distributor (CWD) 560. PBDMAs 520 and 522 are hardware memory controllers that manage communications between device driver 122 and PPU 200. FECS 530 is a hardware unit that manages context switches. Compute FE 540 is a hardware unit that prepares processing compute tasks for execution. SKED 550 is a hardware unit that schedules processing tasks for execution. CWD 560 is a hardware unit configured to queue and dispatch one or more grids of threads to one or more GPCs 242 to execute one or more processing tasks. In one embodiment, a given processing task may be specified in a CUDA program. Via the above components, sys pipes 230 can be configured to perform and/or manage general-purpose compute operations.

Sys pipe 230(0) further includes a graphics front-end (FE) unit 542 (shown as GFX FE 542), a state change controller SCC 552, and primitive distributor phase A/phase B units (PDA/PDB) 562. Graphics FE 542 is a hardware unit that prepares graphics processing tasks for execution. SCC 552 is a hardware unit that manages parallelization of work with different API states (e.g., a shader program, constants used by a shader, and how a texture gets sampled), to maintain the in-order application of API state, even though graphics primitives are not processed in order. PDA/PDB 562 is a hardware unit that distributes graphics primitives (e.g., triangles, lines, points, quadrilaterals, meshes, etc.) to GPCs 242. Via these additional components, sys pipe 230(0) can be further configured to perform graphics processing operations. In various embodiments, some or all sys pipes 230 may be configured to include similar components to sys pipe 230(0) and therefore be capable of performing either general-purpose compute operations or graphics processing operations. Alternatively, in various other embodiments, some or all sys pipes 230 may be configured to include similar components to sys pipe 230(1) through 220(7) and therefore be capable of performing only general-purpose compute operations. As a general matter, front end 232 of FIG. 2 can be configured to include compute FE 540, graphics FE 542, or both compute FE 540 and graphics FE 542. Accordingly, for generality, front end 232 is referred to hereinafter in reference to either or both of compute FE 540 and graphics FE 542.

Control crossbar and SMC arbiter 510 facilitates communications between sys pipes 230 and GPCs 242. In some configurations, one or more specific GPCs 242 are programmably assigned to perform processing tasks on behalf of a specific sys pipe 230. In such configurations, control crossbar and SMC arbiter 510 is configured to route data between any given GPC(s) 242 and the corresponding sys pipe(s) 220. PRI hub 512 provides access, by the CPU 110 and/or PPU 200 units, to a set of privileged registers to control configuration of the PPU 200. The register address space with the PPU 200 can be configured by a PRI register, and, in so doing, PRI hub 212 is used to configure the mapping of PRI register addresses between a generic PRI address space and a PRI address space defined separately for each sys pipe 230. This PRI address space configuration provides for broadcasting to multiple PRI registers from SMC engines described below in conjunction with FIG. 7. GPCs 242 write data to and read data from L2 cache 400 via crossbar unit 250 in the manner described previously. In some configurations, each GPC 242 is allocated a separate set of L2 slices derived from L2 cache 400 and any given GPC 242 can perform write/read operations with the corresponding set of L2 slices.

Any of PPU resources 500 discussed above can be logically grouped or partitioned into one or more PPU partitions that each operates in like fashion to PPU 200 as a whole. In particular, a given PPU partition can be configured with sufficient compute, graphics, and memory resources to perform any technical feasible operation that can be performed by PPU 200. An example of how PPU resources 500 can be logically grouped into partitioned is described in greater detail below in conjunction with FIG. 6.

Figure 6:
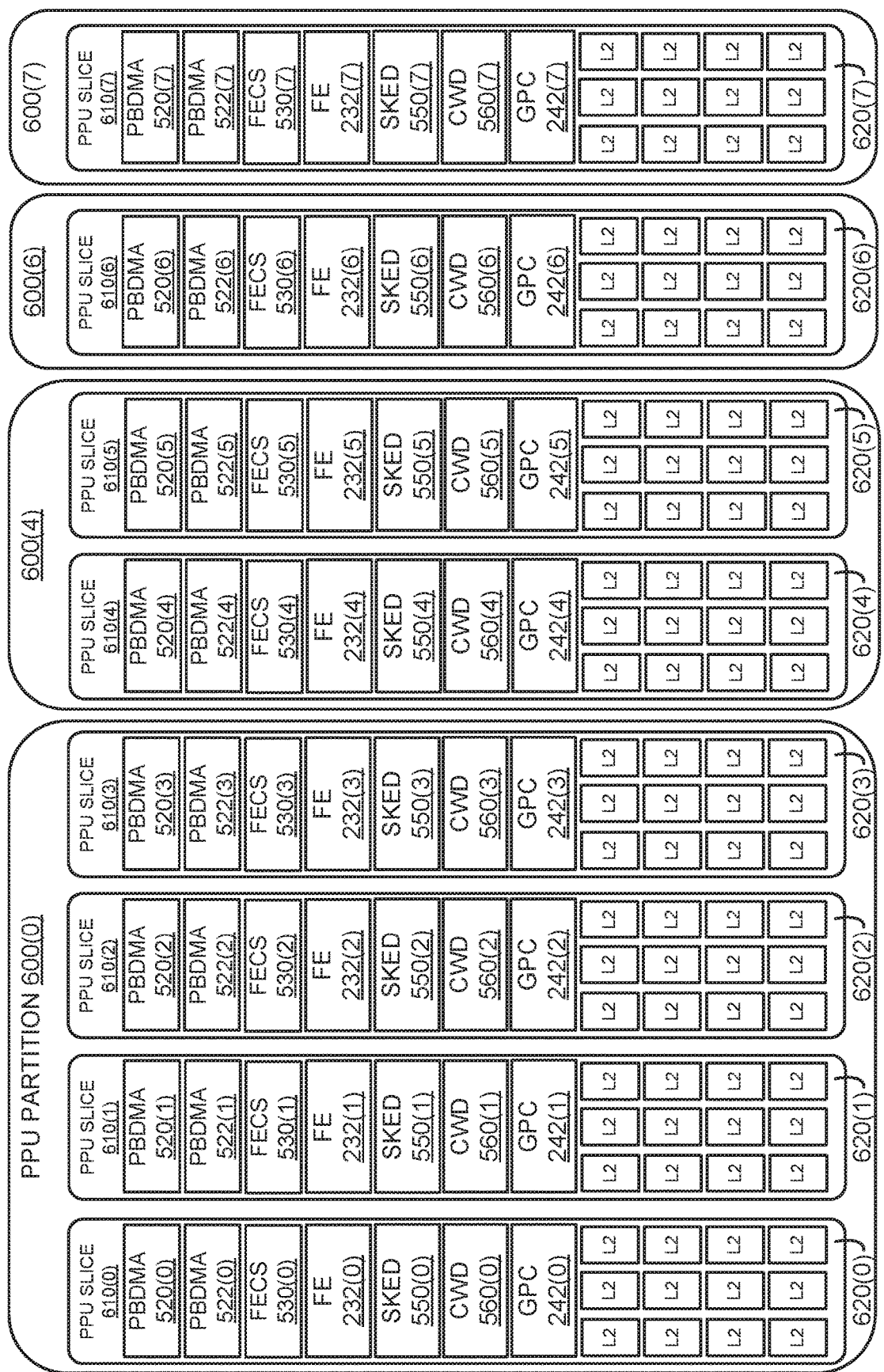
FIG. 6 is an example of how the hypervisor of FIG. 1 logically groups PPU resources into a set of PPU partitions, according to various embodiments.

FIG. 6 is an example of how the hypervisor of FIG. 1 logically groups PPU resources into a set of PPU partitions, according to various embodiments. As shown, PPU partitions 600 include one or more PPU slices 610. In particular, PPU partition 600(0) includes PPU slices 610(0) through 610(3), PPU partition 600(4) includes PPU slice 610(4) and 610(5), PPU partition 600(6) includes PPU slice 610(6), and PPU partition 600(7) includes PPU slice 610(7). In the example discussed herein, PPU partitions 600 include the specific number of PPU slices 610 shown. However, in other configurations, PPU partitions 600 can include other numbers of PPU slices 610.

Each PPU slice 610 includes various resources derived from one sys pipe 230, including PBDMAs 520 and 522, FECS 530, front end 232, SKED 550, and CWD 560. Each PPU slice 610 further includes a GPC 242, a set of L2 slices 620, and corresponding portions of DRAM 272 (not shown here). The various resources included within a given PPU slice 610 confer sufficient functionality that any given PPU slice 610 can perform at least some of the general-purpose compute and/or graphics processing operations that PPU 200 is capable of performing.

For example, a PPU slice 610 could receive processing tasks via front end 232 and then schedule those processing tasks for execution via SKED 550. CWD 560 could then issue grids of threads to execute those processing tasks on GPC 242. GPC 242 could execute numerous thread groups in parallel in the manner described above in conjunction with FIG. 3. PBDMAs 520 and 522 could perform memory access operations on behalf of the various components included in PPU slice 610. In some embodiments, PBDMAs 520 and 522 fetch commands from memory and send the commands to FE 232 for processing. As needed, various components of PPU slice 610 could write data to and read data from the corresponding set of L2 cache slices 620. The components of PPU slice 610 could also interface with external components included in PPU 200 as needed, including I/O unit 210 and/or PCEs 222, among others. FECS 530 could perform context switch operations when time-slicing one or more VMs on the various resources included in PPU slice 610.

In the embodiment shown, each PPU slice 610 includes resources derived from a sys pipe 230 that is configured to coordinate general-purpose compute operations. Accordingly, PPU slices 610 are configured to only execute general-purpose processing tasks. However, in other embodiments, each PPU slice 610 can further include resources derived from a sys pipe 230 that is configured to coordinate graphics processing operations, such as sys pipe 230(0). In these embodiments, PPU slices 610 may be configured to additionally execute graphics processing tasks.

As a general matter, each PPU partition 600 is a hard partitioning of resources that provides one or more users with a dedicated parallel computing environment that is isolated from other PPU partitions 600. A given PPU partition 600 includes one or more dedicated PPU slices 610, as is shown, that collectively confer the various general-purpose compute, graphics processing, and memory resources needed to mimic, to at least some extent, the overarching functionality of PPU 200 as a whole. Accordingly, a given user can execute parallel processing operations within a given PPU partition 600 in like fashion to a user that executes those same parallel processing operations on PPU 200 when PPU 200 is not partitioned. Each PPU partition 600 is fault insensitive to other PPUs 600 and each PPU partition can reset independently of, and without disrupting the operation of, other PPUs partitions 600. Various resources not specifically shown here are fairly distributed across different PPU partitions 600 in proportion to the size of those different PPU partitions 600, as described in greater detail below.

In the example configuration of PPU partitions 600 discussed herein, PPU partition 600(0) is allocated four out of eight PPU slices 610 and is therefore provisioned with one half of PPU resources 500, including various types of bandwidth, such as memory bandwidth, for example. Accordingly, PPU partition 610(0) would be constrained to consuming one half of the available system memory bandwidth, one half of the available PPU memory bandwidth, one half of the available PCE 212 bandwidth, and so forth. Similarly, PPU partition 600(4) is allocated two out of eight PPU slices 610 and is therefore provisioned with one quarter of PPU resources 500. Accordingly, PPU partition 610(4) would be constrained to consuming one quarter of the available system memory bandwidth, one quarter of the available PPU memory bandwidth, one quarter of the available PCE 212 bandwidth, and so forth. The other PPU partitions 600(6) and 600(7) would be constrained in an analogous fashion. Persons skilled in the art will understand how the exemplary partitioning and associated resource provisioning discussed above can be implemented with any other technically feasible configuration of PPU partitions 600.

In some embodiments, each PPU partition 600 executes contexts for one virtual machine (VM). In one embodiment, PPU 200 may implement various performance monitors and throttling counters that record the amount of local and/or system-wide resources being consumed by each PPU partition 600 in order to maintain a proportionate consumption of resources across all PPU partitions 600. The allocation of the appropriate fraction of the PPU memory bandwidth to a PPU partition 600 can be achieved by allocating the same fraction of L2 Slices 400 to the PPU partition 600.

As a general matter, PPU partitions 600 can be configured to operate in functional isolation relative to one another. As referred to herein, the term "functional isolation," as applied to a set of PPU partitions 600, generally indicates that any PPU partition 600 can perform one or more operations independently of, without interfering with, and without being disrupted by, any operations performed by any other PPU partition 600 in the set of PPU partitions 600.

A given PPU partition 600 can be configured to simultaneously execute processing tasks associated with multiple processing contexts. The term "processing context" or "context" generally refers to the state of hardware, software, and/or memory resources during execution of one or more threads, and generally corresponds to one process on CPU 110. The multiple processing contexts associated with a given PPU partition 600 can be different processing contexts or different instances of the same processing context. When configured in this manner, specific PPU resources allocated to the given PPU partition 600 are logically grouped into separate "SMC engines" that execute separate processing tasks associated with separate processing contexts, as described in greater detail below in conjunction with FIG. 7. For example, a given processing context could include hardware settings, per-thread instructions, and/or register contents associated with threads, that executes within an SMC Engine 700.

Figure 7:
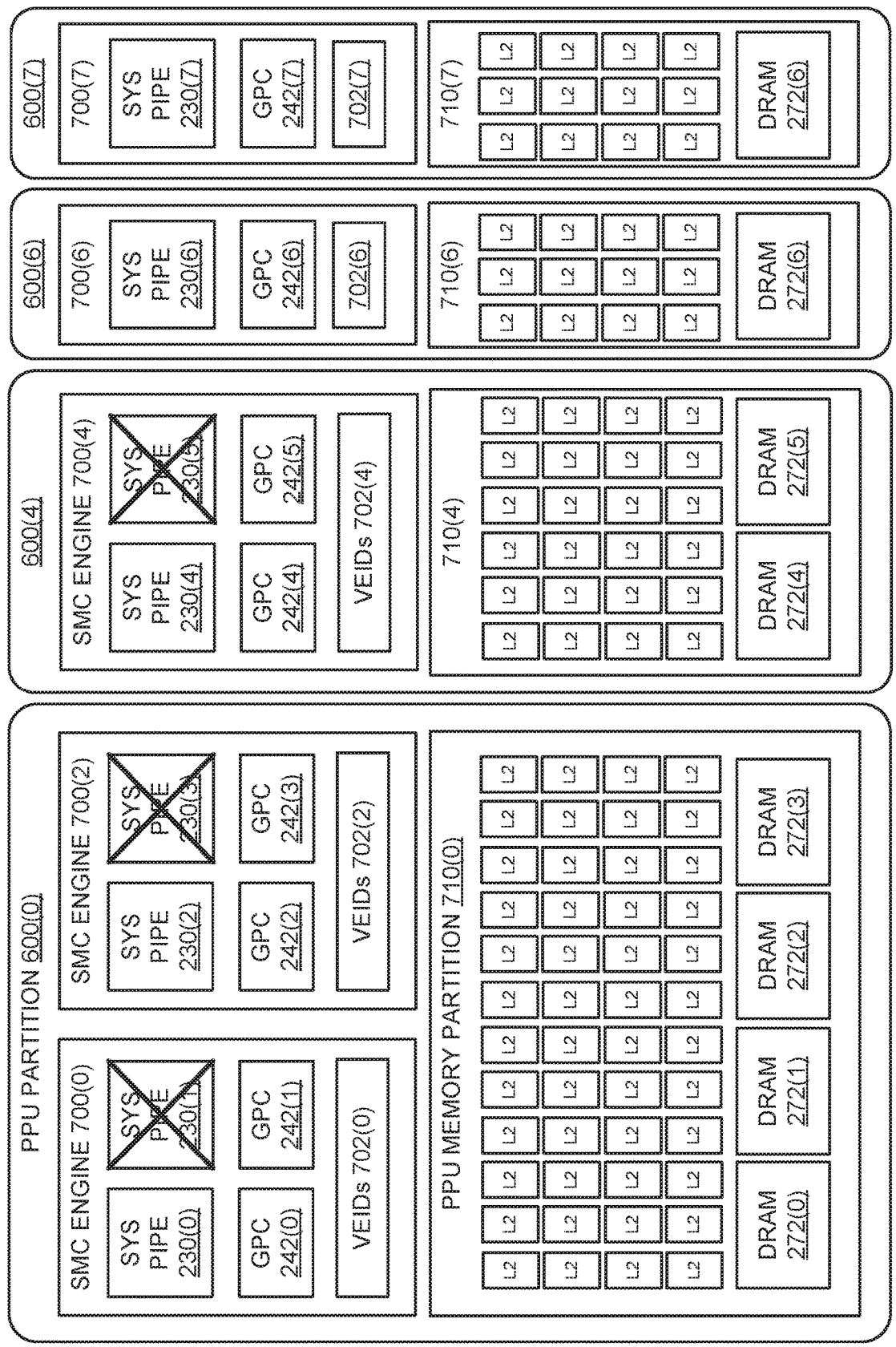
FIG. 7 illustrates how the hypervisor of FIG. 1 configures a set of PPU partitions to implement one or more simultaneous multiple context (SMC) engines, according to various embodiments.

FIG. 7 illustrates an example of how the hypervisor of FIG. 1 configures a set of PPU partitions to implement one or more simultaneous multiple context (SMC) engines, according to various embodiments. As shown, PPU partitions 600 include one or more SMC engines 700. In particular, PPU partition 600(0) includes SMC engines 700(0) and 700(2), PPU partition 600(4) includes SMC engine 700(4), PPU partition 600(6) includes SMC engine 700(6), and PPU partition 600(7) includes SMC engine 700(7). Each SMC engine 700 can be configured to execute one or more processing contexts and/or be configured to execute one or more processing tasks associated with a given processing context, in like fashion to PPU 200 as a whole.

A given SMC engine 700 generally includes compute and memory resources associated with at least one PPU slice 610. For example, SMC engines 700(6) and 700(7) include the compute and memory resources associated with PPU slices 610(6) and 610(7), respectively. Each SMC engine 700 also includes a set of virtual engine identifiers (VEIDs) 702 that locally reference one or more subcontexts, where a VEID is associated with, and may be identical to, a virtual address space identifier, used to select a virtual address space, where the pages of the virtual address spaces are described by page tables managed by the MMU1600. A given SMC engine 700 can also include compute and memory resources associated with multiple PPU slices 610. For example, SMC engine 700(0) includes the compute resources associated with PPU slices 610(0) and 610(1), but does not utilize sys pipe 230(1). SMC engine 700(0) includes and utilizes the L2 slices in four PPU slices 610(0), 610(1), 610(2), and 610(3). In some embodiments, SMC engines 700 within the same PPU partition 600 share the L2 Slices within the PPU partition 600. In this configuration, the sys pipe 230(1) of PPU partition 600(1) is unused, as is shown, because an SMC engine generally runs one processing context at time, and only one sys pipe 230 is needed for one processing context. SMC engine 700(2) is configured in like fashion to SMC engine 700(0). The memory resources included within any particular PPU partition 600, which can be allocated to and/or distributed across any one or more SMC engines 700 within that particular PPU partition 700, are shown as PPU memory partitions 710.

A given PPU memory partition 710 includes the set of L2 slices included in the PPU partition 600 and corresponding portions of DRAM 272. As a general matter, multiple SMC engines 700 share a PPU memory partition 710, if those SMC engines 700 are included in the same PPU Partition 600. Allocations to each SMC engine 700 are provided to the contexts running on those SMC engines 700, and the allocations within the PPU memory partition 710 are implemented based on pages.

Each SMC engine 700 can be configured to independently execute processing tasks associated with one processing context at any given time. Accordingly, PPU partition 600 (0), having two SMC engines 700(0) and 700(2), can be configured to simultaneously execute processing tasks associated with two separate processing contexts at any given time. PPU partitions 600(4), 600(6), and 600(7), on the other hand, each including one SMC engine 700(4), 700(6), and 700(7), respectively, can be configured to execute processing tasks associated with one processing context at a time. In some embodiments, contexts running on SMC engines 700 in different PPU partitions 600 can share data by sharing one or more pages in either or both PPU partitions 600.

Any given SMC engine 700 can be further configured to time-slice different processing contexts over different intervals of time. Accordingly, each SMC engine 700 can independently support the execution of processing tasks associated with multiple processing contexts, though not necessarily simultaneously. For example, SMC engine 700 (6) could time-slice four different processing contexts over four different intervals of time, thereby allowing processing tasks associated with those four processing contexts to execute within PPU partition 600(6). In some embodiments, VMs are time-sliced on one or more of PPU partitions 600. For example, PPU partition 600(0) can time-slice between two VMs, where each VM simultaneously executes two processing contexts, one on each SMC engine 700(0) and 700(1). In these embodiments, it is preferable to context switch out all processing contexts from a first VM, before context switching in the processing contexts from a second VM, which is advantageous when the processing contexts running on PPU partition 600(0) are sharing the L2 slices 400 that are within PPU partition 600(0).

In one embodiment, a given VM may be associated with a GPU function ID (GFID). A given GFID may include one or more bits that correspond to a Physical Function (PF) associated with hardware where the VM executes. The given GFID may also include a set of bits that corresponds to a Virtual Function (VF) that is uniquely assigned to the VM. A given GFID can be used to route errors to a corresponding to the guest operating system of a VM, among other uses.

SMC engines 700 within different PPU partitions 600 generally operate in isolation from one another because, as previously discussed, each PPU partition 600 is a hard partitioning of PPU resources 500. Multiple SMC engines 700 within the same PPU partition 600 can generally operate independently of one another and, in particular, can context switch independently of one another. For example, SMC engine 700(0) within PPU partition 600(0) could context switch independently and asynchronously relative to SMC engine 700(2). In some embodiments, multiple SMC engines 700 within the same PPU partition 600 may synchronize context switching in order to support certain modes of operation, such as time-slicing between two VMs.

As a general matter, device driver 122 and hypervisor 124 of FIG. 1 interoperate to partition PPU 200 in the manner described thus far. Furthermore, device driver 122 and hypervisor 124 interoperate to configure each PPU partition 600 into one or more SMC engines 700. In so doing, device driver 122 and hypervisor 124 configure DRAMs 272 and/or L2 cache 400 in order to divide the set of L2 slices into groups that are each an SMC memory partition 710, as described in greater detail below in conjunction with FIG. 8. In some embodiments, hypervisor 124 responds to controls by a system administrator, to allow the system administrator to create configurations of PPU partitions. These PPU partitions 600 are handed off to the guest OS 916 of a VM, and the guest OS 916 subsequently sends requests to hypervisor 124 to configure an associated PPU partition 600 into one or more SMC engines 700. In some embodiments, the guest OS can directly configure the SMC Engines 700 within a PPU partition 700, because sufficient isolation is added to prevent one guest OS from affecting the PPU partition 700 of a different gust OS.

FIG. 8A is a more detailed illustration of the DRAM of FIG. 7, according to various embodiments. As shown, DRAM 272, which includes each of DRAMs 272(0) through 272(7) of FIG. 7, is accessible via L2 slices 800. Each L2 slice 800 corresponds to a different portion of L2 cache 400 and is configured to access a corresponding subset of locations within DRAM 272. As a general matter, the partitioning of DRAM 272 corresponds to a raw 2D address space that is organized in like fashion as DRAM 272 shown here.

As also shown, DRAM 272 is separated into a top section 810, a partitionable section 820, and a bottom section 830. Top section 810 and bottom section 830 are memory carveouts derived from the top and bottom portions, respectively, of all DRAM 272(0) through 272(7). Device driver 122, hypervisor 124, and other system-level entities have access to top section 810 and/or bottom section 830 and, in some embodiments, these sections are not accessible to PPU partitions 600. Partitionable section 820, on the other hand, is designated for use by PPU partitions 600 in general and SMC engines 700 in particular. In some embodiments, secure data resides in top section 810 or bottom section 830, and is accessible by all PPU partitions 600. In some embodiments, top section 810 or bottom section 830 are used for hypervisor data that is not accessible by the VMs.

In the exemplary memory partitioning shown, partitionable section 820 includes DRAM portion 822(0) corresponding to PPU memory partition 710(0) within PPU partition 600(0), DRAM portion 822(4) corresponding to PPU memory partition 710(4) within PPU partition 600(2), DRAM portion 822(6) corresponding to PPU memory partition 710(6) within PPU partition 600(6), and DRAM portion 822(7) corresponding to PPU memory partition 710(7) within PPU partition 600(7). Each DRAM portion 822 corresponds to the middle portion of the addresses corresponding to a set of L2 cache slices 800. A given DRAM portion 822 can be subdivided further in order to provide separate sets of L2 cache slices for different VMs that execute processing tasks associated with different processing contexts. For example, DRAM portion 822(4) could be subdivided into two or more regions to support two or more VMs that execute processing tasks associated with two or more processing contexts. Once a DRAM portion is configured and in use, it is generally used by one VM at a time, running on a PPU partition 600.

In operation, device driver 122 and hypervisor 124 perform memory access operations within top section 810 and/or bottom section 830 via top portions and bottom portions of address ranges corresponding to all L2 cache slices 800 in a relatively balanced manner, thereby penalizing memory bandwidth across each L2 slice 800 proportionally. In some embodiments, SMC engines 700 perform memory access operations to system memory 120 via L2 cache slices 800, with a throughput that is controlled by throttle counters 840. Each throttle counter 840 monitors the memory bandwidth consumed when SMC engines 700 access system memory 120 via L2 cache slices 800 associated with corresponding PPU memory partitions 710 in order to provide proportionate memory bandwidth to each PPU partition 600. As discussed, PPU partitions 600 are provided with access to various system-wide resources in proportion to the configuration of those PPU partitions 600. In the example shown, PPU partition 600(0) is allocated one half of PPU resources 500, and therefore is allocated one half of partitionable section 820 (shown as DRAM portion 822(0)) and, correspondingly, one half of the available memory bandwidth to system memory 120. The partitioning of DRAM 272 is described in greater detail below in conjunction with FIGS. 19-24.

Figure 8B:
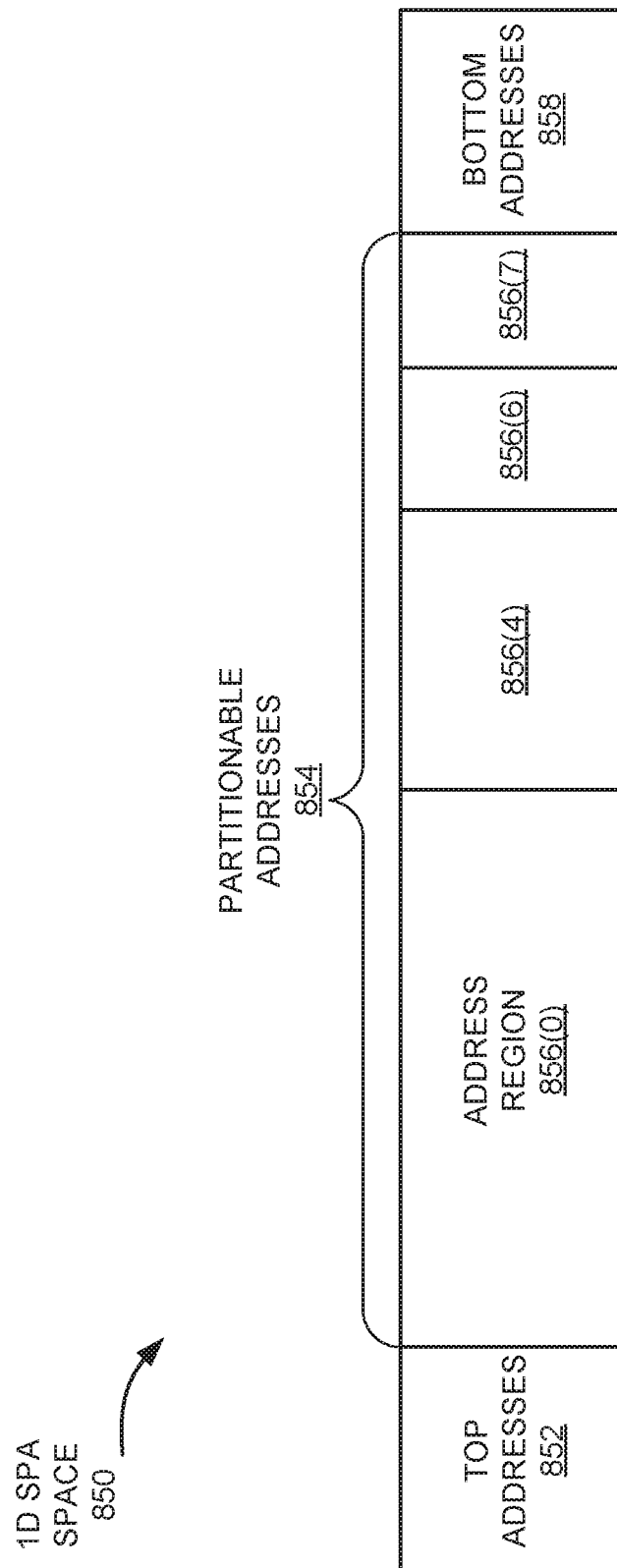
FIG. 8B illustrates how the various DRAM sections of FIG. 8B are addressed, according to various embodiments.

FIG. 8B illustrates how the various DRAM sections of FIG. 8B are addressed, according to various embodiments. As shown, a one-dimensional (1D) system physical address (SPA) space 850 includes top addresses 852 corresponding to top section 810, partitionable addresses 854 divided into address regions 856 and corresponding to DRAM portions 822, and bottom addresses 858 corresponding to bottom section 830. Top addresses 852 are swizzled (i.e., pseudorandomly interleaved based on SPA address) across all L2 slices 800 and correspond to top portions of those L2 slices. Bottom addresses 858 are swizzled across all L2 slices 800 and correspond to bottom portions of those L2 slices. Top addresses 852 and bottom addresses 858 are generally accessible only to system-level entities such as hypervisor 124 and/or any entities that operate via physical function (PF). Partitionable addresses 854 are allocated to PPU partitions 600. In particular, address region 856(0) is allocated to PPU partition 600(0), address region 856(4) is allocated to PPU partition 600(4), address region 856(6) is allocated to PPU partition 600(6), and address region 856(7) is allocated to PPU partition 600(7). Address regions 856 may only be accessible to the SMC engine(s) 700 executing within corresponding PPU partitions 600.

Referring generally to FIGS. 5-8B, the above approach to partitioning PPU resources 500 supports a number of usage scenarios, including single-tenant and multi-tenant usage scenarios, among others. In a single-tenant usage scenario, PPU 200 can be partitioned to provide different users associated with a single tenant with independent access to PPU resources. For example, different users associated with a given tenant could execute different curated workloads across different PPU partitions 600. In single-tenant usage scenarios, a single entity may be provided with access to the entirety of PPU resources 500. In a multi-tenant usage scenario, PPU 200 can be partitioned to provide one or more users associated with one or more different tenants with independent access to PPU resources. In a multi-tenant usage scenario, multiple entities may be provided with access to different PPU partitions 600 that include different portions of PPU resources 500.

In any usage scenario, device driver 122 and hypervisor 124 interoperate to perform a two-step process that firstly involves partitioning PPU 200 into PPU partitions 600 and secondly involves configuring those PPU partitions 600 into SMC engines 700. This process is described in greater detail below in conjunction with FIGS. 9-10.

Techniques for Configuring Logical Groupings of Hardware Resources

Figure 9:
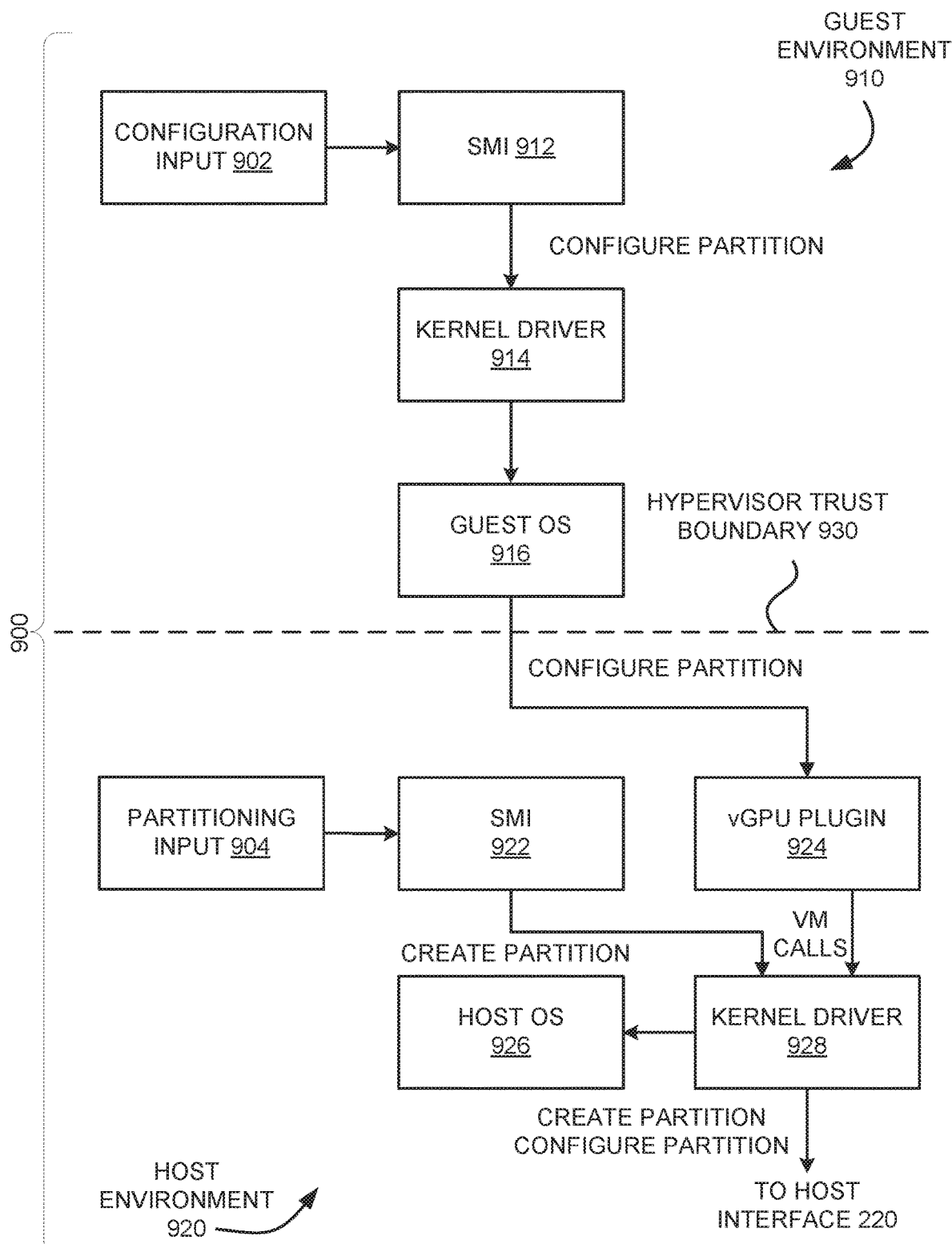
FIG. 9 is a data flow diagram illustrating how the hypervisor of FIG. 1 partitions and configures a PPU, according to various embodiments.

FIG. 9 is a flow diagram illustrating how the hypervisor of FIG. 1 partitions and configures a PPU, according to various embodiments. As shown, hypervisor environment 900 includes a guest environment 910 and a host environment 920 that are separated from one another by a hypervisor trust boundary 930. Guest environment 910 includes system management interface (SMI) 912, kernel driver 914, and guest operating system (OS) 916. Host environment 920 includes SMI 922, virtual GPU (vGPU) plugin 924, host OS 926, and kernel driver 928. Modules included in guest environment 910 that reside above hypervisor trust boundary 930 generally execute with a lower permission level than modules included in host environment 920 that reside below hypervisor trust boundary 930, including repeated instances of the same module, such as SMI 912 and SMI 922. Hypervisor 124 executes with a kernel-level set of permissions and can grant appropriate permissions to any of the modules shown. In some embodiments, there is a one-to-one correspondence between a VM and a guest environment 910; and when multiple VMs are not context-switched onto one PPU partition 600, there is generally a one-to correspondence between guest environments and PPU partitions.

In operation, an admin user of PPU 200 interacts with PPU 200 via host environment 920 and host OS 926 in order to configure PPU partitions 600. In particular, the admin user provides partitioning input 904 to SMI 922. In response, SMI 922 issues a "create partition" command to kernel driver 928 indicating the target configuration of PPU partitions 600. Kernel driver 928 transmits the "create partition" command to host interface 220 within PPU 200 to partition the various PPU resources 500. In this manner, the admin user can initialize PPU 200 to have a specific configuration of PPU partitions 600. In general, the admin user has unrestricted access to PPU 200. For example, the admin user could be the system administrator at a datacenter where PPU 200 resides. The admin user could be the system administrator at a datacenter where a plurality of PPUs 200 reside. The admin user partitions PPU 200 in the manner described in order to prepare the various PPU partitions 600 to be independently configured and used by various guest users, as described in greater detail below.

A guest user of PPU 200 interacts with a specific "guest" PPU partition 600 via a VM that executes within guest environment 910 in order to configure SMC engines 700 within that guest PPU partition 600. Specifically, the guest user provides configuration input 902 to SMI 912. SMI 912 then issues a "configure partition" command to kernel driver 914 indicating the target configuration of SMC engines 700. Kernel driver 914 transmits the "configure partition" command via guest OS 916 across hypervisor trust boundary 930 to vGPU plugin 924. vGPU plugin 924 issues various VM calls to kernel driver 928. Kernel driver 928 transmits the "configure partition" command to host interface 220 within PPU 200 to configure various resources of the guest PPU partition 600. In this manner, the guest user can configure a given PPU partition 600 to have a specific configuration of SMC engines 700. Generally, the guest user has restricted access to only a portion of PPU resources 500 associated with the guest PPU partition 600. The guest user could be, for example, a customer of the datacenter where PPU 200 resides who purchases access to a fraction of PPU 200. In one embodiment, guest OSs 916 may be configured with sufficient security measures to permit each guest OS 916 to configure a corresponding PPU partition 600 without involvement of host environment 920 and/or hypervisor 124.

Figure 10:
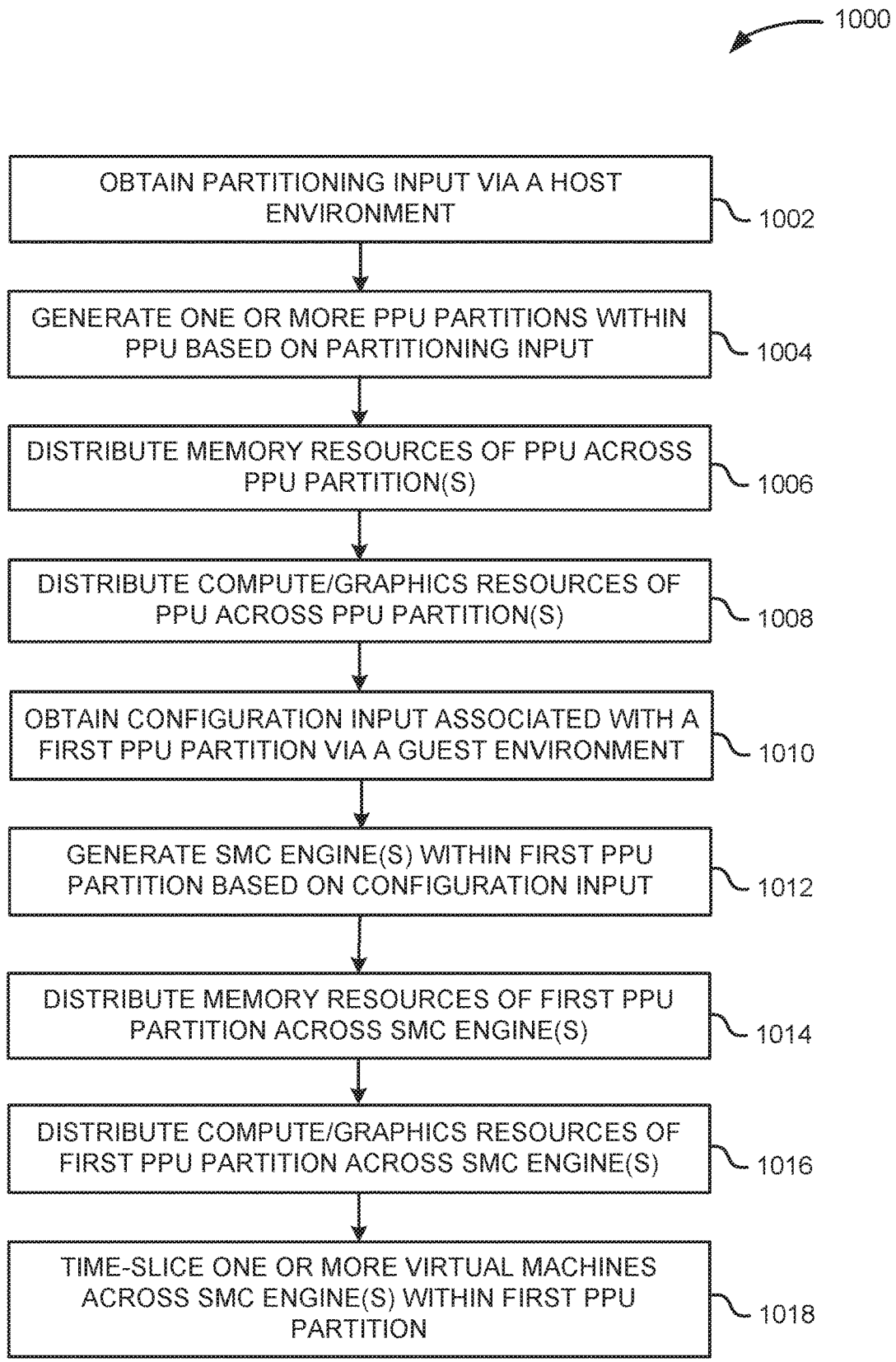
FIG. 10 is a flow diagram of method steps for partitioning and configuring a PPU on behalf of one or more users, according to various embodiments.

FIG. 10 is a flow diagram of method steps for partitioning and configuring a PPU on behalf of one or more users, according to various embodiments. Although the method steps are described in conjunction with the systems of FIGS. 1-9, persons skilled in the art will understand that any system configured to perform the method steps in any order falls within the scope of the present embodiments.

As shown, a method begins at step 1000, where hypervisor 124 receives partitioning input 904 via host environment 920. Host environment 920 executes with an elevated permissions level, thereby allowing an admin user to interact with PPU 200 directly. Partitioning input 904 specifies a target configuration of PPU partitions 600, including a desired size and arrangement of PPU partitions 600. In one embodiment, the partitioning input may be received from the admin user via the host environment.

At step 1004, hypervisor 124 generates one or more PPU partitions 600 within PPU 200 based on partitioning input 904 received at step 1002. In particular, hypervisor 124 implements SMI 922 to issue a "create partition" command to kernel driver 928. In response, kernel driver 928 interacts with host interface 220 of PPU 200 to create one or more PPU partitions 600 having the desired configuration.

At step 1006, hypervisor 124 distributes memory resources across the PPU partition(s) 600 generated at step 1004. In particular, via the "create partition" command discussed above, hypervisor 124 subdivides DRAM 272 in the manner described above in conjunction with FIG. 8A in order to allocate different regions of DRAM 272 and corresponding L2 cache slices 800 to the PPU partition(s) 600.

In one embodiment, hypervisor 124 may also configure an address mapping unit to perform partition-specific swizzle operations to provide access to those different regions of DRAM 272 via L2 cache slices 800. This particular embodiment is described in greater detail below in conjunction with FIG. 22.

At step 1008, hypervisor 124 distributes PPU compute and/or graphics resources across the PPU partition(s) 600. In so doing, hypervisor 124 allocates, via the "create partition" command, one or more sys pipes 230 and one or more GPCs 242 to those PPU partition(s) 600. In one embodiment, hypervisor 124 may implement steps 1006 and 1008 by logically assigning one or more PPU slices 610 to PPU partition(s) 600, thereby allocating memory resources and compute/graphics resources together. When steps 1002, 1004, 1006, and 1008 of the method 1000 are complete, PPU 200 is partitioned and a guest user can then configure one or more of those PPU partitions 600, as described below.

At step 1010, hypervisor 124 receives configuration input 902 associated with a first PPU partition via guest environment 910. Guest environment 910 executes with a reduced permissions level, thereby allowing a guest user to only interact with the first PPU partition 600. Configuration input 902 specifies a target configuration of SMC engines 700 within the first PPU partition 600, including a desired size and arrangement of SMC engines 700. In one embodiment, the configuration input may be received from the guest user via the guest environment At step 1012, hypervisor 124 generates, via the "configure partition" command, one or more SMC engines 700 within the first PPU partition 600 based on configuration input 902 received at step 1010. A given SMC engine 700 can include compute and/or graphics resources derived from one sys pipe 230 and one or more GPCs 242 derived from one or more PPU slices 610. A given SMC engine 700 has access to at least a portion of a PPU memory partition 710 included in the PPU partition 600 where the SMC engine 700 resides, where that PPU memory partition 710 includes one or more sets of L2 cache slices and corresponding portions of DRAM 272.

At step 1014, hypervisor 124 distributes memory resources allocated to the first PPU partition 600 across the SMC engine(s) 700 generated at step 1012. As a general matter, the SMC engine(s) 700 share the first PPU memory partition 710, if those SMC engines 700 are included in the same PPU Partition 600. Allocations to each SMC engine 700 are provided to the contexts running on those SMC engines 700, and the allocations within the PPU memory partition 710 are implemented based on pages. In some embodiments, guest OS 916 of a VM performs step 1014 by distributing memory resources to contexts running on SMC engines 700 that are part of the PPU partition 600 belonging to the guest environment 910. In other embodiments, the hypervisor 124 performs a memory resource allocation 1014 for multiple VMs using a PPU partition 600, and each VM also distributes memory resources 1024 to contexts running on SMC engines 700.

At step 1016, hypervisor 124 distributes compute and/or graphics resources allocated to the first PPU partition 600 across the SMC engine(s) 700 generated at step 1012. Via the "configure partition" command, hypervisor 124 assigns a specific sys pipe 230 included in the guest PPU partition 600 to each SMC engine 700. Hypervisor 124 also assigns one or more GPCs 242 to each SMC engine 700. When steps 1010, 1012, 1014, and 1016 of the method 1000 are complete, the first PPU partition 600 is configured and the guest user can then initiate processing operations on the SMC engine(s) 700 within that PPU partition 600.

At step 1018, hypervisor 124 causes the first PPU partition 600 to time-slice one or more VMs across the SMC engine(s) 700 configured within the first PPU partition 600. The time-sliced VMs can operate independently from other VMs executing within the first PPU partition 600 and operate in isolation from other VMs executing within other PPU partitions 600. In one embodiment, the one or more VMs may be time-sliced concurrently across the SMC engine(s) 700. In this manner, the disclosed techniques allow a fractionalized PPU to support the parallel execution of processing tasks associated with multiple different processing contexts.

In some embodiments, the techniques disclosed herein operate in a non-virtualized system. Persons skilled in the art would recognize that a single OS usage model on a PPU 200, or a set of PPUs 200, can use all the mechanisms described in conjunction with VMs. In some embodiments, containers correspond to the description of VMs, which means containers on a single OS can attain the processing isolation afforded to VMs described herein.

Dividing Compute Resources to Support
Simultaneous Multiple Contexts

In various embodiments, when hypervisor 124 partitions PPU 200 on behalf of an admin user in the manner described above, hypervisor 124 receives input from the admin user that indicates various boundaries between PPU partitions 600. Based on this input, hypervisor 124 logically groups PPU slices 610 into PPU partitions 600, allocates various hardware resources to each PPU partition 600, and coordinates various other operations to support the simultaneous implementation of multiple processing contexts within a given PPU partition 600. Hypervisor 124 also performs additional techniques to support the migration of processing contexts between PPU partitions 600 configured on different PPUs 200. These various techniques are described in greater detail below in conjunction with FIGS. 11-18.

Figure 11:
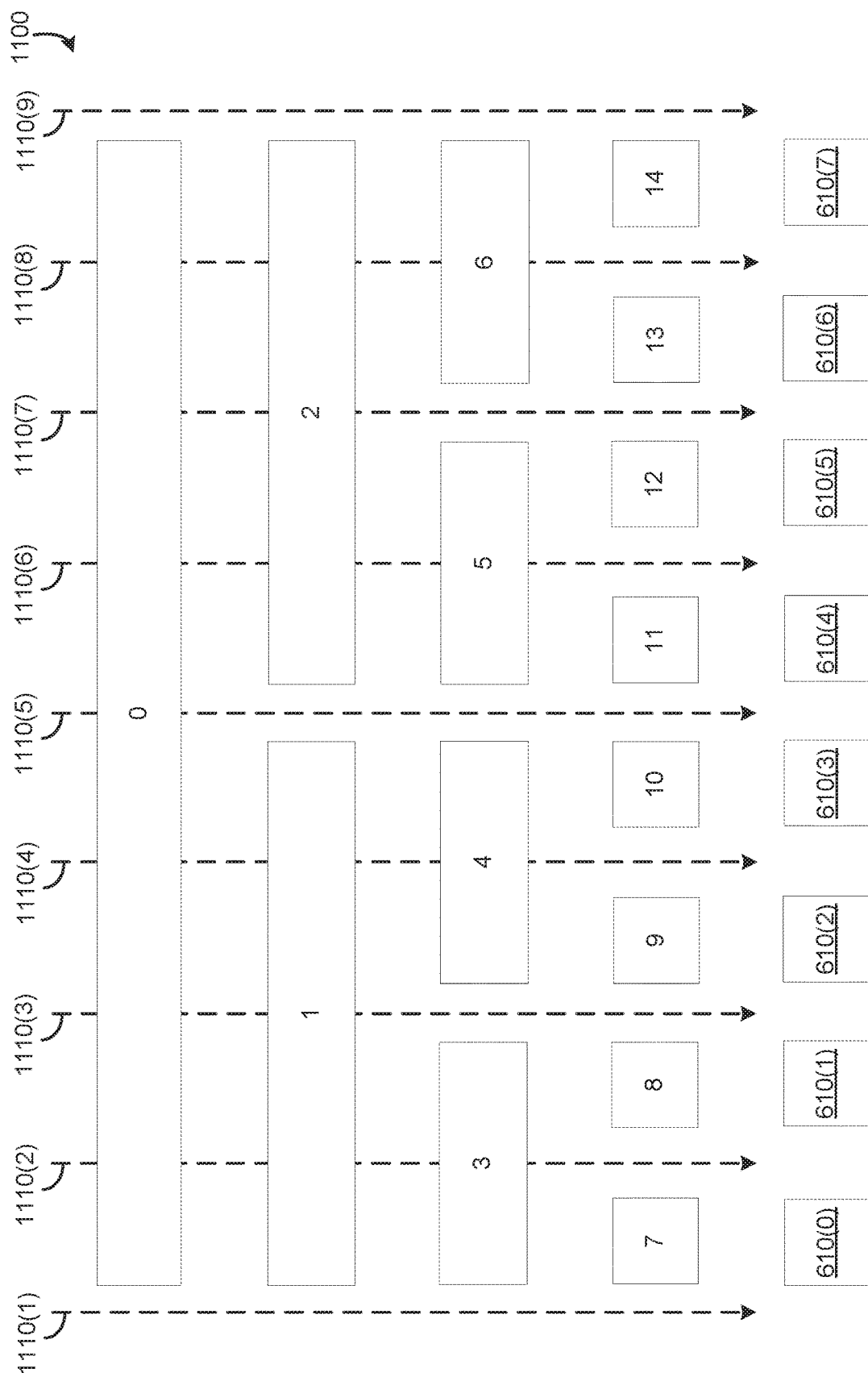
FIG. 11 illustrates a partition configuration table according to which the hypervisor of FIG. 1 can configure one or more PPU partitions, according to various embodiments.

FIG. 11 illustrates an embodiment of a partition configuration table according to which the hypervisor 124 of FIG. 1 can configure one or more PPU partitions, according to various embodiments. As shown, partition configuration table 1100 includes partition options 0 through 14. Partition options 0-14 are depicted above PPU slices 610. Each one of partition options 0-14 spans a different grouping of PPU slices 610 and, in this manner, represents a different possible PPU partition 600. In particular, partition option 0 spans PPU slices 610(0) through 610(7) and therefore represents a PPU partition 600 that includes all eight PPU slices 610. Similarly, partition option 1 spans PPU slices 610(0) through 610(3) and therefore represents a PPU partition 600 that includes only the first four PPU slices 610, similar to PPU partition 600(0) shown in FIGS. 6-7. Partition option 2 spans PPU slices 610(4) through 610(7) and therefore represents a PPU partition 600 that includes only the last four PPU slices 610. Partition options 3, 4, 5, and 6 span different groupings of two adjacent PPU slices 610, while partition options 7, 8, 9, 10, 11, 12, 13, and 14 span just one corresponding PPU slice 610.

Partition configuration table 1100 also includes boundary options 1110 that represent different possible locations for partition boundaries. Specifically, boundary options 1110(1) and 1110(9) represent the boundaries of partition option 0. Boundary options 1110(1) and 110(5) represent the boundaries of partition option 1, while boundary options 1110(5)

and 1110(9) represent the boundaries of partition option 2. Boundary options 1110(1), 1110(3), 1110(5), 1110(7), and 1110(9) represent boundaries associated with partition options 3, 4, 5, and 6. Boundary options 1110(1) through 1110(9) represent boundaries associated with partition options 7 through 14. It will be appreciated that persons skilled in the art can create many different schemes to achieve the same function as configuration table 1100, that might be a set of enable bits, a list of pre-defined choices, or any other form that allows for control of how PPU slices 610 can be partitioned into PPU partitions 600. Further, those skilled in the art will understand that partition configuration table 1100 can include any technically feasible number or entries other than those shown in FIG. 11.

During partitioning, hypervisor 124 or device driver 122 running at hypervisor level receives partitioning input from the admin user indicating specific partition options according to which PPU 200 should be partitioned. Hypervisor 124 or device driver 122 then activates a specific set of boundary options 1110 that logically isolate one or more groups of PPU slices 610 from one another in order to implement the desired partitioning, as described in greater detail by way of example below in conjunction with FIG. 12.

Figure 12:
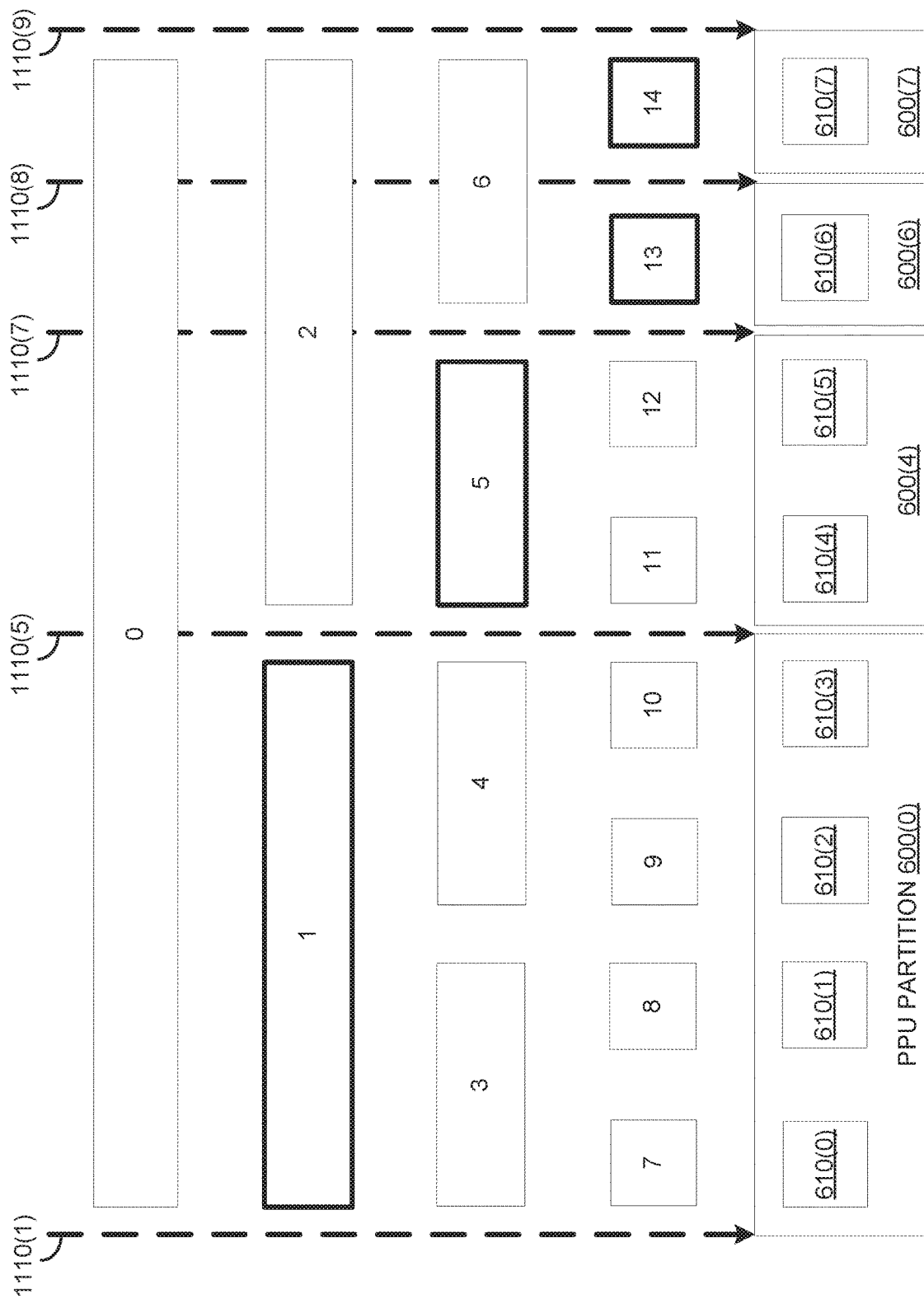
FIG. 12 illustrates how the hypervisor of FIG. 1 partitions a PPU to generate one or more PPU partitions, according to various embodiments.

FIG. 12 illustrates how the hypervisor 124 or device driver 122 of FIG. 1 partitions a PPU to generate one or more PPU partitions, according to various embodiments. As shown, during partitioning, hypervisor 124 or device driver 122 running at hypervisor level receives input from admin user indicating that PPU 200 should be partitioned according to partition options 1, 5, 13, and 14 (emphasized for clarity). In response, hypervisor 124 or device driver 122 activates boundary options 1110(1), 1110(5), 1110(7), 1110(8), and 1110(9) and deactivates the other boundary options in order to generate PPU partitions 600(0), 600(4), 600(6), and 600(7). This exemplary configuration of PPU partitions 600 is also shown in FIGS. 6-7.

Referring generally to FIGS. 11-12, hypervisor 124 or device driver 122 implements the above techniques by mapping each selection of a partition option to a particular binary value that is subsequently used to enable and disable boundary options 1110. The binary value associated with a given partition option is referred to herein as a "swizzle identifier" (swizID). The various swizIDs implemented by hypervisor 124 are tabulated below in Table 1:

TABLE 1

| Partition Option | SwizID |
|---|---|
| 0 | 11000000011 |
| 1 | 10000100011 |
| 2 | 11000100001 |
| 3 | 10000001011 |
| 4 | 10000101001 |
| 5 | 10010100001 |
| 6 | 11010000001 |
| 7 | 10000000111 |
| 8 | 10000001101 |
| 9 | 10000011001 |
| 10 | 10000110001 |
| 11 | 10001100001 |
| 12 | 10011000001 |
| 13 | 10110000001 |
| 14 | 11100000001 |

Hypervisor 124 activates or deactivates boundary options 1110 for a given partition option based on the swizID associated with the given partition option. For example, hypervisor 124 could activate boundary options 1110(1) and 1110(3) to configure PPU 200 according to partition option 3 based on the corresponding swizID, 10000001011. Bits 1 and 3 of this swizID activate boundary options 1110(1) and 1110(3), respectively, and bits 2 and 4-9 deactivate the remaining boundary options. Bits 0 and 10 of all swizIDs are set to one (1) to activate boundaries within L2 cache 400, as described in greater detail below in conjunction with FIGS. 19-20. Hypervisor 124 collects the various swizIDs for the different selected configuration options and computes an OR operation across all collected swizIDs to generate a configuration swizID that defines the configuration of PPU partitions 600. The configuration swizID indicates all boundary options 1110 that should be activated and deactivated in order to achieve the desired configuration of PPU partitions 600.

Persons skilled in the art will recognize that certain combinations of partition options are infeasible. For example, partition options 0 and 1 cannot be implemented in conjunction with one another because partition options 0 and 1 overlap one another. During partitioning, hypervisor 124 automatically detects infeasible combinations of partition options and corrects these combinations by modifying one or more partition options and/or corresponding swizIDs or omitting one or more partition options and/or corresponding swizIDs.

In addition, hypervisor 124 can dynamically detect hardware failures that cause certain partition options to be infeasible. For example, suppose PPU slice 610(0) includes a non-functional GPC 242 that is floorswept during fabrication and fused off. In this situation, a PPU partition 600 that only includes PPU slice 610(0) would lack sufficient computational resources to operate and would therefore be infeasible to implement. In this situation, hypervisor 124 would disallow the selection of partition option 7 and/or usage of the corresponding swizID because any PPU partition 600 configured according to that partition option would not be able to perform compute operations and would therefore not function correctly.

In some situations, hypervisor 124 may permit certain configuration options that include some amount of non-functional hardware so long as a PPU partition 600 configured according to such configuration options can still function to some degree. In the above example, hypervisor 124 could allow configuration option 3 to be selected so long as PPU slice 610(1) includes a functional GPC 242. Any PPU partition 600 configured according to configuration option 3 would still function but would include only half the computational resources compared to a similar PPU partition 600 that does not include any non-functional hardware.

Subsequent to partitioning PPU 200 in the manner described above, hypervisor 124 allocates various hardware resources to the resultant PPU partitions 600. Some of these resources are statically assigned to various PPU slices 610 and provide dedicated support for specific operations, while other resources are shared across different PPU slices 610 within the same PPU partition 600 or within different PPU partitions 600, as described in greater detail below in conjunction with FIG. 13.

Figure 13:
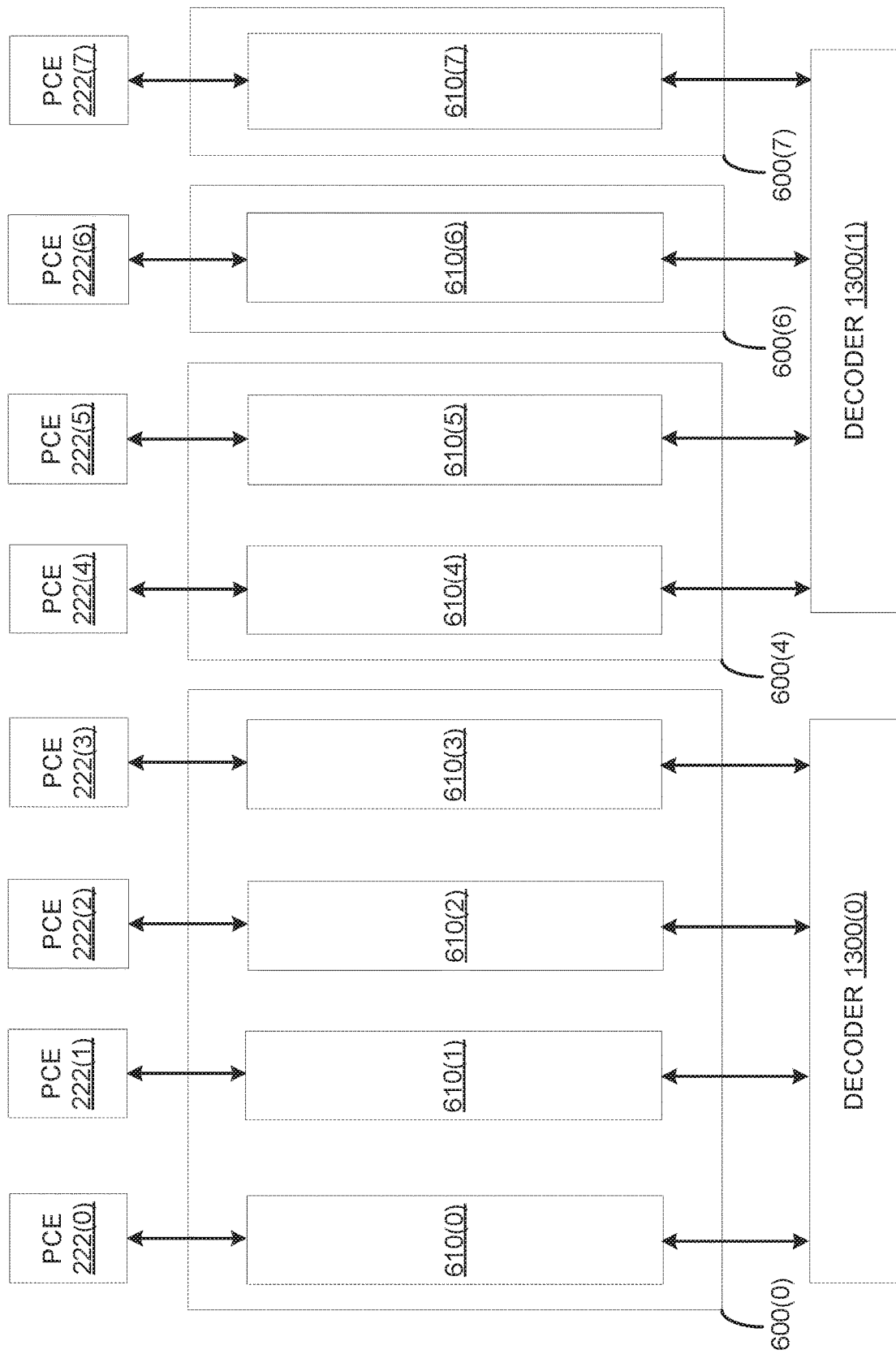
FIG. 13 illustrates how the hypervisor of FIG. 1 allocates various PPU resources during partitioning, according to various embodiments.

FIG. 13 illustrates how the hypervisor of FIG. 1 allocates various PPU resources during partitioning, according to various embodiments. As shown, PCEs 222(0) through 222(7) are coupled to PPU slices 610(0) through 610(7). In this example, PPU 200 includes a number of PCEs 222 that is equal to the number of PPU slices 610. Accordingly, hypervisor 124 can statically assign each PCE 222 to a different PPU slice 610 and configure those PCEs 222 to perform copy operations on behalf of the corresponding PPU slice 610 in a dedicated manner.

Other hardware resources included in PPU 200 cannot be statically assigned in the manner described above because those resources may be comparatively scarce. In the example shown, PPU 200 includes only two decoders 1300 that need to be allocated across eight PPU slices 610. Accordingly, hypervisor 124 dynamically assigns decoder 1300(0) to PPU slices 610(0) through 610(3) included in PPU partition 600(0). Hypervisor 124 also dynamically assigns decoder 1300(1) to PPU slices 610(4) and 610(5) included in PPU partition 600(4), PPU slice 610(6) included in PPU partition 600(6), and PPU slice 600(7) included in PPU partition 600(7).

In the configuration shown, decoder 1300(0) is dynamically assigned to perform decoding operations for PPU partition 600(0) in a dedicated manner but decoder 1300(1) is shared across PPU partitions 600(4), 600(6), and 600(7). In various embodiments, one or more performance monitors may manage the usage of hardware resources shared in the manner described in order to load balance resource usage across different PPU slices 610. Hypervisor 124 performs the above techniques in order to allocate any technically feasible resources of PPU 200 to PPU partitions 600.

When partitioning has been performed and the various resources of PPU 200 are statically or dynamically assigned to respective PPU slices 610, hypervisor 124 is ready to allow VMs to begin executing processing tasks within those PPU partitions 600. In so doing, VMs can simultaneously launch multiple processing contexts within a given PPU partition 600 in isolation from other processing contexts associated with other PPU partitions 600, as mentioned above and as described in greater detail below in conjunction with FIG. 14A-14B. PPU slices 610 that are not in use can be re-partitioned into other PPU partitions 600 while other PPU slices are in use in active PPU partitions 600.

Figure 14A:
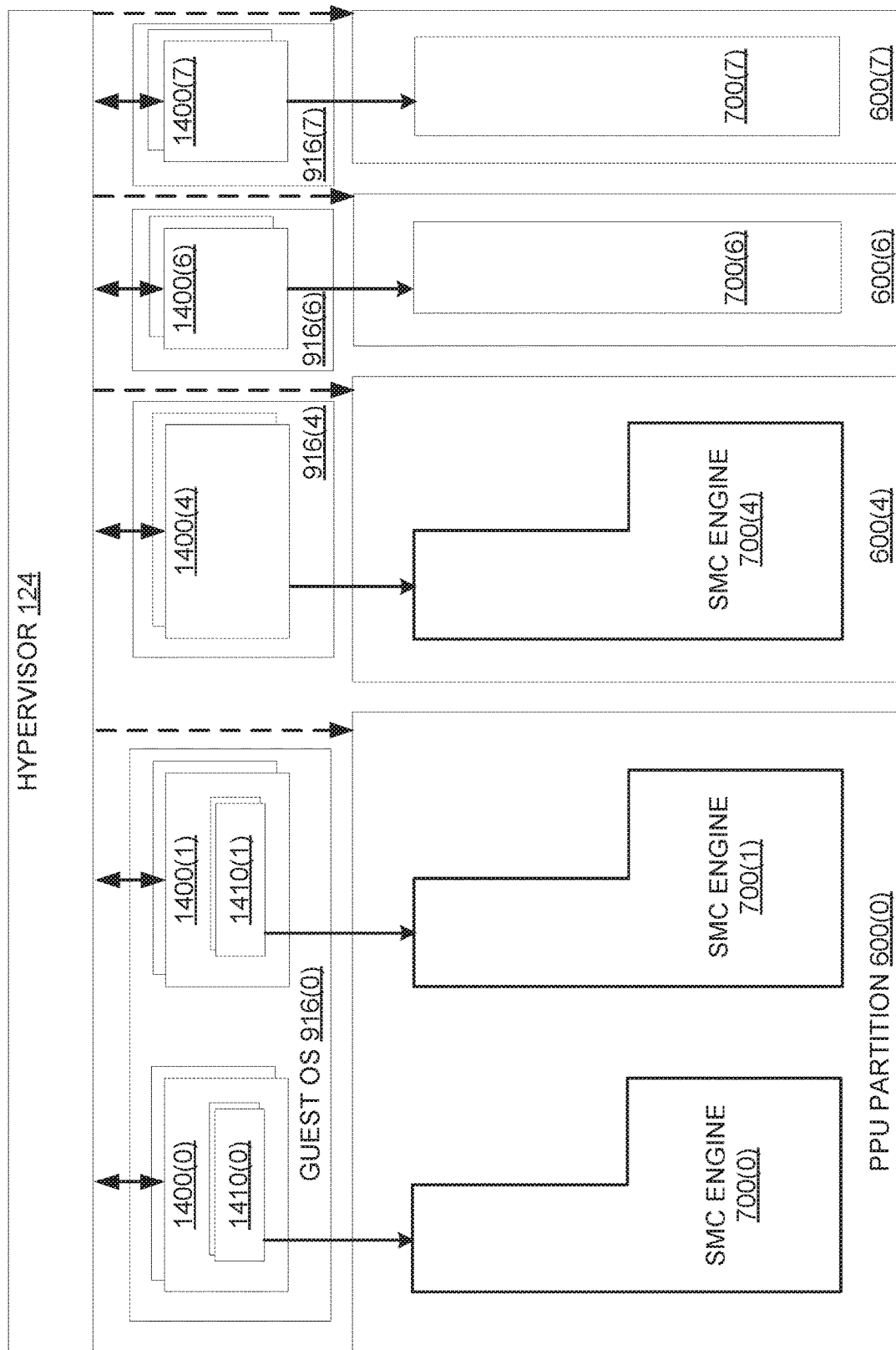
FIG. 14A illustrates how multiple guest OSs running multiple VMs launch multiple processing contexts simultaneously within one or more PPU partitions, according to various embodiments.

FIG. 14A illustrates how multiple guest OS 916 running multiple VMs launch multiple processing contexts simultaneously within one or more PPU partitions, according to various embodiments. As shown, guest OS 916 includes various processing contexts 1400 associated with different PPU partitions 600. Processing contexts 1400(0) and 1400(1) are associated with PPU partition 600(0) and can be launched on either SMC engine 700(0) or SMC engine 700(1). In some embodiments, once a processing context is assigned to an SMC engine 700, it remains on that smc engine 700 until completion. Processing context 1400(4) is associated with PPU partition 600(4) and can be launched on SMC engine 700(4). Processing contexts 1400(6) and 1400(6) are associated with PPU partitions 600(6) and 600(7), respectively, and can be launched on SMC engines 700(6) and 700(7), respectively.

As mentioned previously in conjunction with FIG. 7, each SMC engine 700 can execute processing tasks associated with a given processing context 1400 in isolation from other SMC engines 700 that execute processing tasks associated with any given processing context 1400. The processing tasks executed by a given SMC engine 700 in conjunction with a given processing context 1400 are scheduled independently of other processing tasks executed by other SMC engines 700 in conjunction with any other processing contexts 1400. Additionally, and as described in greater detail below in conjunction with FIGS. 15-16, SMC engines 700 can experience faults and/or errors independently of one another and can reset without disrupting the operation of other SMC engines 700.

Furthermore, each SMC engine 700 can be configured to execute processing tasks associated with one or more processing subcontexts 1410 that are included in and/or derived from a single parent processing context 1400. As is shown, a given processing context 1400(0) includes one or more processing subcontexts 1410(0) and a given processing context 1400(1) includes one or more processing subcontexts 1410(1). Hypervisor 124 configures processing subcontexts 1410 and respective device drivers. Processing subcontexts 1410 associated with a given parent processing context 1400 is launched on the same SMC engine 700 where the parent processing context 1400 is launched. Thus, in the example shown, processing subcontexts 1410(0) are launched on SMC engine 700(0) and processing subcontexts 1410(1) are launched on SMC engine 700(1). In one embodiment, each guest OS 916 may be able to configure a respective PPU partition 600 independently of hypervisor 124 and without being able to interfere with the configuring of other PPU partitions 600.

In certain embodiments where virtualization is not used, hypervisor 124 and guest OSs 916 may be absent and host OS 926 may configure and launch processing contexts 1400 and processing sub-contexts 1410, as described in greater detail below in conjunction with FIG. 14B.

Figure 14B:
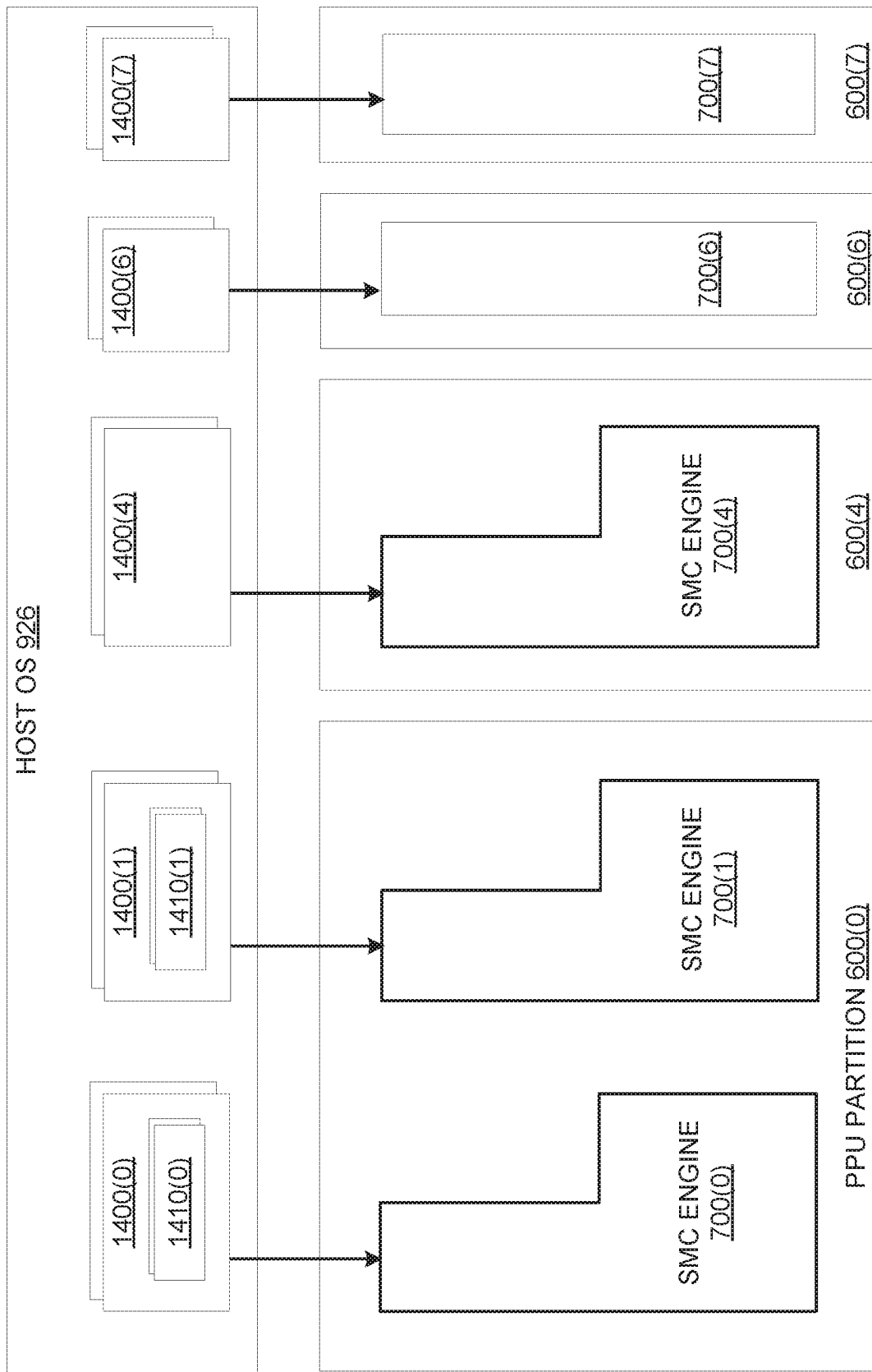
FIG. 14B illustrates how a host OS launches multiple processing contexts simultaneously within one or more PPU partitions, according to various embodiments.

FIG. 14B illustrates how a host OS launches multiple processing contexts simultaneously within one or more PPU partitions, according to various embodiments. As shown, host OS 926 includes processing contexts 1400 and processing subcontexts 1410. In the embodiment shown, host OS 926 is configured to launch processing contexts 1400 and processing subcontexts 1410 on SMC engines 700 without involvement of a hypervisor or other virtualization software. The embodiment shown may be implemented in a "bare metal" scenario.

Referring generally to FIGS. 14A-14B, processing tasks associated with processing subcontexts 1410 within the same parent processing context 1400 are generally not scheduled independently of one another and typically share the resources of a corresponding SMC engine 700. Further, processing subcontexts 1410 launched within a given SMC engine 700 can, in some situations, cause faults and/or errors that cause the SMC engine 700 to be reset any relevant processing contexts 1400 and/or processing subcontexts 1410 to be relaunched. Processing contexts 1400 and/or processing subcontexts 1410 are assigned a local virtual address space identifier that is derived from a global virtual address space identifier 1510 associated with PPU 200 as a whole, as described in greater detail below in conjunction with FIG. 15.

In some embodiments, there is no virtualization, and therefore no hypervisor, but it is clear to those in the art, that a single OS usage model on a PPU 200, or set of PPUs 200, can use all the mechanisms described as belonging to VMs. In some embodiments, containers correspond to the description of VMs, which means containers on a single OS can attain the processing isolation afforded to VMs in the descriptions herein. Examples of containers are LXC (LinuX Containers) and Docker container, as they are known in the computer industry. For example, each Docker container can correspond to one PPU Partition 600, so the present invention provides isolation between multiple Docker containers running under one OS.

Figure 15:
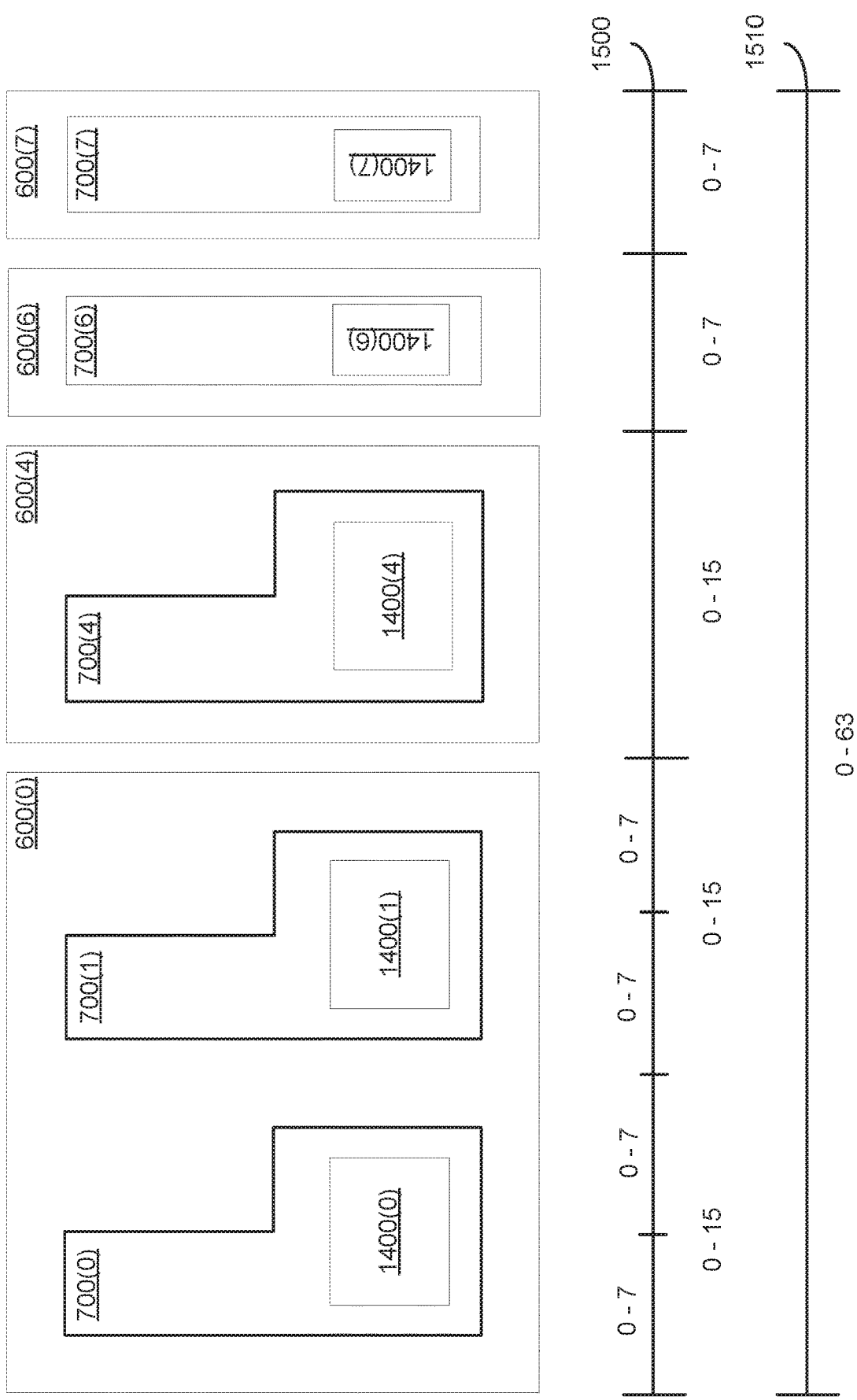
FIG. 15 illustrates how the hypervisor of FIG. 1 allocates virtual address space identifiers to different SMC engines, according to various embodiments.

FIG. 15 illustrates how the hypervisor of FIG. 1 allocates virtual address space identifiers to different SMC engines, according to various embodiments. As shown, virtual address space identifiers 1500 include a separate range of virtual addresses for each SMC engine 700. Each range of virtual addresses begins at zero (0) to maintain consistency across SMC engines 700 but each range of virtual addresses corresponds to a different portion of global virtual address space identifiers 1510. For example, virtual address space identifiers 0-15 assigned to SMC engine 700(0) correspond to global virtual address space identifiers 0-15, but virtual address space identifiers 0-15 assigned to SMC engine 700(1) correspond to global virtual address space identifiers 16-31. In one embodiment, global set of virtual address space 1510 may be a virtual address space or a physical address space. In some embodiments, there is also a per-PPU-partition virtual address space identifier, in order for the guest OS of a VM to have a zero-based set of virtual address space identifier for all the SMC engines 700 it owns.

Hypervisor 124 assigns a certain range of virtual address space identifiers to a given SMC engine 700 depending on the number of PPU slices 610 from which the SMC engine 700 is allocated resources. In the example shown, hypervisor 124 assigns virtual address space identifiers 0-15 to SMC engine 700(0), virtual address space identifiers 0-15 to SMC engine 700(1), and virtual address space identifiers 0-15 to SMC engine 700(4). Hypervisor 124 assigns SMC engines 700(0), 700(1), and 700(4) 16 virtual address space identifiers because these SMC engines draw resources from two PPU slices 610, as shown in FIG. 7. By contrast, hypervisor 124 assigns virtual address space identifiers 0-7 to SMC engines 700(6) and 700(7) because these SMC engines 700 draw resources from just one PPU slice 610 each. Hypervisor 124 can further subdivide the virtual address space identifiers assigned to a given SMC engine 700 in order to support multiple processing contexts 1400. For example, hypervisor 124 could subdivide virtual address space identifiers 0-15 assigned to SMC engine 700(0) into two ranges, 0-7 and 0-7, each of which could be assigned to a different processing context 1400. This example shows how global virtual address space identifiers 1510 are proportionally distributed in groups as 0-15, 16-31, 32-47, 48-55, and 55-63. In some embodiments, virtual address space identifiers are unique, so the above example would have virtual space identifier 0-15, 16-31, 32-47, 48-55, and 55-63, rather than 0-15, 0-15, 0-15, 0-7 and 0-7 as shown in FIG. 15. In some embodiments, the global virtual address space identifiers 1510 are not allocated in proportion to number of PPU slices 610, and the hypervisor is free to allocate any subset of the global virtual address space identifiers 1510 to PPU partitions 600 or SMC engines 700.

Hypervisor 124 allocates virtual address space identifiers in the manner described to allow different SMC engines 700 to execute processing tasks associated with any given processing context 1400 without needing to remap virtual addresses specified by those processing tasks. Accordingly, hypervisor 124 can dynamically migrate processing contexts 1400 between SMC engines 700 without significant alterations to those processing contexts. During execution of various processing tasks associated with a given processing context 1400, any given SMC engine 700 can occasionally experience faults and is configured to report these faults using the locally assigned virtual addresses, as described in greater detail below in conjunction with FIG. 16. After migration has occurred, the migrated processing context still uses the same virtual address space identifiers 1500, but these might correspond to different global virtual address space identifiers 1510.

Figure 16:
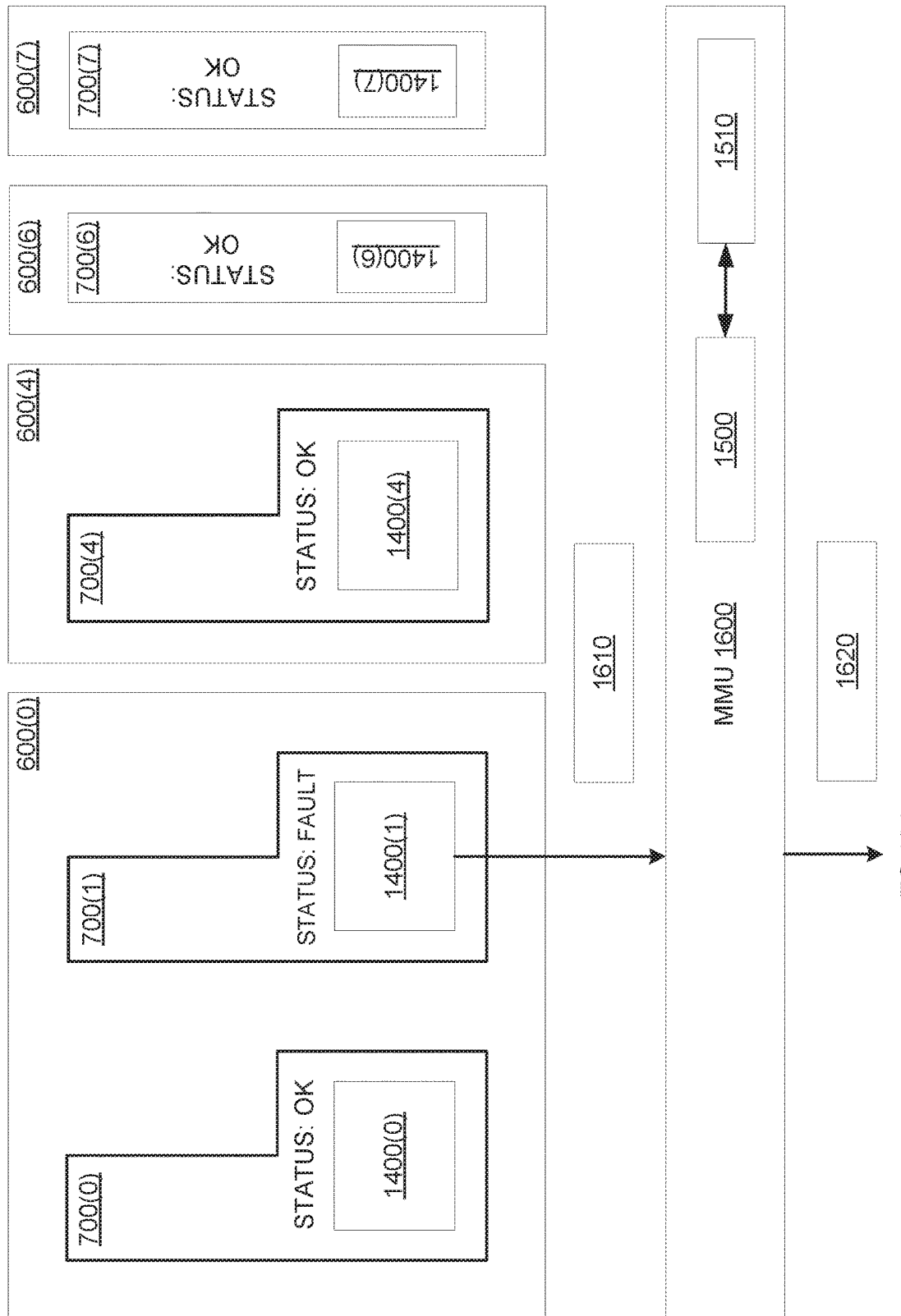
FIG. 16 illustrates how a memory management unit translates local virtual address space identifiers when mitigating faults, according to various embodiments.

FIG. 16 illustrates how a memory management unit translates local virtual address space identifiers 1500 to global virtual address space identifiers 1510 when mitigating faults, according to various embodiments. As shown, during execution, SMC engines 700 can experience faults and/or errors and crash independently of one another, as previously discussed. In the example shown, SMC engine 700(1) experiences an error, and causing the output of a local fault identifier 1610 to a memory management unit (MMU) 1600. An access by an SMC engine 700 to an unmapped page can cause MMU to generate a fault, also causing a local fault identifier.

MMU 1600 maintains a mapping between local virtual address space identifiers 1500 and global virtual address space identifiers 1510. Based on this mapping, MMU 1600 generates a global fault identifier 1620 and transmits global fault identifier 1620 to guest OS 916(0). In response to receiving global fault identifier 1620, guest OS 916(0) can reset SMC engine 700(1) without disrupting the operation of any other SMC engines 700 and then re-launch processing context 1400(1). With this approach, each SMC engine 700 operates with different sets of virtual address space identifiers that begin at zero and span potentially similar ranges but correspond to different portions of global memory. Accordingly, global virtual address space identifier 1510 can be divided across SMC engines 700 but preserve the appearance of a dedicated address space. In some embodiments, the fault identifiers 1620 can be zero-based for the entire PPU partition 600. In other embodiments, the fault identifier 1620 can be an identifier for the SMC engine 700 and the virtual address space identifier 1500.

In one embodiment, global fault identifiers 1620 may be reported to hypervisor 124 and hypervisor 124 may perform various operations to resolve the associated faults. In another embodiment, some types of faults may be reported to the associated guest OS 916 and other types of faults, such as hard errors that occur within top section 810 or bottom section 830 of DRAM 272, may be reported to hypervisor 124. In response to such faults, hypervisor 124 may reset some or all SMC engines 700. In various other embodiments, a given global fault identifier 1620 may be virtualized and therefore not correspond directly to a true global identifier. In operation, MMU 1600 may route faults to appropriate VMs based on the GFIDs associated with those VMs. GFIDs are discussed above in conjunction with FIG. 7.

Referring generally to FIGS. 15-16, hypervisor 124 can implement analogous techniques to those described above to assign identifiers to various hardware resources associated with each PPU partition 600 and/or each SMC engine 700. For example, hypervisor 124 could assign each GPC 242 included in a given PPU partition 600 a local GPC identifier (GPC ID) from a range of local GPC IDs that begins with zero (0). Each local GPC ID would correspond to a different global GPC ID. This approach can be implemented with any PPU resource in order to maintain a set of identifiers that is internally consistent within any given PPU partition 600 and/or SMC engine 700. As mentioned, this approach facilitates migration of processing contexts 1400 between SMC engines 700 and further permits processing contexts 1400 to be migrated between different PPUs 200.

When hypervisor 124 migrates a processing context 1400 between different SMC engines 700 that reside on different PPUs 200, hypervisor 124 performs a technique referred to herein as "soft floorsweeping" in order to configure a target PPU 200 with similar hardware resources as the source PPU 200, as described in greater detail below in conjunction with FIG. 17.

Figure 17:
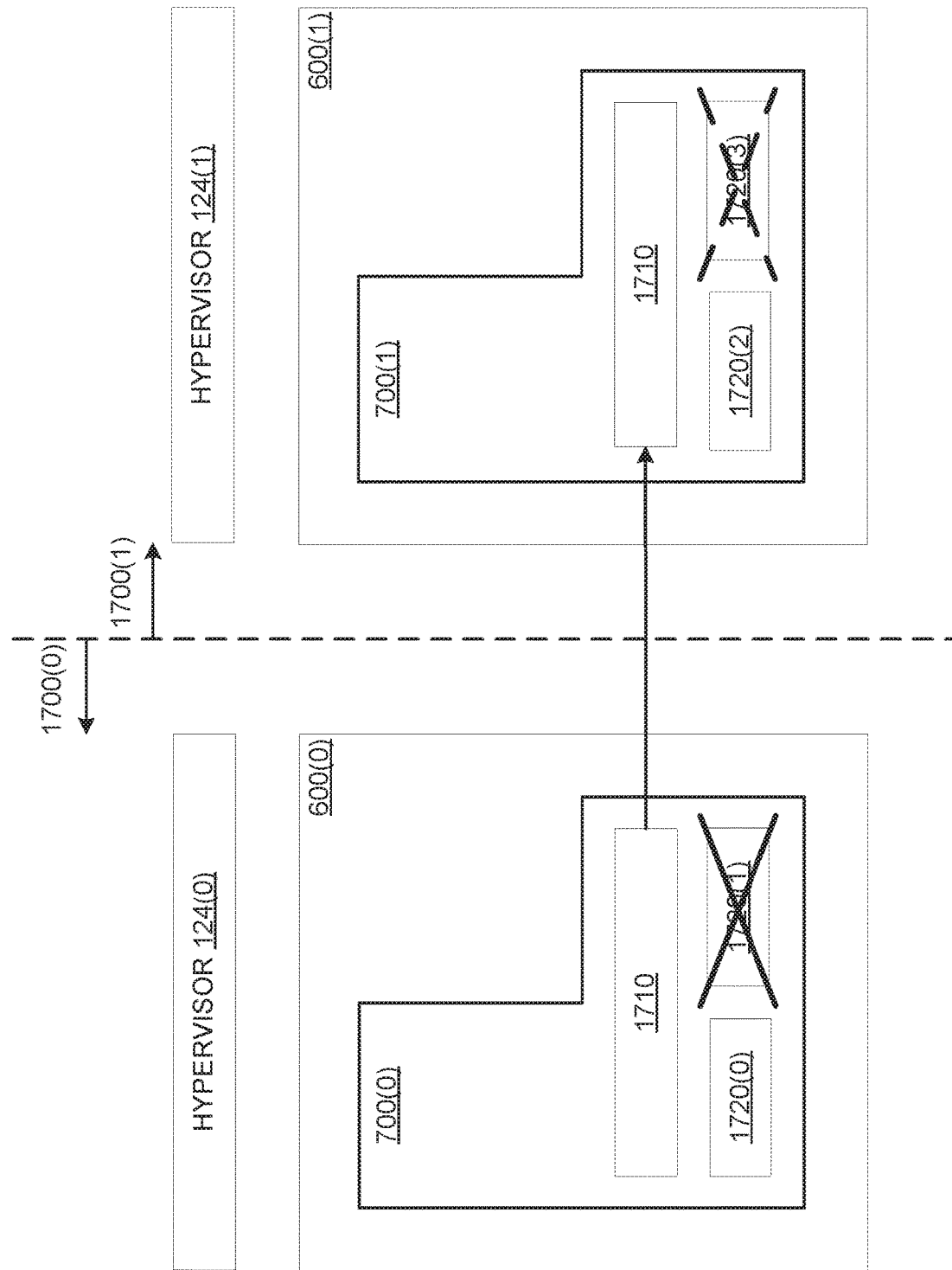
FIG. 17 illustrates how the hypervisor of FIG. 1 implements soft floorsweeping when migrating a processing context between SMC engines on different PPUs, according to various embodiments.

FIG. 17 illustrates how the hypervisor of FIG. 1 implements soft floorsweeping when migrating a processing context between SMC engines on different PPUs, according to various embodiments. As shown, a computing environment 1700(0) includes an instance of hypervisor 124(0) and a PPU partition 600(0). PPU partition 600(0) is configured with an SMC engine 700(0). SMC engine 700(0) executes processing tasks associated with a processing context 1710. SMC engine 700(0) is allocated resources 1720(0) and 1720(1), but resource 1720(1) is non-functional. As such, during fabrication, resource 1720(1) is fused off ("floorswept"). Resources 1720 can be any of the computational, graphics, or memory resources described thus far. For example, a given resource 1720 could be a GPC 242, a TPC 330 within a GPC 242, an SM 332 within a TPC 330, a GFX FE 542, or an L2 cache slice 800, among others.

Under various circumstances, hypervisor 124(0) can determine that processing context 1710 should be migrated out of computing environment 1700(0) to computing environment 1700(1). For example, computing environment 1700(0) could be scheduled for planned downtime, and in order to maintain continued service, hypervisor 124(0) determines that processing context 1710 should be at least temporarily migrated to a different computing environment while computing environment 1700(0) is unavailable.

In such situations, hypervisor 124(0) interacts with a corresponding hypervisor 124(1) that executes in computing environment 1700(1) to configure a PPU partition 600(1) to offer the same or similar resources as PPU partition 600(0). As is shown, PPU partition 600(1) includes resources 1720 (2) and 1720(3), but 1720(3) is made unavailable in order to mimic the amount of resources afforded by PPU partition 600(0). As such, processing context 1710 can be migrated from SMC engine 700(0) within PPU partition 600(0) to SMC engine 700(1) within PPU partition 600(1) without a noticeable change in quality of service. This approach helps maintain the appearance that any given PPU partition 600 operates in like fashion to PPU 200 by providing access to a consistent set of resources while also permitting processing contexts to be migrated across different hardware. Hypervisor 124 can implement the above approach to migrate SMC engines 700 between partitions 600 within the same PPU 200, as well. In one embodiment, hypervisors 124(0) and 124(1) may execute as a unified software entity that manages the operation of multiple PPUs 200 in different computing environments 1700.

Referring generally to FIGS. 11-17, hypervisor 124 implements the above techniques to divide PPU resources in a manner that supports the execution of processing tasks associated with multiple processing contexts simultaneously. These techniques are described in greater detail below in conjunction with FIG. 18.

Figure 18:
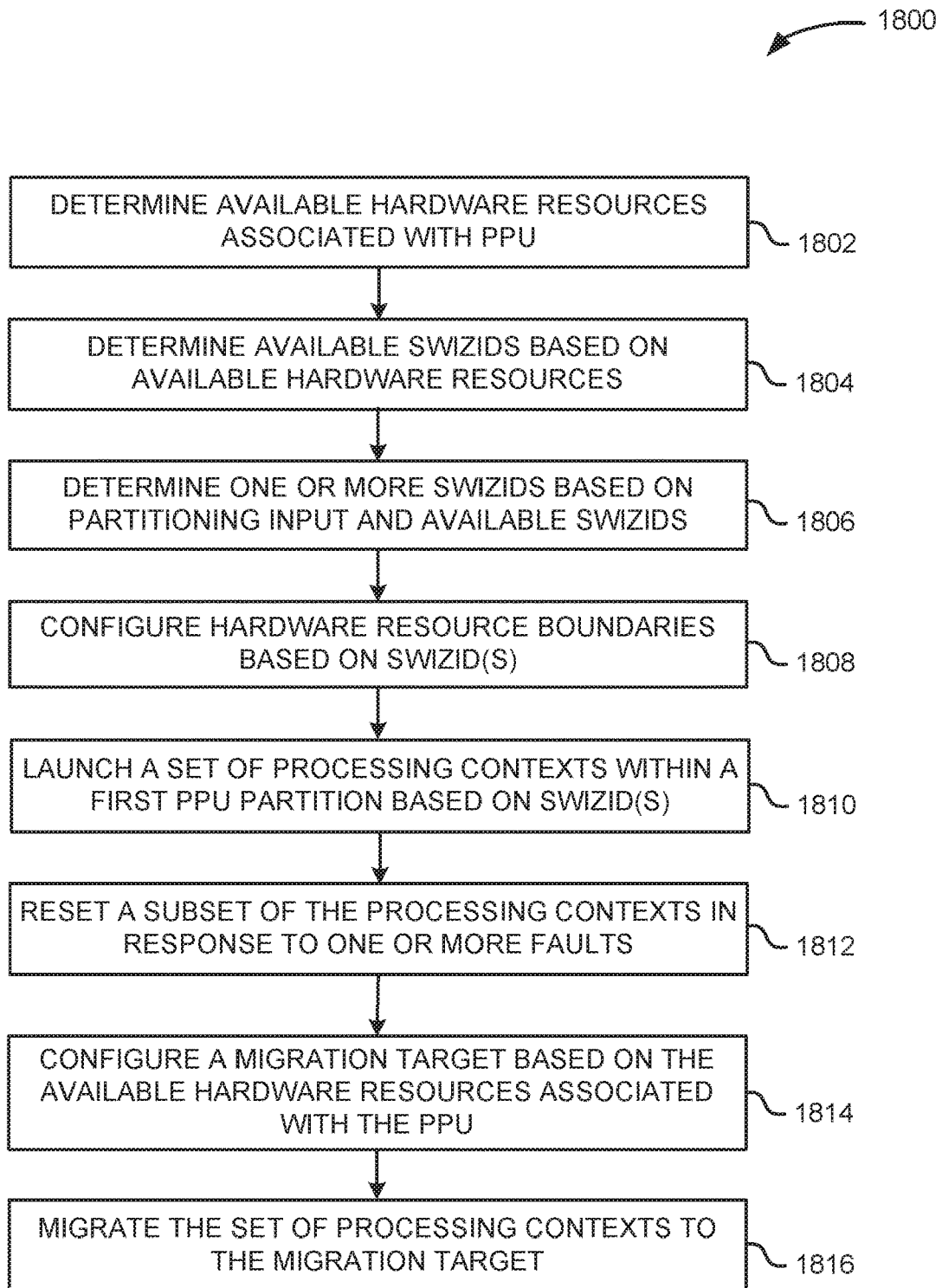
FIG. 18 is a flow diagram of method steps for configuring compute resources within a PPU to support operations associated with multiple processing contexts simultaneously, according to various embodiments.

FIG. 18 is a flow diagram of method steps for configuring compute resources within a PPU to support operations associated with multiple processing contexts simultaneously, according to various embodiments. Although the method steps are described in conjunction with the systems of FIGS. 1-17, persons skilled in the art will understand that any system configured to perform the method steps in any order falls within the scope of the present embodiments.

As shown, a method 1800 begins at step 1802, where hypervisor 124 of FIG. 1 evaluates PPU 200 to determine a set of available hardware resources. Certain hardware resources are sometimes not fabricated correctly during fabrication of a given PPU 200 and can be non-functional. In practice, these non-functional hardware resources are fused off and not used. However, other hardware resources within the given PPU 200 are functional and so that PPU 200 as a whole can still operate, albeit with lower performance. Salvaging partially functional PPUs and other types of units in the manner described is known in the art as "floorsweeping."

At step 1804, hypervisor 124 determines a set of available swizIDs based on the available hardware resources determined at step 1802. As described above in conjunction with FIG. 11, a given swizID defines a set of hardware boundaries that can be enabled and disabled to isolate different groups of PPU slices 610 within PPU 200 to form PPU partitions 600. In situations where certain hardware resources are unavailable, hypervisor 124 determines that some swizIDs correspond to infeasible partition configurations and should be made unavailable.

At step 1806, hypervisor 124 generates a set of swizIDs based on partitioning input. For example, hypervisor 124 could receive input from the admin user indicating a set of partition options and then map those partition options to a corresponding set of swizIDs derived from the set of available swizIDs determined at step 1804. Alternatively, hypervisor 124 could receive the set of swizIDs directly from the admin user and then modify any of these swizIDs that are not included in the set of available swizIDs.

At step 1808, hypervisor 124 configures a set of boundaries between hardware resources based on the set of swizIDs generated at step 1806. In doing so, hypervisor 124 computes a logical OR across the set of swizIDs to generate a configuration swizID (or "local" swizID) that indicates which boundary options should be activated as boundaries and which boundary options should be deactivated. An exemplary set of partition options and corresponding boundary options is described above in conjunction with FIG. 12.

At step 1810, a guest OS 916 launches a set of processing contexts within a PPU partition 600 that is assigned to a guest user based, at least in part, on the one or more swizIDs. Hypervisor 124 allocates a set of virtual address space identifiers 1500 to the PPU partition 600 that corresponds to a portion of global virtual address space identifiers 1510 of FIG. 15. Hypervisor 124 or an SMC engine 700 within that PPU partition 600 can subdivide the set of virtual address space identifier 1500 into different ranges that are in turn assigned to different processing contexts. This approach allows each processing context to operate with a consistent set of virtual address spaces across all SMC engines 700, thereby allowing processing contexts to be migrated more easily.

At step 1812, hypervisor 124 or the corresponding guest OS 916 resets a subset of the processing contexts launched at step 1810 in response to one or more faults. The faults could occur at the execution unit level, at the SMC engine level, or at a VM level, among others. Importantly, faults generated during execution of processing tasks associated with one processing context generally do not affect the execution of processing tasks associated with other processing contexts. This fault isolation between processing contexts specifically addresses issues found in prior art approaches that rely on processing subcontexts. Optionally, between steps 1810 and 1812, a debugger can be invoked to control the SMC engine 700 that has encountered a fault.

At step 1814, hypervisor 124 configures a migration target based on the available hardware resources associated with the PPU 200. The migration target can be another PPU 200 but in some situations the migration target 200 is another SMC 700 within a given PPU partition 600 or another PPU partition 600 within the PPU 200. When configuring the migration target, hypervisor 124 may perform a technique referred to herein as "soft floorsweeping" in order to cause the migration target to provide similar hardware resources as those utilized by the set of processing contexts.

At step 1816, hypervisor 124 migrates the set of processing contexts to the migration target. Processing tasks associated with those processing contexts can continue with little or no interruption and with similar available hardware resources. Accordingly, these techniques permit the delivery of a balanced quality of service under circumstances where processing contexts need to be moved across different PPU partitions 600 or different PPUs 200.

Referring generally to FIGS. 11-18, hypervisor 124, guest OSs 916, and/or host OS 926 performs the disclosed techniques to divide the various compute resources associated with PPU 200 into isolated and independent PPU partitions 600 within which different processing contexts can be simultaneously active. Accordingly, resources of PPU 200 can be more efficiently utilized compared to conventional approaches that support one processing context at a time that may not fully utilize the PPU. The different PPU partitions 600 can also be accessed and configured by multiple different tenants independently of one another. Thus, the disclosed techniques provide robust support for multitenancy and can therefore satisfy consumer demand for an efficient cloud-based parallel processing platform.

Dividing Memory Resources to Support Simultaneous Multiple Contexts

In addition to partitioning compute resources associated with PPU 200 to support multiple processing contexts simultaneously, hypervisor 124 also partitions memory resources associated with PPU 200 to support multiple contexts simultaneously and therefore provide robust support for multitenancy. Hypervisor 124 implements various techniques when partitioning memory resources associated with PPU 200 that are described in greater detail below in conjunction with FIGS. 19-24.

Figure 19:
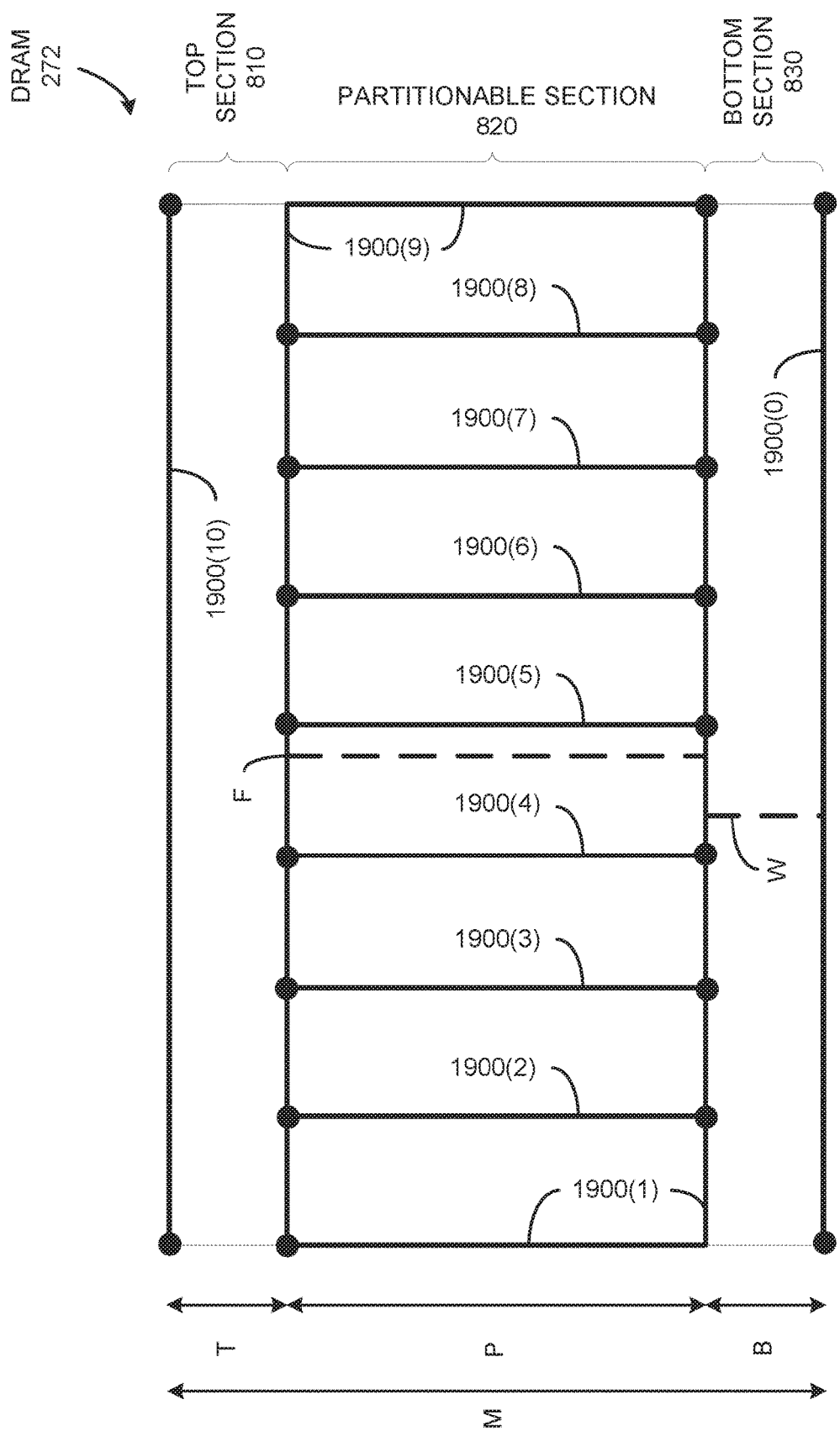
FIG. 19 illustrates a set of boundary options according to which the hypervisor of FIG. 1 can generate one or more PPU memory partitions, according to various embodiments.

FIG. 19 illustrates a set of boundary options according to which the hypervisor of FIG. 1 can generate one or more PPU memory partitions, according to various embodiments. As shown, DRAM 272 includes a set of boundary options 1900 that can be activated during partitioning to divide L2 cache into various sections and partitions.

In particular, boundary options 1900(0), 1900(1), 1900(9), and 1900(10) divide DRAM 272 into top section 810, partitionable section 820, and bottom section 830 of FIG. 8A. Boundary option 1900(0) forms the lower boundary of bottom section 830, and boundary option 1900(1) forms the upper boundary of bottom section 830. Boundary option 1900(1) also forms the lower boundary of partitionable section 820 as well as the left-hand boundary of partitionable section 820. Boundary option 1900(9) forms the right-hand boundary of partitionable section 820 as well as the upper boundary of partitionable section 820. Boundary option 1900(9) also forms the lower boundary of top section 810, and boundary option 1900(10) forms the upper boundary of top section 810. Boundary options 1900(1) through 1900(8) further subdivide partitionable section 820 into various memory partitions that are described in greater detail below in conjunction with FIG. 20.

As also shown, DRAM 272 has a total size of M, top section 810 has a total size of T, partitionable section 820 has a total size of P, and bottom section 830 has a total size of B. Further, the portion of a given cache slice that corresponds to partitionable section 820 is given by F, and the portion of the given cache slice that corresponds to bottom section is given by W. F and W are configurable parameters that can be set via hypervisor 124 and which, in some embodiments, may fully constrain the values of T, P, and B relative to M.

During configuration, hypervisor 124 configures DRAM 272 into top section 810, partitionable section 820, and bottom section 830 based on M, F, and W. In doing so, hypervisor 124 determines values for T, P and B based on the values of M, F, and W. Hypervisor 124 also activates specific boundary options 1900 based on the configuration swizID generated via interactions with the admin user, as described above in conjunction with FIGS. 11-12. An exemplary activation of boundary options 1900 is described below in conjunction with FIG. 20.

Figure 20:
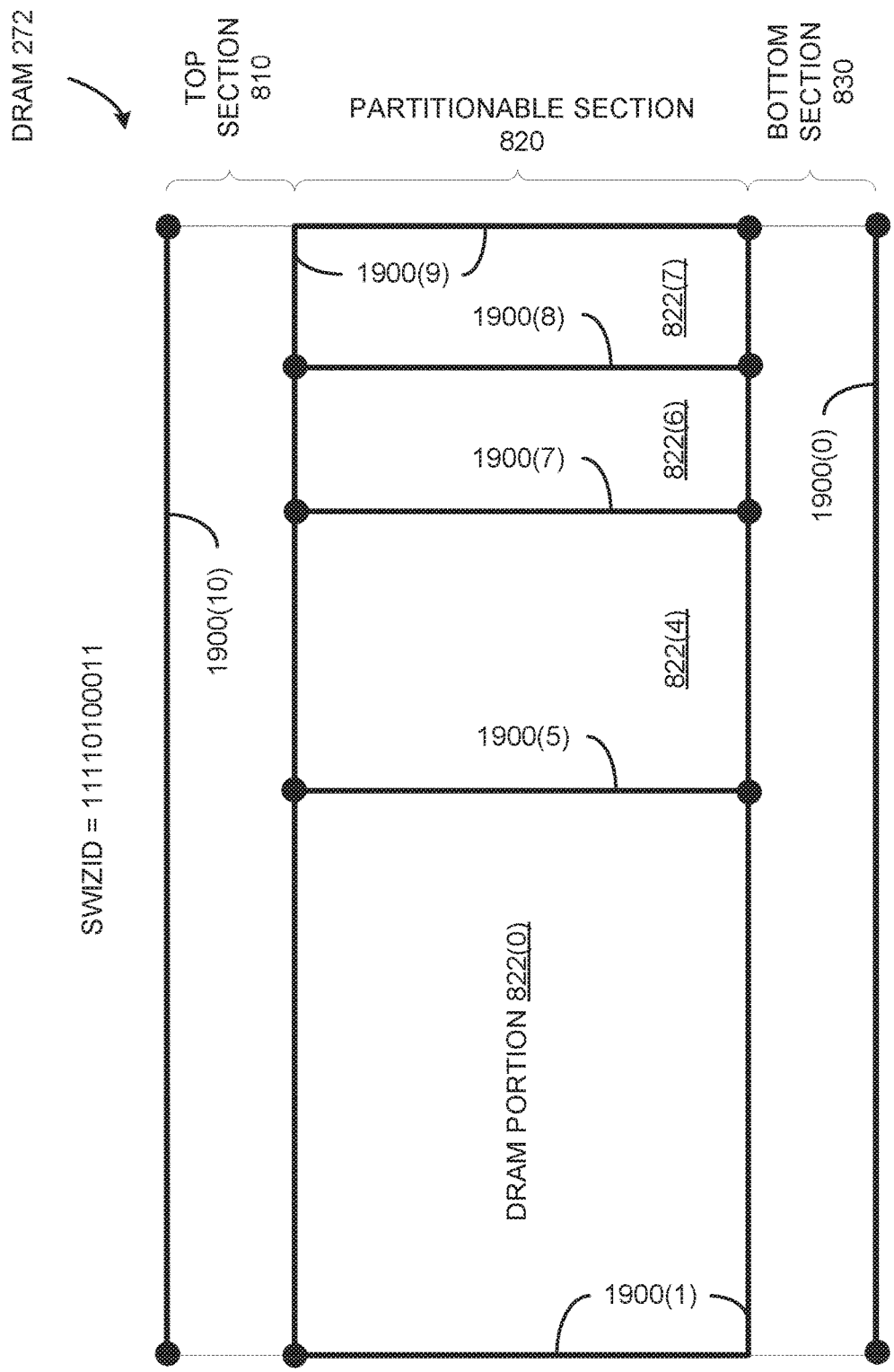
FIG. 20 illustrates an example of how the hypervisor of FIG. 1 partitions PPU memory to generate one or more PPU memory partitions, according to various embodiments.

FIG. 20 illustrates an example of how the hypervisor of FIG. 1 partitions PPU memory to generate one or more PPU memory partitions, according to various embodiments. As shown, boundary options 1900(0), 1900(1), 1900(9), and 1900(10) are activated, thereby forming top section 810, partitionable section 820, and bottom section 830 of DRAM 272. Boundary options 1900(1), 1900(5), 1900(7), and 1900(8) are also activated, thereby forming PPU memory partitions 710(0), 710(4), 710(6), and 710(7) corresponding to DRAM portions 822(0), 822(4), 822(6), and 822(7), respectively, within partitionable section 820. Boundary options 1900(2), 1900(3), 1900(4), and 1900(6) are not activated and have therefore been omitted. Hypervisor 124 configures DRAM 272 in the manner shown based on a configuration swizID that is equal to "11110100011."

Boundary options 1900 associated with DRAM 272 logically correspond to boundary options 1110 shown in FIGS. 11-12. As discussed above in conjunction with FIGS. 11-12, each bit of a given configuration swizID indicates whether a corresponding boundary option 1110 should be activated or deactivated to group together PPU slices 610. In like fashion, as shown here in FIG. 20, each bit of the exemplary configuration swizID "11110100011" indicates whether a corresponding boundary option 1900 associated with DRAM 272 should be activated or deactivated.

Bits 0 and 10 of the exemplary swizID are set to one by default to activate boundary options 1900(0) and 1900(10). Bits 1 and 9 of the exemplary swizID are set to one to activate boundary options 1900(1) and 1900(9) and establish partitionable section 820. Bits 5, 7, and 8 of the exemplary swizID are set to one to activate boundary options 1900(5), 1900(7), and 1900(8) and divide partitionable section 820 into DRAM portions 822 associated with PPU memory partitions 710. The other bits of the swizID are set to zero to deactivate the corresponding boundary options. The partitioning of DRAM 272 shown here corresponds to the exemplary configuration of PPU slices 610 shown in FIG. 12. Once partitioned in this manner via hypervisor 124, SMC engines 700 executing within PPU partitions 600 can perform memory access operations via L2 cache slices 800 in the manner described below in conjunction with FIGS. 21-23.

Figure 21:
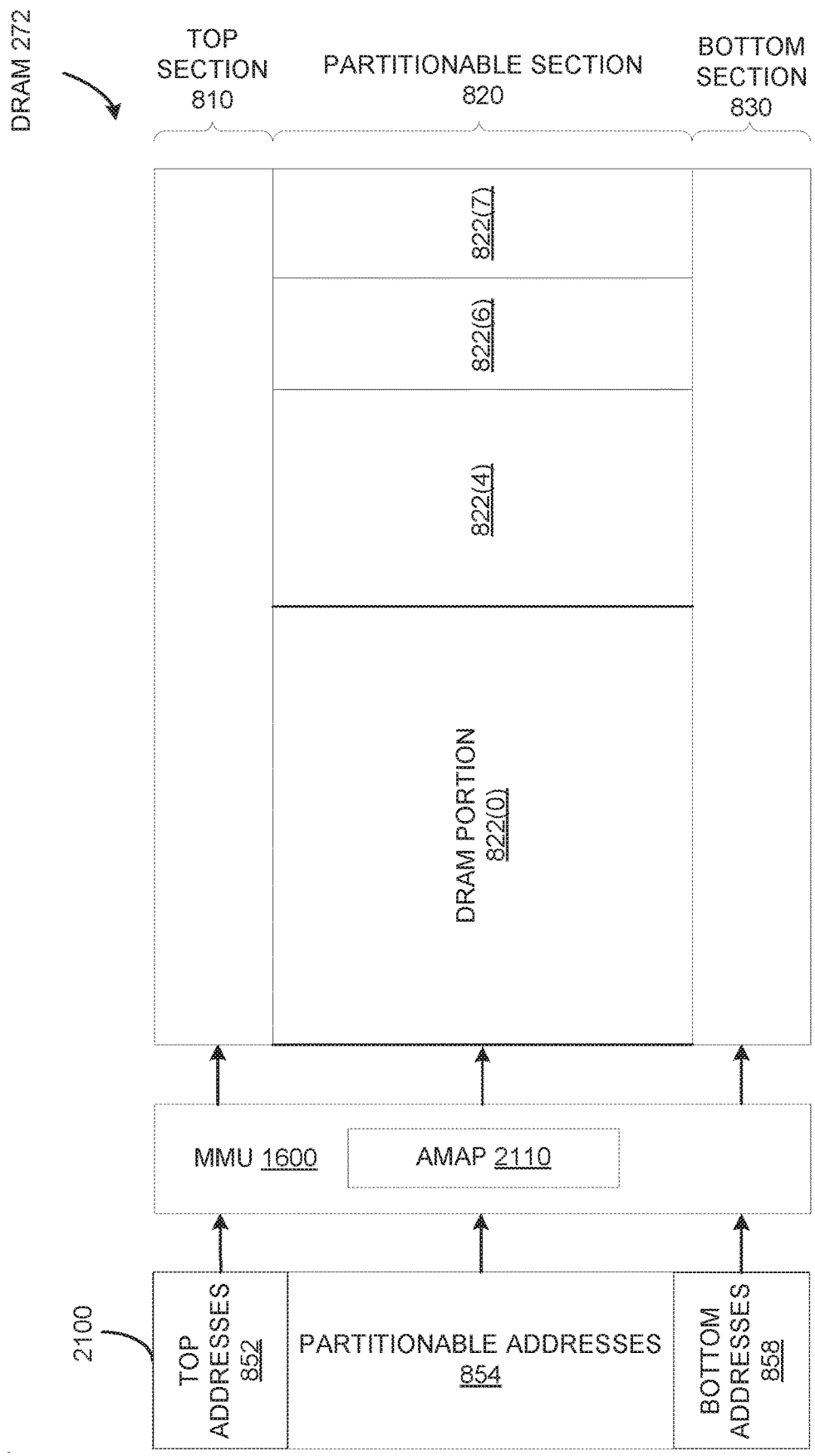
FIG. 21 illustrates how the memory management unit of FIG. 16 provides access to different PPU memory partitions, according to various embodiments.

FIG. 21 illustrates how the memory management unit of FIG. 16 provides access to different PPU memory partitions, according to various embodiments. As shown, MMU 1600 of FIG. 16 is coupled between DRAM 272 and 1D SPA space 850. 1D SPA space 850 is divided into top addresses 852 that correspond to top section 810, partitionable addresses 854 that correspond to partitionable section 820, and bottom addresses 856 that correspond to bottom section 830, as also shown in FIG. 8B. During partitioning, hypervisor 124 generates 1D SPA space 850 based on the configuration of DRAM 272.

MMU 1600 includes an address mapping unit (AMAP) 2110 that is configured to map top addresses 852, partitionable addresses 854, and bottom addresses 858 into raw addresses associated with top section 810, partitionable section 820, and bottom section 830, respectively. In this manner, MMU 1600 services memory access requests received from hypervisor 124 that target top section 810 and/or bottom section 830 as well as memory access requests received from SMC engines 700 that target partitionable section 820, as described in greater detail below in conjunction with FIG. 22.

Figure 22:
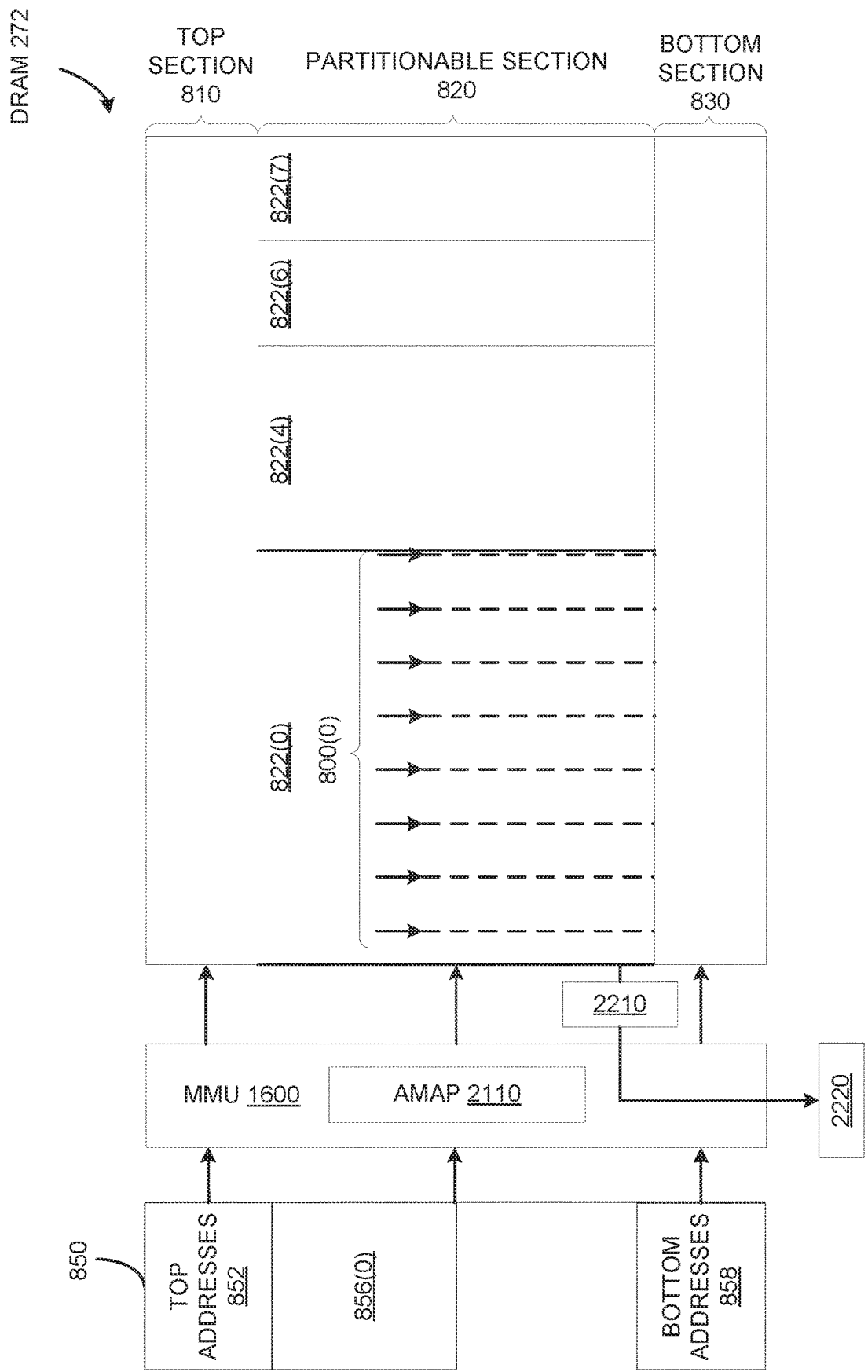
FIG. 22 illustrates how the memory management unit of FIG. 16 performs various address translations, according to various embodiments.

FIG. 22 illustrates how the memory management unit of FIG. 16 performs various address translations, according to various embodiments. As shown, partitionable addresses 854 include address region 856(0) that includes addresses corresponding to PPU memory partition 710(0), as discussed above in conjunction with FIG. 8B. MMU 1600 translates physical addresses included in address region 856(0) into raw addresses associated with DRAM portion 822(0) via AMAP 2110. AMAP 2110 is configured to swizzle addresses from address region 856(0) across L2 cache slices 800(0) included in PPU memory partition 710(0) in order to avoid situations where striding causes the same L2 cache slice 800(0) to be accessed repeatedly (also known as "camping").

In one embodiment, AMAP 2110 may implement a "memory access" swizID that identifies a memory interleave factor for a given region of memory. A given memory access swizID determines a set of L2 cache slices that are interleaved across for various types of memory accesses, including video memory, system memory, and peer memory access. Different PPU partitions 600 generally implement different and non-overlapping memory regions 822 within the partitionable section 829 to minimize interference between concurrently executing jobs. Hypervisor 124 may use a memory access swizID of zero in order to balance memory access operations across L2 cache slices, which would generally access either top section 810 or bottom section 830.

A given memory access swizID may be a "local" swizID that is calculated based on a system physical address and is used to interleave or swizzle memory access requests across relevant L2 slices and corresponding portions of DRAM. A given local swizID associated with a given PPU partition 600 may correspond to a swizID used to configure that PPU partition. With this approach, AMAP 2110 can swizzle addresses within the boundaries of a given PPU memory partition based on the swizID used to activate those boundaries. Swizzling addresses based on memory access swizIDs allows MMU 1600 to interleave the DRAM 272 such that each PPU partition 600 sees its part of the partitionable section 820 as contiguous in linear system physical address space 850. This approach can maintain isolation between PPU partitions 600 and data integrity associated with those PPU partitions 600.

A given memory access swizID may alternatively be a "remote" swizID that is supplied by device driver 122 or hypervisor 124 and is used to interleave memory access requests across L2 slices for system memory access operations. The local swizID and remote swizID may be the same for processing operations that occur within a given PPU partition 600. Different PPU partitions 600 generally have different remote swizIDs to allow system memory access operations to only go through L2 Slices 800 that belong to the PPU partition 600.

MMU 1600 also provides support for translating virtual addresses associated with a virtual address space identifier 1500 into a system physical address in the 1D system physical address space 850. For example, suppose SMC engine 700(0) of FIG. 7 executes using PPU memory partition 710(0) and corresponding DRAM portion 822(0), and, in doing so, causes a memory fault. MMU 1600 would issue a fault, with a local fault identifier 1610. MMU 1600 would in turn translate local fault identifier 1610 into a global fault identifier 1620. Fault and errors can be reported to virtual functions according to the SR-IOV public specification.

MMU 1600 also facilitates subdividing address regions 856 and PPU memory partitions 710 to provide support for multiple SMC engines 700, multiple VMs, and/or multiple processing contexts 1400 that execute within a given PPU partition 600, as described in greater detail below in conjunction with FIG. 23.

Figure 23:
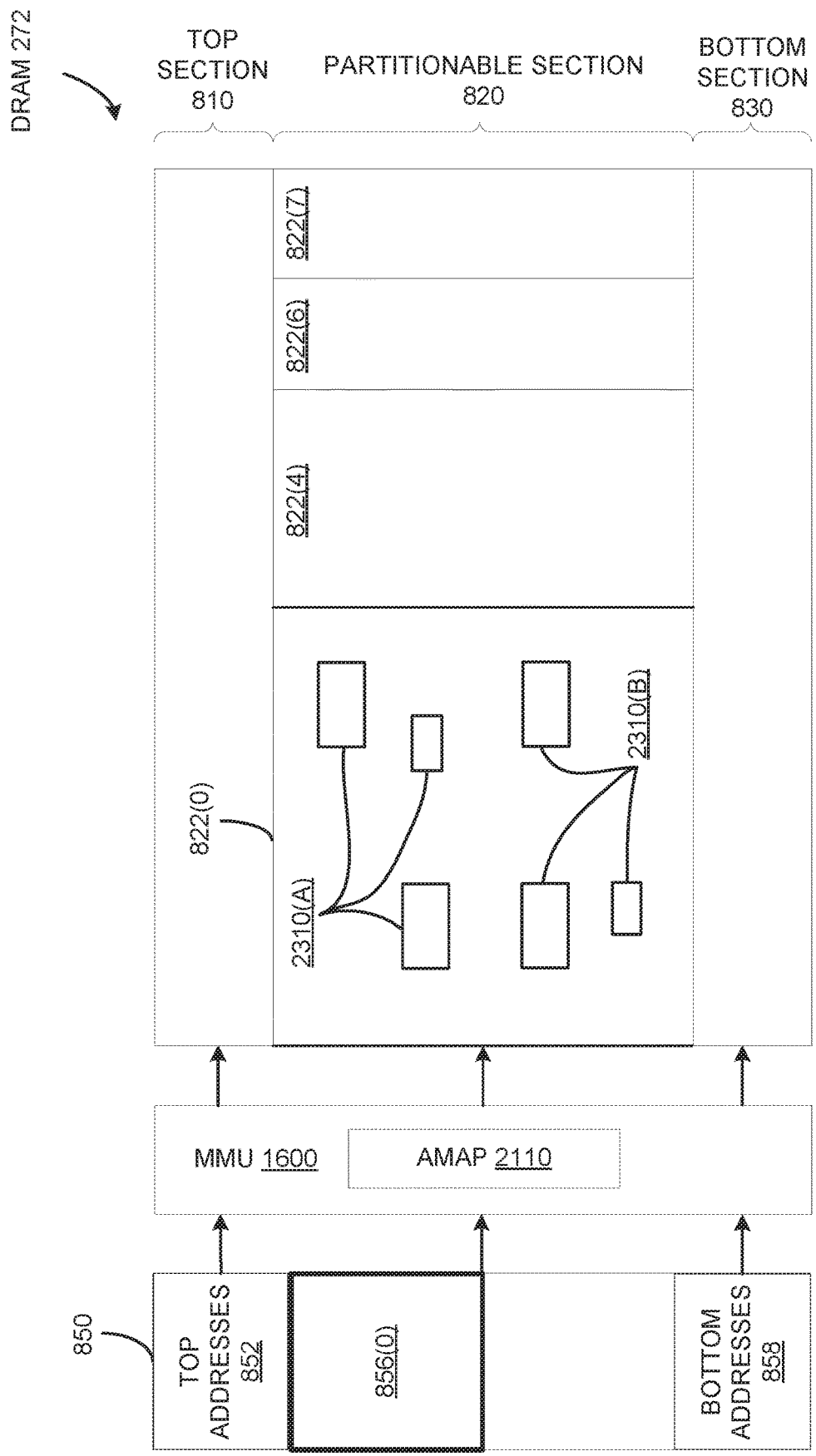
FIG. 23 illustrates how the memory management unit of FIG. 16 provides support operations associated with multiple processing contexts simultaneously, according to various embodiments.

FIG. 23 illustrates how the memory management unit of FIG. 16 provides support for operations associated with multiple processing contexts simultaneously, according to various embodiments. As shown, address region 856(0) encompasses multiple virtual memory pages 2310 of varying sizes. For SMC Engine 700(0), a virtual memory space identifier 1500 is mapped to a global virtual memory space identifier 1510 that selects the page table for a particular virtual address space being used by a processing context on SMC Engine 700(0). Pages specified by a page table A select pages 2310(A) within DRAM portion 822(0). Simultaneously, SMC Engine 700(2) can use pages specified by a page table B that selects pages 2310(B) also within DRAM portion 822(0). By a page-based virtual memory management scheme, pages within DRAM portion 822(0) can be allocated to different subcontexts or to different processing contexts. Note that a processing context can use multiple virtual address space identifiers 1500 because it can execute many subcontexts.

Subdividing address region 856(0) and DRAM portion 822(0) corresponding to PPU memory partitions 710(0) in the manner shown provides different SMC engines 700 that execute within a corresponding PPU partition 600 with dedicated memory resources within PPU memory partition 822(0). Accordingly, multiple SMC engines 700 in different PPU 600 partitions can execute processing tasks within different processing contexts simultaneously without interfering with one another in terms of bandwidth.

The page-based approach described above can also be applied to a single SMC engine 700 that executes multiple processing subcontexts, where each processing subcontext needs a dedicated portion of PPU memory partition 710(0). Likewise, the above approach can be applied to different VMs that execute on one or more SMC engines 700 and need dedicated portions of PPU memory partition 710(0).

Referring generally to FIGS. 19-23, the disclosed techniques allow a given PPU partition 600 that is configured in the manner described above in conjunction with FIGS. 11-12 to safely launch multiple processing contexts simultaneously. In particular, partitioning L2 cache as described fairly allocates DRAM portions 822 to different PPU partitions 600. Further, the various address translations implemented via MMU 1600 and AMAP 2110 utilize memory bandwidth efficiently and fairly, thereby providing a consistent quality of service to all tenants of PPU 200. The techniques described in conjunction with FIGS. 19-23 are also described in greater detail below in conjunction with FIG. 24.

Figure 24:
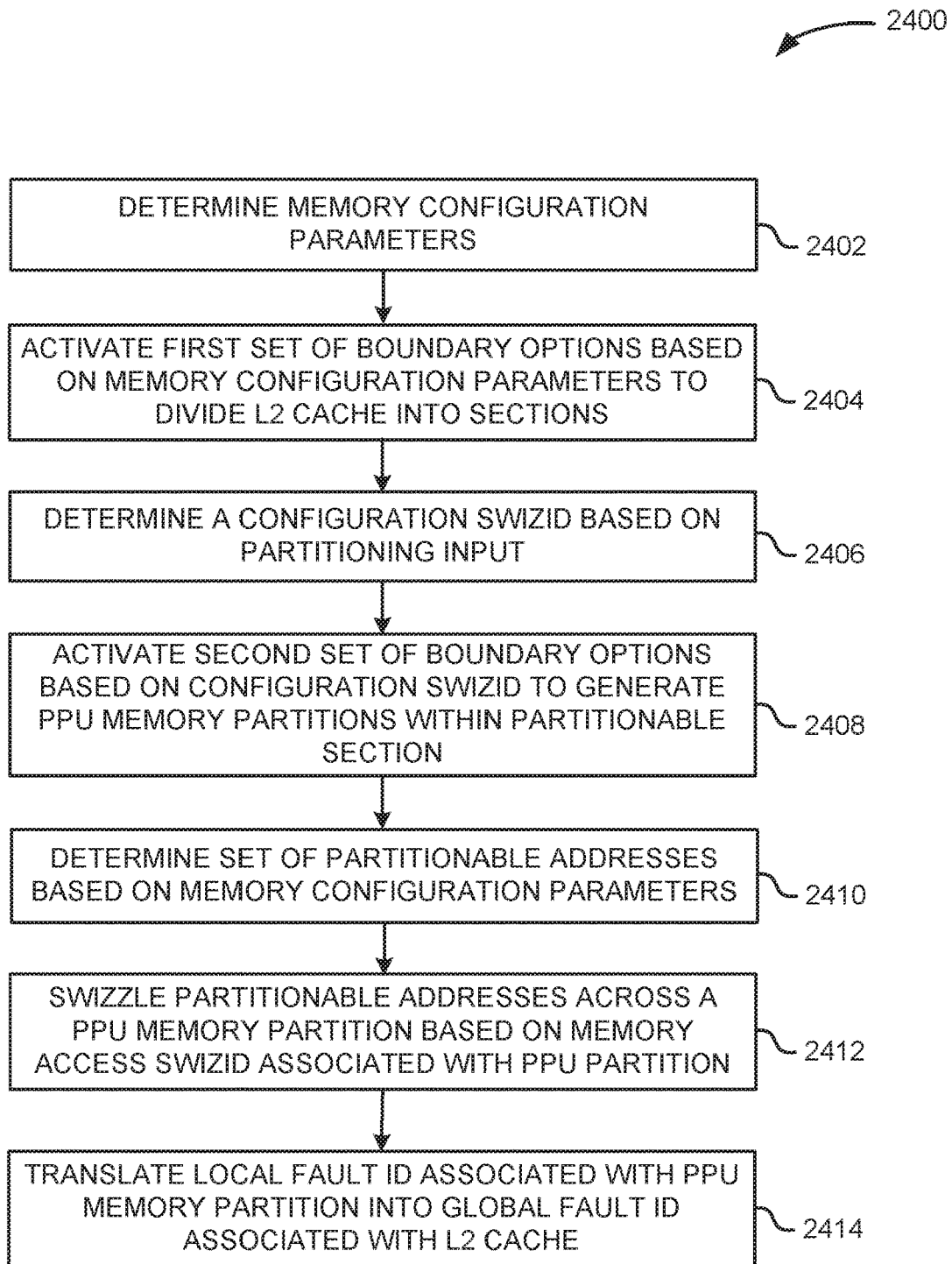
FIG. 24 is a flow diagram of method steps for configuring memory resources within a PPU to support operations associated with multiple processing contexts simultaneously, according to various embodiments.

FIG. 24 is a flow diagram of method steps for configuring memory resources within a PPU to support operations associated with multiple processing contexts simultaneously, according to various embodiments. Although the method steps are described in conjunction with the systems of FIGS. 1-23, persons skilled in the art will understand that any system configured to perform the method steps in any order falls within the scope of the present embodiments.

As shown, a method 2400 begins at step 2402, where hypervisor 124 of FIG. 1 determines a set of memory configuration parameters with which to partition DRAM 272. The set of memory configuration parameters can indicate any technically feasible set of parameters that describe any attribute of DRAM 272, including the total size of DRAM 272 (M), the size T of top section 810, the size P of partitionable section 820, the size B of bottom section 830, the number of L2 cache slices 800 (e.g., 96), the size of each cache slice portion F that corresponds to partitionable section 820, and/or the size of each cache slice portion W that corresponds to bottom section 830. In one embodiment, the set of configuration parameters need only include the parameters M, F, and W.

At step 2404, hypervisor 124 activates a first set of boundary options based on the set of memory configuration parameters determined at step 2402 to divide DRAM 272 into sections. In particular, hypervisor 124 activates boundary options 1900(0), 1900(1), 1900(9), and 1900(10) shown in FIG. 19 in order to divide DRAM 272 into top section 810, partitionable section 820, and bottom section 820. In one embodiment, hypervisor 124 can modify the placement of a given boundary option to adjust the size of a corresponding section of DRAM 272.

At step 2406, hypervisor 124 determines a configuration swizID based on partitioning input. The partitioning input can be obtained via step 1002 of the method 1000 described above in conjunction with FIG. 10. The partitioning input indicates a set of target PPU partitions for PPU 200. Hypervisor 124 can determine a configuration swizID for the target set of partitions via the techniques described above in conjunction with FIGS. 11-12. In one embodiment, the configuration swizID may be obtained prior to step 2404 and the first set of boundary options may then be activated based on that configuration swizID.

At step 2408, hypervisor activates a second set of boundary options based on the configuration swizID to generate one or more PPU memory partitions 710 within partitionable section 820 of DRAM 272. The second set of boundary options can include any of boundary options 1900(2) through 1900(8) shown in FIG. 19. These various boundary options can subdivide partitionable section 820 into a number of DRAM portions 822 corresponding to PPU memory partitions 710 that is equal to, or less than, the number of PPU slices 610. In various embodiments, steps 2404 and 2408 of the method 2400 may be performed in conjunction with one another based on a configuration swizID obtained via, or generated based on, admin user input.

At step 2410, hypervisor 124 determines set of partitionable addresses 854 based on the set of memory configuration parameters and/or the configuration swizID. In so doing, hypervisor 124 divides a 1D SPA space 850 into top addresses 852, partitionable addresses 854, and bottom address 858, as shown in FIG. 21. Top addresses 852 can be translated to raw addresses associated with top section 810, partitionable addresses 854 can be translated to raw addresses associated with partitionable section 820, and bottom addresses 856 can be translated to raw addresses associated with bottom section 830.

At step 2412, MMU 1600 services memory access requests by swizzling partitionable addresses 854 across the L2 cache slices 800 within a PPU memory partition 710 corresponding to a DRAM portion 822. MMU 1600 swizzles partitionable addresses via AMAP 2110 based on a memory access swizID (or "remote" swizID) that is associated with the PPU memory partition 710. In one embodiment, the memory access swizID is derived from a swizID according to which the PPU memory partition 710 is configured. Swizzling partitionable addresses 854 in this manner can decrease repeated access to individual L2 cache slices 800 (also referred to as "camping").

At step 2414, MMU 1600 receives a local fault identifier associated with a memory fault and translates the local fault identifier to a global fault identifier. In doing so, MMU 1600 may translate a virtual address associated with the local fault identifier into a global address associated with the global fault identifier. The memory fault could, for example, be caused when a given SMC engine 700 encounters an error during a memory read operation or a memory write operation executed with a PPU memory partition 710. Implementing fault IDs in a local virtual address space allows SMC engines 700 to operate with similar address spaces, thereby permitting simpler migration of processing contexts between PPU partitions 600, as described above in conjunction with FIG. 17. Translating those fault IDs to a global fault identifier 1620 allows hypervisor 124 to address faults corresponding to those fault IDs from a global virtual address space identifier 1510 perspective.

Referring generally to FIGS. 19-24, the disclosed techniques for partitioning PPU memory resources complement the techniques for partitioning PPU compute resources described above in conjunction with FIGS. 11-18. Via these techniques, hypervisor 124 can configure and partition PPU 200 to support multiple processing contexts simultaneously. With this functionality, PPU 200 can safely execute a variety of different processing tasks on behalf of multiple CPU processes without allowing those CPU processes to interfere with one another, thereby allowing PPU resources to be leveraged more efficiently. Additionally, the disclosed techniques can be applied to provide robust support for multi-tenancy in cloud-based PPU deployments, thereby meeting a product demand that historically has been unmet by prior approaches.

Time-Slicing Multiple VMs and Processing Contexts

As further discussed herein, the PPU 200 of FIG. 2 supports two levels of partitioning. In a first level of partitioning, referred to herein as "PPU partitioning," the PPU resources 500 of the PPU 200 are partitioned into PPU partitions 600, also referred to herein as "fractionalized PPUs." In some embodiments, one or both of PP memory 270 and DRAM 272 may be partitioned into SMC memory partitions 710. With this level of partitioning, each PPU partition 600 executes one VM at any given time. In a second level of partitioning, referred to herein as "SMC partitioning," each PPU partition 600 is further divided into SMC engines 700. Each PPU partition 600 includes one or more SMC engines 700. With this level of partitioning, each SMC engine 700 executes one processing context for one VM at any given time.

Over time, SMC engines 700 switch from executing a particular processing context for a VM to executing a different processing context for the same VM or executing a different processing context for a different VM. This process is referred to herein as "time-slicing," because the execution time for SMC engines 700 is "sliced" among multiple processing contexts corresponding to one or more VMs.

Each SMC engine 700 time-slices between processing contexts listed on a runlist, as managed by the PBDMA 520 and 522 of the SMC engine 700. In general, when switching between VMs, the runlists on all affected SMC engines 700 are replaced, so that a different set of processing contexts are time-sliced. If multiple SMC engines 700 are active, then the runlists replaced at the same time. This type of scheduling via runlist replacement is referred to herein as "software scheduling." Switching between processing contexts within the same VM similarly may also involve replacing runlists, and is very similar to switching VMs, except that the VM does not change as a result of the context switch. As a result, no additional hardware support is needed for this type of context switching. In some embodiments, VMs may have numerous distinct processing contexts of various sizes. In such embodiments, software scheduling may consider how to pack these processing contexts into SMC engines 700 for correct and efficient execution. Further, software scheduling may reconfigure the number of PPU partitions 600 and the number of SMC engines within each PPU partition 600 to correctly and efficiently execute the processing contexts for the VM.

In order to enable PPU resources 500 to support the two levels of partitioning described above, PPU 200 correspondingly supports two levels of time-slicing. Corresponding to PPU partitioning, PPU 200 performs VM level time-slicing, where each PPU partition 600 time-slices among multiple virtual machines. Corresponding to SMC partitioning, PPU 200 performs SMC level time-slicing, where each VM 600 time-slices among multiple processing contexts. In various embodiments, both levels of time-slicing maintain the same number of TPCs in each GPC 242 over time. In various embodiments, time-slicing may involve changing the number of TPCs in one or more GPCs 242 over time. The two levels of time-slicing are now described.

Figure 25:
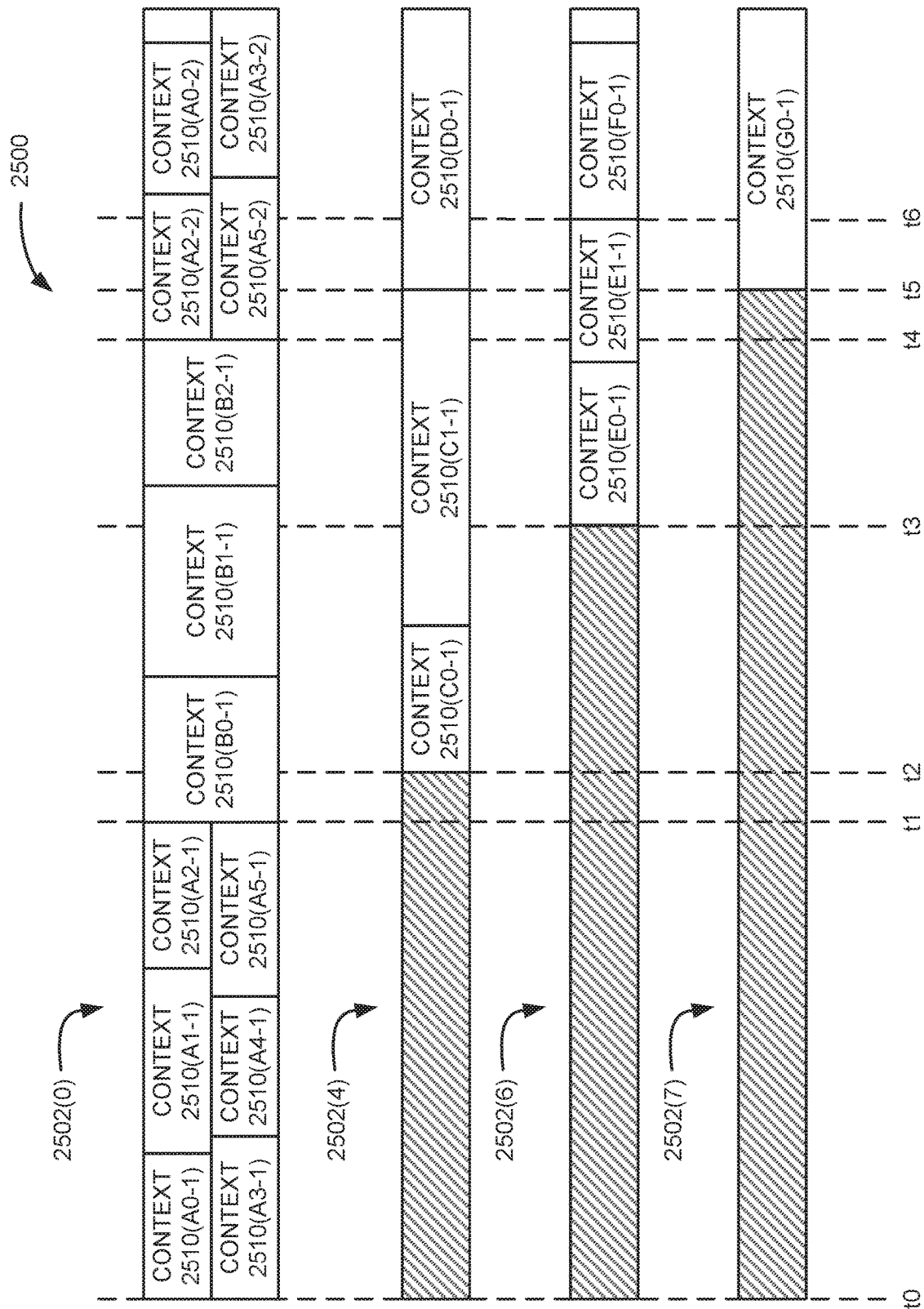
FIG. 25 is a set of timelines illustrating VM level time-slicing associated with the PPU of FIG. 2, according to various embodiments.

FIG. 25 is a set of timelines 2500 illustrating VM level time-slicing associated with PPU partitions 600 of the PPU 200 of FIG. 2, according to various embodiments. As shown, the set of timelines 2500 includes, without limitation, four PPU partition timelines 2502(0), 2502(4), 2502(6), and 2502(7). In some embodiments, the PPU partition timelines 2502(0), 2502(4), 2502(6), and 2502(7) may correspond to PPU partitions 600(0), 600(4), 600(6), and 600(7), respectively, of FIG. 6. In such embodiments, PPU partition timeline 2502(0) may correspond to PPU slices 610(0)-610(3), and PPU partition timeline 2502(4) may correspond to PPU slices 610(4)-610(5). Similarly, PPU partition timeline 2502(6) may correspond to PPU slice 610(6), and PPU partition timeline 2502(7) may correspond to PPU slice 610(7). As a result, PPU partition 600(0) may execute up to four processing contexts concurrently, PPU partition 600(4) may execute up to two processing contexts concurrently, and each of PPU partitions 600(6) and 600(7) may execute one processing context at a time.

As shown in PPU partition timeline 2502(0), PPU partition 600(0) time-slices between two VMs, referred to as VM A and VM B. Timeline 2502(0) illustrates time-slicing between VM A, where processing contexts associated with VM A are shown in the form of CONTEXT 2510(Ax-y), and VM B, where processing contexts associated with VM B are shown in the form of CONTEXT 2510(Bx-y). From time t0 through time t1, PPU partition 600(0) executes the processing contexts of VM A. A first SMC engine 700(0) of PPU partition 600(0) sequentially executes processing context 2510(A0-1), processing context 2510(A1-1), and processing context 2510(A2-1). Concurrently, a second SMC engine 700(2) of PPU partition 600(0) sequentially executes processing context 2510(A3-1), processing context 2510(A4-1), and processing context 2510(A5-1). At time t1, PPU partition 600(0) stops executing the processing contexts associated with VM A and switches to processing contexts associated with VM B. Processing context 2510(A2-1) and processing context 2510(A5-1) are context-switched out of corresponding SMC engines 700(0) and 700(2). PPU partition 600(0) is reconfigured from having two SMC engines 700(0), including two GPCs 230(0) and 230(1), and 700(2), including two GPCs 230(2) and 230(3), to having one SMC engine 700(0), including four GPCs 230(0), 230(1), 230(2) and 230(3). Once the reconfiguration is complete, PPU partition 600(0) begins executing processing context 2510 (130-1) of VM B.

From time t1 through time t4, PPU partition 600(0) executes the processing contexts of VM B. A first SMC engine 700(0) of PPU partition 600(0) sequentially executes processing context 2510(30-1), processing context 2510 (B1-1), and processing context 2510(B2-1). At time t4, PPU partition 600(0) stops executing the processing contexts associated with VM B and switches to processing contexts associated with VM A. Processing context 2510(32-1) is context-switched out of corresponding SMC engine 700(0). PPU partition 600(0) is reconfigured from having one SMC engine 700(0), including four GPCs 230(0), 230(1), 230(2) and 230(3), to having two SMC engines 700(0), including two GPCs 230(0) and 230(1), and 700(2), including two GPCs 230(2) and 230(3). Once the reconfiguration is complete, PPU partition 600(0) begins executing processing contexts 2510(A2-2) and 2510(A5-2) of VM A. Beginning at time t4, PPU partition 600(0) again executes the processing contexts of VM A. A first SMC engine 700(0) of PPU partition 600(0) sequentially executes processing context 2510(A2-2) and processing context 2510(A0-2). Concurrently, a second SMC engine 700(2) of PPU partition 600(0) sequentially executes processing context 2510(A5-2) and processing context 2510(A3-2).

As shown in PPU partition timeline 2502(4), PPU partition 600(4) time-slices between two VMs, referred to as VM C and VM D. Timeline 2502(4) illustrates time-slicing between VM C, where processing contexts associated with VM C are shown in the form of CONTEXT 2510(Cx-y), and VM D, where processing contexts associated with VM D are shown in the form of CONTEXT 2510(Dx-y). From time t0 through time t2, PPU partition 600(4) is idle and does not execute any processing contexts. From time t2 through time t5, PPU partition 600(4) executes processing contexts of VM C. A first SMC engine 700(4) of PPU partition 600(4) sequentially executes processing context 2510(C0-1) and processing context 2510(C1-1). At time t5, PPU partition 600(4) stops executing processing context 2510(C1-1) and reconfigures to begin executing processing contexts of VM D. Beginning at time t5, PPU partition 600(4) executes processing contexts of VM D. A first SMC engine 700(4) of PPU partition 600(4) executes processing context 2510(D1-1).

As shown in PPU partition timeline 2502(6), PPU partition 600(6) time-slices between two VMs, referred to as VM E and VM F. Timeline 2502(6) illustrates time-slicing between VM E, where processing contexts associated with VM E are shown in the form of CONTEXT 2510(Ex-y), and VM F, where processing contexts associated with VM F are shown in the form of CONTEXT 2510(Fx-y). From time t0 through time t3, PPU partition 600(6) is idle and does not execute any processing contexts. From time t3 through time t6, PPU partition 600(6) executes processing contexts of VM E. A first SMC engine 700(6) of PPU partition 600(6) sequentially executes processing context 2510(E0-1) and processing context 2510(E1-1). At time t6, PPU partition 600(6) stops executing processing context 2510(E1-1) and reconfigures to begin executing processing contexts of VM F. Beginning at time t6, PPU partition 600(4) executes processing contexts of VM F. A first SMC engine 700(6) of PPU partition 600(6) executes processing context 2510(F0-1).

As shown in PPU partition timeline 2502(7), PPU partition 600(7) time-slices withinr a single VM, referred to as VM G. Timeline 2502(6) illustrates time-slicing for VM G, where processing contexts associated with VM G are shown in the form of CONTEXT 2510(Gx-y). From time t0 through time t5, PPU partition 600(7) is idle and does not execute any processing contexts. Beginning at time t5, PPU partition 600(7) executes processing context G. A first SMC engine 700(7) of PPU partition 600(7) executes processing context 2510(G0-1).

In this manner, each of PPU partitions 600(0), 600(4), 600(6), and 600(7) time-slice among processing contexts corresponding to one or more VMs. Each of PPU partitions 600(0), 600(4), 600(6), and 600(7) transition from one processing context to another processing context independently of each other. For example, PPU partition 600(0) could switch from executing one processing context for a particular VM to another processing context for the same or a different VM without regard to whether or not any one or more of PPU partitions 600(4), 600(6), and 600(7) are switching processing contexts. During the time period illustrated, each of PPU partitions 600(0), 600(4), 600(6), and 600(7) maintain a constant number of PPU slices 610. In some embodiments, the number of PPU slices 610 in each PPU partition 600 may change, as now described.

Figure 26:
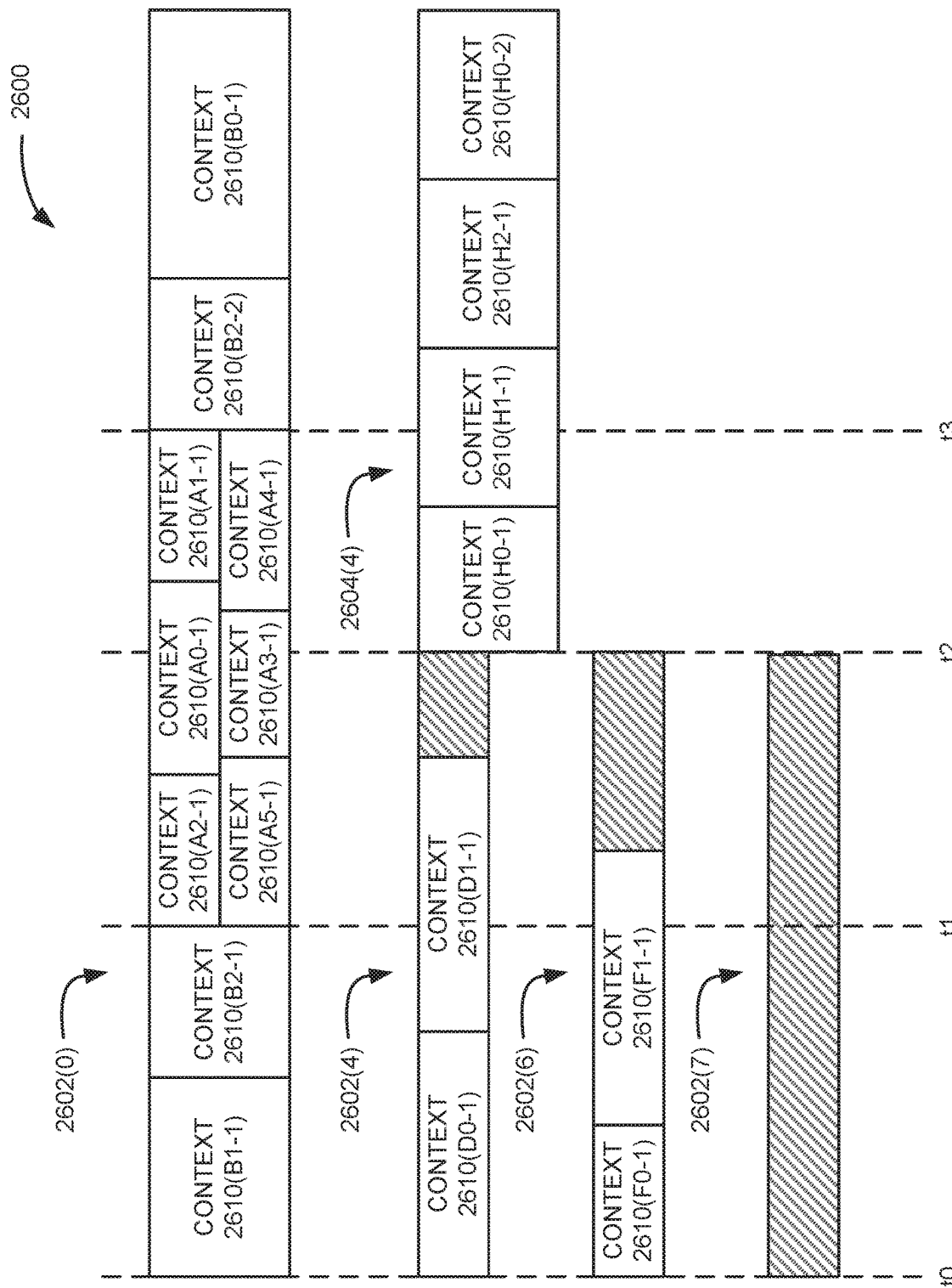
FIG. 26 is another set of timelines illustrating VM level time-slicing associated with the PPU of FIG. 2, according to various other embodiments.

FIG. 26 is another set of timelines 2600 illustrating VM level time-slicing associated with the PPU 200 of FIG. 2, according to various other embodiments. The processing contexts illustrated in the set of timelines 2600 function substantially the same as the set of timelines 2500 of FIG. 25, except as further described below. As shown, the set of timelines 2600 includes, without limitation, four PPU partition timelines 2602(0), 2602(4), 2602(6), and 2602(7). In some embodiments, the PPU partition timelines 2602(0), 2602(4), 2602(6), and 2602(7) may correspond to PPU partitions 600(0), 600(4), 600(6), and 600(7), respectively, of FIG. 6.

As shown in PPU partition timeline 2602(0), PPU partition 600(0) time-slices between two VMs, referred to as VM A and VM B. Timeline 2602(0) illustrates time-slicing between VM A, where processing contexts associated with VM A are shown in the form of CONTEXT 2610(Ax-y), and VM B, where processing contexts associated with VM B are shown in the form of CONTEXT 2610(Bx-y). From time t0 through time t1, PPU partition 600(0) executes processing contexts of VM B. A first SMC engine 700(0) of PPU partition 600(0) sequentially executes processing context 2610(B1-1) and processing context 2610(B2-1). At time t1, PPU partition 600(0) stops executing the processing contexts associated with VM B and switches to processing contexts associated with VM A. Processing context 2610 (B2-1) is context-switched out of corresponding SMC engine 700(0). PPU partition 600(0) is reconfigured from having one SMC engine 700(0), including four GPCs 230 (0), 230(1), 230(2) and 230(3), to having two SMC engines 700(0), including two GPCs 230(0) and 230(1), and 700(2), including two GPCs 230(2) and 230(3). Once the reconfiguration is complete, PPU partition 600(0) begins executing processing contexts of VM A. From time t1 through time t3, PPU partition 600(0) executes processing contexts of A. A first SMC engine 700(0) of PPU partition 600(0) sequentially executes processing context 2610(A2-1), processing context 2610(A0-1), and processing context 2610(A1-1). Concurrently, a second SMC engine 700(2) of PPU partition 600(0) sequentially executes processing scontext 2610(A5-1), processing context 2610(A3-1), and processing context 2610(A4-1). At time t3, PPU partition 600(0) stops executing the processing contexts associated with VM A and switches to processing contexts associated with VM B. Processing context 2610(A1-1) and processing context 2610 (A4-1) are context-switched out of corresponding SMC engines 700(0) and 700(2). PPU partition 600(0) is reconfigured from having two SMC engines 700(0), including two GPCs 230(0) and 230(1), and 700(2), including two GPCs 230(2) and 230(3), to having one SMC engine 700(0), including four GPCs 230(0), 230(1), 230(2) and 230(3). Once the reconfiguration is complete, PPU partition 600(0) begins executing processing contexts of VM B. Beginning at time t3, PPU partition 600(0) again executes processing contexts of VM B. A first SMC engine 700(0) of PPU partition 600(0) sequentially executes processing context 2610(B2-2), and processing context 2610(B0-1).

As shown in PPU partition timeline 2602(4), from time t0 through time t2 a first SMC engine 700(4) of PPU partition 600(4) sequentially executes processing contexts 2610(D0-1), and processing context 2610(D1-1). The first SMC engine 700(4) of PPU partition 600(4) then idles. As shown in PPU partition timeline 2602(6), from time t0 through time t2, a first SMC engine 700(6) of PPU partition 600(6) sequentially executes processing context 2610(F0-1), and processing context 2610(F1-1). The first SMC engine 700(6) of PPU partition 600(6) then idles. As shown in PPU partition timeline 2602(7), PPU partition 600(7) idles from time t0 through time t2.

At time t2, PPU partitions 600(4), 600(6), and 600(7) merge to form a single PPU partition 600(4) with four SMC engines 700(4)-700(7). As shown in PPU partition timeline 2604(4), the merged PPU partition 600(4) executes processing contexts of VM H. Beginning at time t2, a first SMC engine 700(4) of PPU partition 600(4) sequentially executes processing context 2610(H0-1), processing context 2610 (H1-1), processing context 2610(H2-1), and processing context 2610(H0-2).

In this manner, PPU partitions 600 may be merged and/or split to for different size partitions during time-slicing. PPU partitions 600 may be merged and/or split independently of each other. In FIGS. 25 and 26, each VM executes on a fixed number of SMC engines 700, resulting in a constant number of simultaneously executing processing contexts for a given VM. As shown, VM A executes concurrently on two SMC engines 700 while the remaining VMs execute on one SMC engine 700 at a time. In some embodiments, a particular VM may change the number of SMC engines 700 upon which the VM is executing, as now described.

Figure 27:
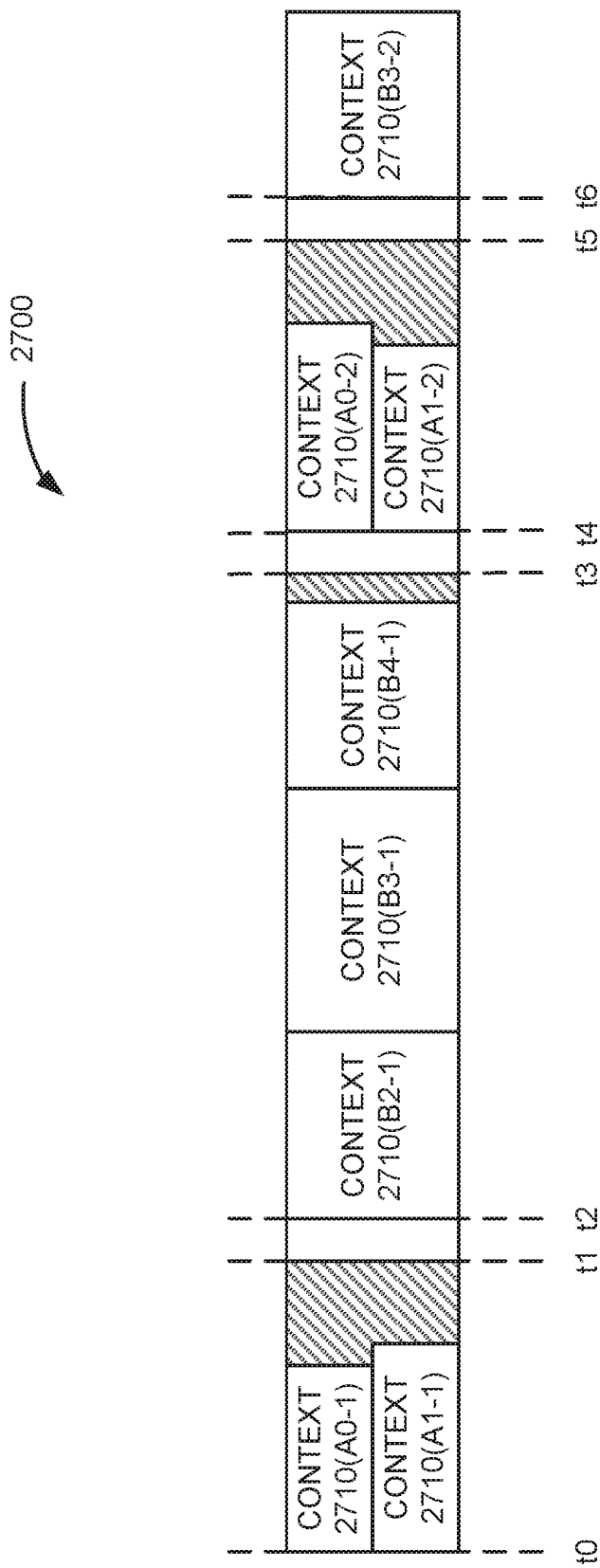
FIG. 27 is a timeline illustrating SMC level time-slicing associated with the PPU of FIG. 2, according to various embodiments.

FIG. 27 is a timeline 2700 illustrating SMC level time-slicing associated with the PPU 200 of FIG. 2, according to various embodiments. The processing contexts illustrated in the timeline 2700 function substantially the same as the sets of timelines 2500 and 2600 of FIGS. 25 and 26, respectively, except as further described below. As shown, the timeline 2700 represents a single PPU partition timeline. In some embodiments, the PPU partition timeline represented by timeline 2700 may correspond to any PPU partition 600 of FIG. 6 that includes at least two SMC engines 700.

As shown in timeline 2700, PPU partition 600 time-slices within a single VM, referred to as VM A. Timeline 2700 illustrates time-slicing for VM A, where processing contexts associated with VM A are shown in the form of CONTEXT 2710(Ax-y). Beginning at time t0, VM A executes on two SMC engines 700. A first SMC engine 700 included in PPU partition 600 executes processing context 2710(A0-1) and then idles until time t1. Concurrently, a second SMC engine 700 included in PPU partition 600 executes processing context 2710(A1-1) and then idles until time t1. The duration between time t0 and time t1 is sufficiently long to ensure ample time for processing contexts 2710(A0-1) and 2710 (A1-1) to complete execution and for the SMC engines to enter an idle state. In some embodiments, processing context 2710(A0-1) and processing context 2710(A1-1) may concurrently execute the same tasks on two separate SMC engines 700, thereby providing spatial redundancy. In such embodiments, processing context 2710(A0-1) and processing context 2710(A1-1) may execute tasks on redundant SMC engines 700 that have the same configuration as one another, and then compare the results for accuracy and determinism.

Between time t1 and time t2, the runlists for processing contexts 2710(A0-1) and 2710(A1-1) are removed from PPU partition 600. PPU partition 600 is reconfigured from two SMC engines 700 to one SMC engine 700 that includes all of the resources of the two SMC engines 700. PPU partition 600 then uses new runlists for executing processing contexts 2710(B2-1), 2710(B3-1), and 2710(B4-1).

Between time t2 and time t3, VM B executes on one SMC engine 700. SMC engine 700 included in PPU partition 600 sequentially executes processing context 2710(B2-1), processing context 2710(33-1), and processing context 2710 (34-1). In some embodiments, processing contexts 2710(B2-1), 2710(B3-1), and 2710(B4-1) may execute performance intensive tasks that may benefit from execution on a single SMC engine 700 that has more compute resources than the SMC engines executing processing contexts 2710(A0-1) and 2710(A1-1). SMC engine 700 then idles until time t3. In some embodiments, SMC engine 700 performs offline scheduling tasks during this idle period.

Between time t3 and time t4, the runlists for processing contexts 2710(32-1), 2710(B3-1), and 2710(B4-1) are removed from PPU partition 600. PPU partition 600 is reconfigured from one SMC engine 700 to two SMC engines 700. The two SMC engines 700 each include a portion of the resources included in the one SMC engine 700. PPU partition 600 then uses new runlists for executing processing contexts 2710(A0-2) and 2710(A1-2).

Beginning at time t4, VM A again executes on two SMC engines 700. A first SMC engine 700 executes processing context 2710(A0-2) and then idles until time t5. Concurrently, a second SMC engine 700 executes processing context 2710(A1-2) and then idles until time t5. The duration between time t4 and time t5 is sufficiently long to ensure ample time for processing contexts 2710(A0-2) and 2710 (A1-2) to complete execution and for the SMC engines to enter an idle state. In some embodiments, processing context 2710(A0-2) and processing context 2710(A1-2) may concurrently execute the same tasks on two separate SMC engines 700, thereby providing spatial redundancy. In such embodiments, processing context 2710(A0-2) and processing context 2710(A1-2) may execute tasks on redundant SMC engines 700 that have the same configuration as one another, and then compare the results for accuracy and determinism.

Between time t5 and time t6, runlists for processing contexts 2710(A0-2) and 2710(A1-2) are removed from PPU partition 600. PPU partition 600 is reconfigured from two SMC engines 700 to one SMC engine 700 that includes all of the resources of the two SMC engines 700. PPU partition 600 then uses new runlists for executing processing context 2710(B3-2). Beginning at time t6, VM B again executes on one SMC engine 700. SMC engine 700 executes processing context 2710(B3-2).

In some embodiments, PPU partition 600 may rapidly reconfigure between executing on one SMC engine and executing on two SMC engines, a process referred to herein as "fast reconfiguration." Fast reconfiguration increases utilization of PPU 200 resources, while providing a mechanism for multiple processing contexts to execute on a single PPU partition 600 in different modes. One or both of kernel driver 914 and hardware microcode within PPU 200 include various optimizations that enable fast reconfiguration. These optimizations are now described.

During reconfiguration, certain resources in PPU 200, such as FECS 530 and GPC 242 context switches, are not reset unless the resource generates an error. As a result, loading microcode into these resources during reconfiguration may be divided into multiple phases. In particular, the microcode loading sequence for FECS 530 and GPC 242 may be divided into a LOAD phase and an INIT phase. The LOAD phase is performed in parallel for all available FECS 530 and GPC 242 context switches within PPU partition 600, thereby reducing the time needed to load microcode into these resources. The INIT phase is performed during reconfiguration, thereby performing initialization of FECS 530 and GPC 242 context switches in parallel with reconfiguring PPU partition 600. During the initialization phase, PPU 200 ensures that the LOAD phase has completed for all FECS 530 and GPC 242 context switches. As a result, the time to load and initialize the resources of PPU partition 600 is reduced. In addition, PPU 200 stores a cache of standardized processing context images, referred to herein as "golden processing context images," for each possible configuration of PPU partitions 600. The appropriate golden processing context images are retrieved and loaded during the LOAD and INIT phases, thereby further reducing the time to load and initialize the resources of PPU partition 600.

As described herein, a particular VM may change the number of SMC engines 700 upon which the VM executes over time. In one particular example, VM A includes various tasks associated with a self-driving vehicle. Certain tasks of the self-driving vehicle are more critical than other tasks. For example, tasks associated with self-driving, such as detecting traffic lights and avoiding crashes, would be considered more critical than tasks associated with the vehicle's entertainment system. These more critical tasks may be subject to certain regulatory or industry standards. One such standard assigns a classification level known as an automotive safety integrity level (ASIL). ASIL includes four levels, referred to as ASIL-A, ASIL-B, ASIL-C, and ASIL-D, in order of increasing integrity levels. Tasks such as detecting traffic lights and avoiding crashes would be classified as ASIL-D. Less critical tasks may be classified at lower ASIL levels. Tasks that have no safety relevance, such as tasks associated with the vehicle's entertainment system, may be classified as QM, indicating that only standard quality management practices are applicable.

In that regard, processing contexts 2710(A0-1) and 2710 (A1-1) may include two instances of the same ASIL-D level task executing concurrently on two different SMC engines 700 of a PPU partition 600. After processing contexts 2710(A0-1) and 2710(A1-1) complete execution, the results of processing contexts 2710(A0-1) and 2710(A1-1) are compared with one another. If processing context 2710(A0-1) and processing context 2710(A1-1) generate the same results, then the results are validated, and the vehicle proceeds according to the results. On the other hand, a failure in one or more components associated with either processing context 2710(A0-1) or processing context 2710(A1-1) may cause the affected processing context to generate incorrect results. Therefore, if processing context 2710(A0-1) and processing context 2710(A1-1) generate different results, then the results are invalidated, and the vehicle executes an appropriate evasive action, such as moving slowly towards the nearest location out of the flow of traffic.

After processing contexts 2710(A0-1) and 2710(A1-1) complete execution, PPU partition 600 reconfigures to include only one SMC engine 700. SMC engine 700 sequentially executes QM level processing contexts 2710(B2-1), 2710(B3-1), and 2710(B4-1). These processing contexts include less critical tasks, such as such as tasks associated with the vehicle's entertainment system. After processing contexts 2710(B2-1), 2710(B3-1), and 2710(B4-1) complete execution, PPU partition 600 reconfigures to include two SMC engines 700. SMC engines 700 concurrently execute processing contexts 2710(A0-2) and 2710(A1-2), which are two instances of the same ASIL-D level task. After processing contexts 2710(A0-2) and 2710(A1-2) complete execution, PPU partition 600 again reconfigures to include only one SMC engine 700 and executes QM level processing context 2710(B3-2).

In this manner, PPU partition 600 dynamically reconfigures between multiple SMC engines 700 executing ASIL-D level tasks and a single SMC engine 700 executing QM level tasks. The duration between successive ASIL-D processing contexts, such as the duration between time t0 and time t4 is referred to as a "frame," where the portion of the frame between time t0 and time t1 is allocated for execution of ASIL-D tasks.

Figure 28:
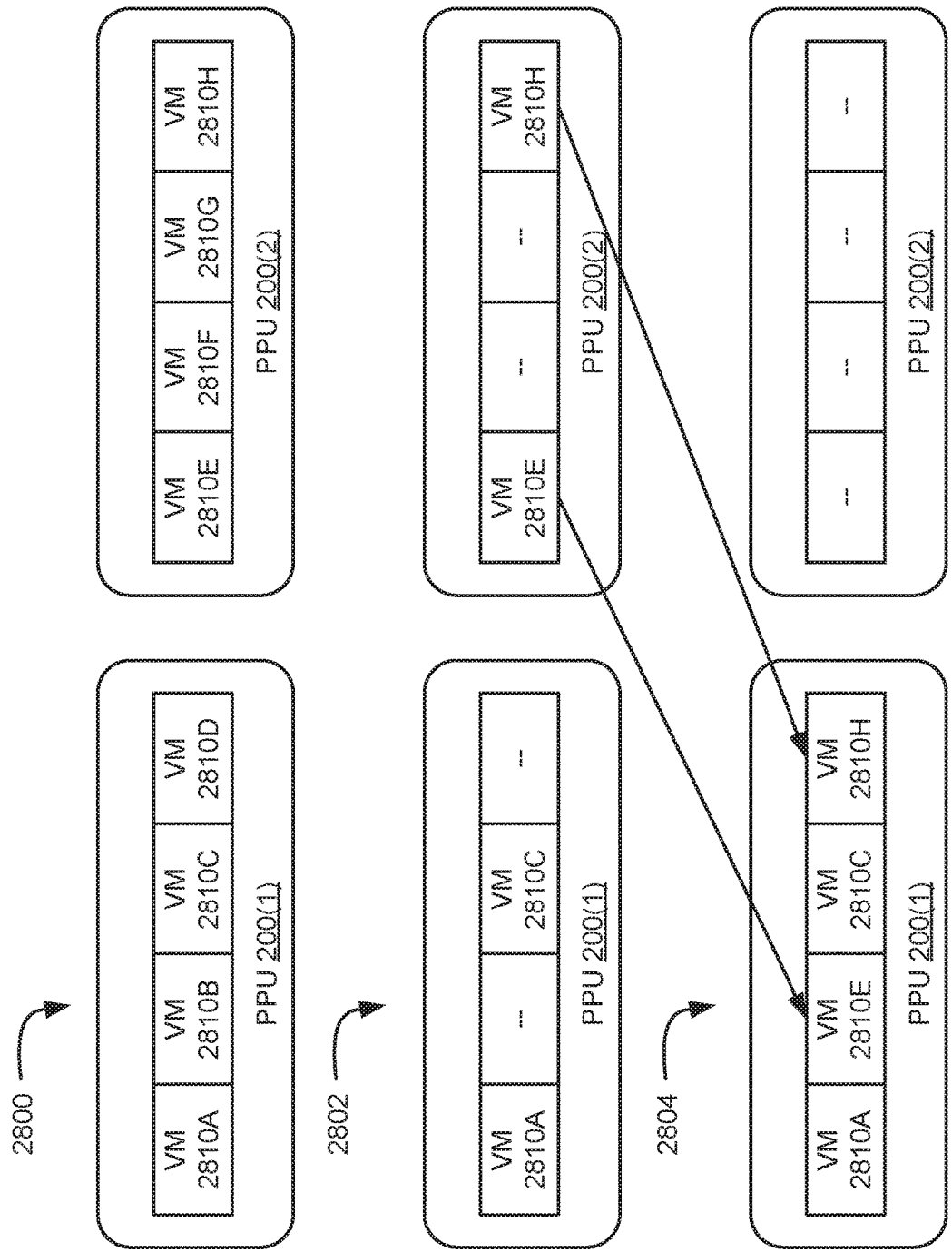
FIG. 28 illustrates how VMs may migrate from one to another PPU, according to various embodiments.

FIG. 28 illustrates how VMs may migrate from one PPU 200(1) to another PPU 200(2), according to various embodiments. As shown in diagram 2800, PPU 200(1) executes four VMs 2810A, 28106, 2810C, and 2810D. Each of these VMs 2810A, 2810B, 2810C, and 2810D executes on a different SMC engine 700 included in PPU 200(1). Similarly, PPU 200(2) executes four VMs 2810E, 2810F, 2810G, and 2810H. Each of these VMs 2810E, 2810F, 2810G, and 2810H executes on a different SMC engine 700 included in PPU 200(1).

Over time, VMs may be migrated from one PPU 200 to another PPU 200 due to various reasons, including, without limitation, preparing for system maintenance, consolidating VMs on fewer PPUs 200 for better utilization or power savings, and gaining efficiencies by migrating to different data centers. In a first example, VMs could be forced to migrate to different PPUs 200 when the system on which the VMs are currently executing is about to be powered down for system maintenance. In a second example, the processing contexts of one or more VMs could be idle for an indeterminate amount of time. If all the processing contexts in one or more VMs are idle, the VMs could migrate from one PPU 200 to another PPU 200 to improve PPU 200 utilization or reduce power consumption. In a third example, VMs associated a particular user or set of users could be migrated from a geographically distant data center to a nearer data center to improve communication latency. More generally, VMs may be migrated to different PPUs 200.

More generally, VMs may migrate from one PPU 200 to another PPU 200 at any time when a context has been removed from executing on hardware via a context save. The relevant operating system, such as guest operating system 916 of FIG. 9, may preempt a context and force a context save at any time, not just when the corresponding VM is idle. A context may be preempted when all work for the corresponding VM has been completed. In addition, a context may be preempted by forcing the context to stop submitting further work and draining current work in progress, even if the VM has additional work to perform. In either case, the VM may be migrated from one PPU 200 to another PPU 200 once work in progress for the context has been drained and the context has been saved. During VM migration, the VM may experience a suspension of execution on the order of a few milliseconds In some embodiments, a VM may migrate only to a PPU partition 600 in another PPU 200 that has the same configuration as the PPU partition 600 that is currently executing the VM. For example, the VM may be restricted to migrate only to a PPU partition 600 in another PPU 200 that has the same number of GPCs 242 as the PPU partition 600 that is currently executing the VM. As shown in diagram 2802, four of the VMs are in an idle state. PPU 200(1) executes two VMs 2810A and 2810C. The other two VMs 28106 and 2810D, formerly executing on PPU 200(1) are idle. Similarly, PPU 200(2) executes two VMs 2810E and 2810H. The other two VMs 2810F and 2810G, formerly executing on PPU 200(1) are idle. As a result, each of PPU 200(1) and 200(2) are underutilized. In such cases, the currently executing VMs may migrate to better utilize the available PPU resources. In one example, the VMs executing on PPU 200(1) could consume half of the hardware resources available on PPU 200(1). Likewise, the VMs executing on PPU 200(2) could consume half of the hardware resources available on PPU 200(2). As a result, each of PPU 200(1) and PPU 200(2) would be operating at approximately 50% of capacity. If all of the VMs executing on PPU 200(2) are migrated to PPU 200(1), then PPU 200(1) would be operating at approximately 100% of capacity. PPU 200(2) would be operating at 0% of capacity. As a result, the supply voltage to PPU 200(2) could be reduced in order to reduce power consumption. As shown in diagram 2804, VMs 2810E and 2810H have migrated from PPU 200(2) to PPU 200(1). As a result, PPU 200(1) executes four VMs 2810A, 2810E, 2810C, and 2810H. Therefore, PPU 200(1) is more fully utilized. After VM migration, PPU 200(2) is no longer executing any VMs. As a result, PPU 200(2) may be powered-down in order to reduce power consumption. If additional VMs subsequently begin executing, PPU 200(2) may be powered up to execute the additional VMs.

Figure 29:
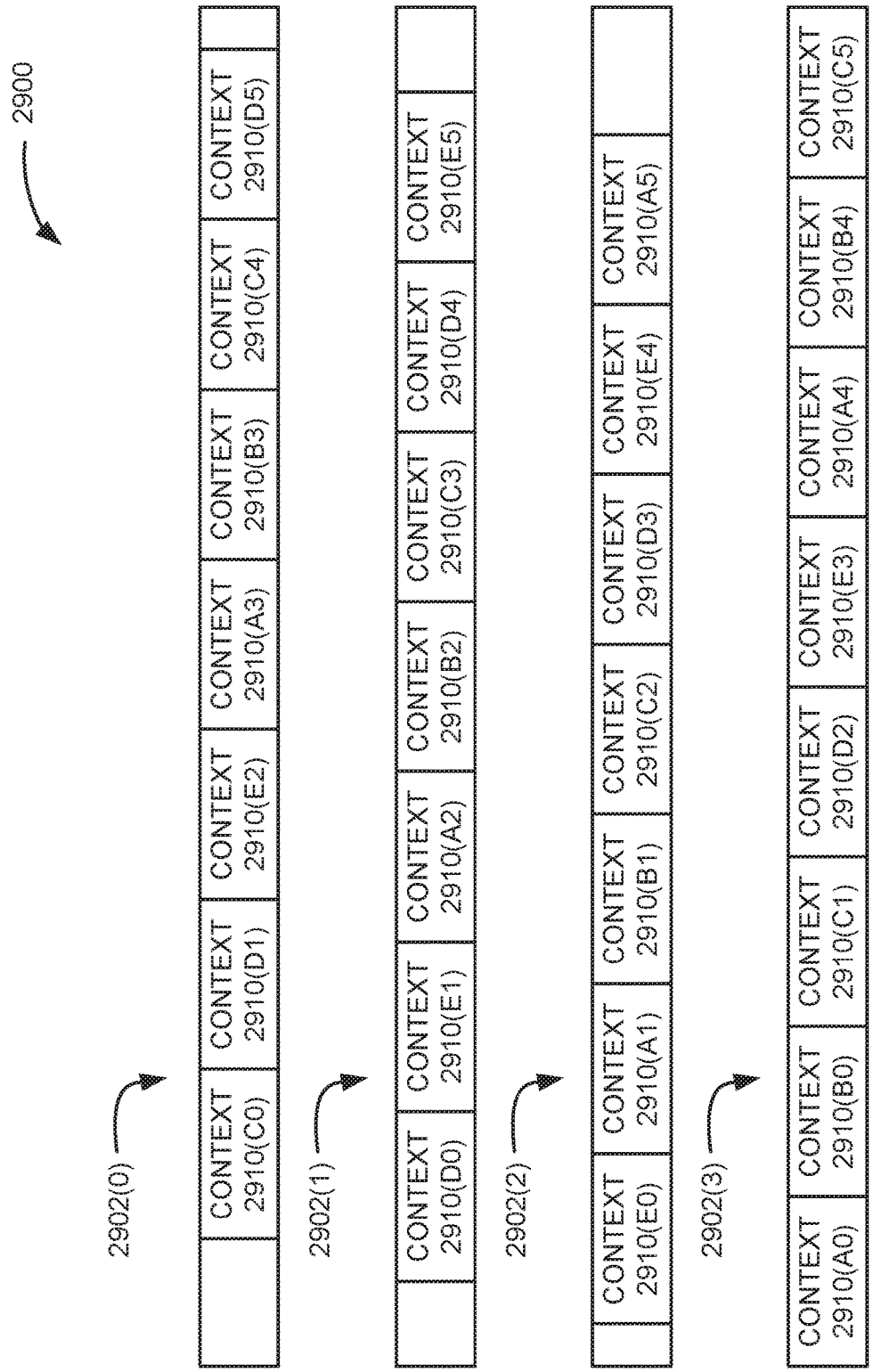
FIG. 29 is a set of timelines illustrating fine VM migration associated with the PPU of FIG. 2, according to various embodiments.

FIG. 29 is a set of timelines 2900 illustrating fine VM migration associated with the PPU 200 of FIG. 2, according to various embodiments. The set of timelines 2900 functions substantially the same as the sets of timelines 2500 and 2600 of FIGS. 25 and 26, respectively, and the timeline 2700 of FIG. 27 except as further described below. As shown, the set of timelines 2900 includes, without limitation, four PPU partition timelines 2902(0), 2902(1), 2902(2), and 2902(3). In some embodiments, the PPU partition timelines 2902(0), 2902(1), 2902(2), and 2902(3) may correspond to four PPU partitions 600 of FIG. 6. Each PPU partition 600 includes one SMC engine 700. Therefore, each PPU partition 600 may execute one VM at a time. As shown in PPU partition timelines 2902(0), 2902(1), 2902(2), and 2902(3), each PPU partition 600 time-slices among five VMs, referred to as VM A through VM F. As a result, each of the five VMs migrates among the four PPU partitions 600.

During the period of time shown in FIG. 29, VM A executes processing context 2910(A0) on a first PPU partition, as shown on PPU partition timeline 2902(3). VM A then migrates to a second PPU partition and executes processing context 2910(A1) on PPU partition timeline 2902(2). Subsequently, VM A migrates, in turn, to a third PPU partition and a fourth PPU partition and executes processing contexts 2910(A2) and 2910(A3) on PPU partition timelines 2902(1) and 2902(0), respectively. VM A then migrates back to the first PPU partition and executes processing context 2910(A4) on PPU partition timeline 2902(3). Finally, VM A again migrates to the second PPU partition and executes processing context 2910(A5) on PPU partition timeline 2902(2).

In similar fashion, VM B, executing processing contexts 2910(B0) through 2910(B4), executes on the first PPU partition 600, and then migrates among the other three PPU partitions, as shown on PPU partition timelines 2902(0), 2902(1), 2902(2), and 2902(3). The remaining three VMs likewise migrate among the four PPU partitions, where VM C, executes processing contexts 2910(C0) through 2910 (C5), VM D, executes processing contexts 2910(D0) through 2910(D5), and VM E, executes processing contexts 2910(E0) through 2910(E5).

In this manner, five VMs migrate among four PPU partitions 600, where each VM accesses substantially the same amount of PPU resources. Overall, the five VMs are each able to execute about 80% of the time, where four PPU partitions 600 divided by five VMs is equal to ⅘, or 80%. As a result fine VM migration performs load balancing among a set of VMs, regardless of the number of VMs relative to the number of PPU partitions 600.

Figure 30A:
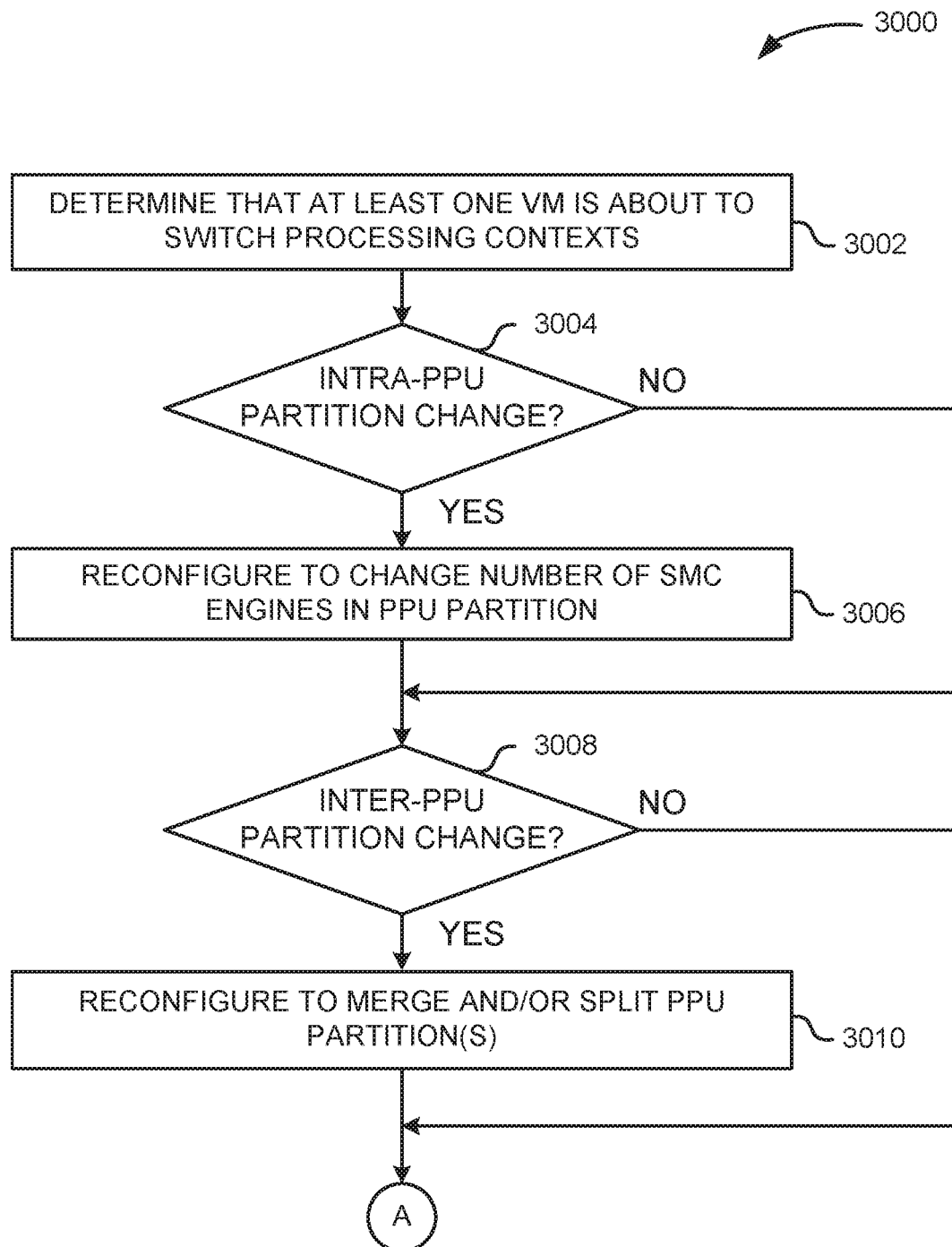
FIGS. 30A-30B set forth a flow diagram of method steps for time-slicing VMs in the PPU of FIG. 2, according to various embodiments.
Figure 30B:
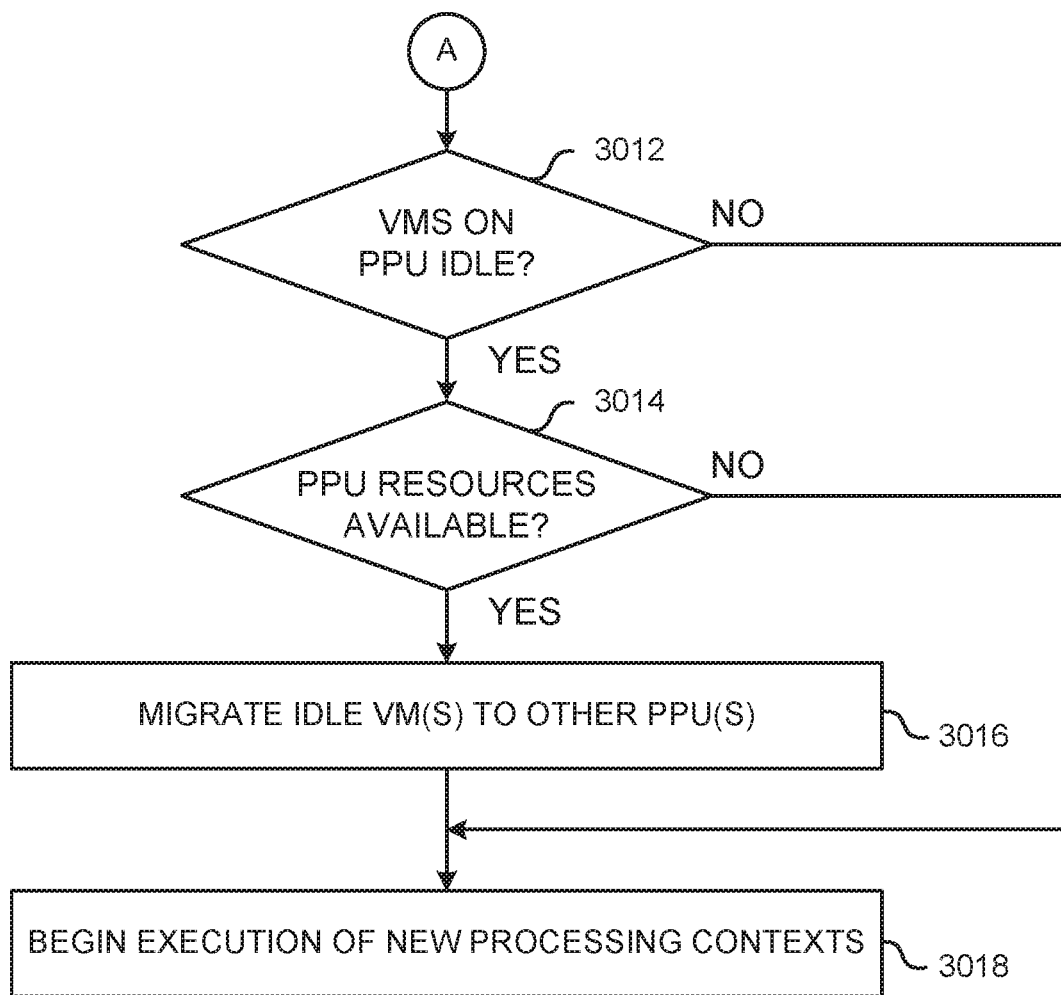

FIGS. 30A-30B set forth a flow diagram of method steps for time-slicing VMs in the PPU 200 of FIG. 2, according to various embodiments. Although the method steps are described in conjunction with the systems of FIGS. 1-15, persons of ordinary skill in the art will understand that any system configured to perform the method steps, in any order, is within the scope of the present disclosure.

As shown, a method 3000 begins at step 3002, where PPU 200 determines that at least one VM is about to switch from a first set of one or more processing contexts to a second set of one or more processing contexts. A VM may be about to switch processing context(s) for any technically feasible reason, including, without limitation, the VM completes execution of all tasks, the VM enters an idle state, the VM has executed for a maximum allotted amount of time, or the VM has generated an error.

At step 3004, PPU 200 determines whether PPU 200 needs to perform an intra-PPU partition change to accommodate the new processing context(s). An intra-PPU partition change occurs when a PPU partition 600 maintains the same number of PPU slices 610 during the context switch, but changes the number of active SMC engines 700 within PPU partition 600. If the PPU 200 does not need to perform an intra-PPU partition change to accommodate the new processing context(s), then the method 3000 proceeds to step 3008. If, however, PPU 200 needs to perform an intra-PPU partition change to accommodate the new processing context(s), then the method 3000 proceeds to step 3006, where PPU 200 reconfigures PPU partition 600 to maintain the same number of PPU slices 610 while changing the number of active SMC engines 700.

At step 3008, PPU 200 determines whether PPU 200 needs to perform an inter-PPU partition change to accommodate the new processing context(s). An inter-PPU partition change occurs when a PPU partition 600 changes the number of PPU slices 610 during the context switch by merging or splitting one or more PPU partitions 600. As a result, PPU 200 also changes the number of PPU partitions 600 within 700. Depending on the new processing contexts, PPU 200 may or may not change the number of active SMC engines 700 within each PPU partition 600. If the PPU 200 does not need to perform an inter-PPU partition change to accommodate the new processing context(s), then the method 3000 proceeds to step 3012. If, however, PPU 200 needs to perform an inter-PPU partition change to accommodate the new processing context(s), then the method 3000 proceeds to step 3010, where PPU 200 reconfigures PPU partition 600 to change the number of PPU slices 610 included in PPU partition 600. In order to change the number of PPU slices 610 in a PPU partition 600, PPU 200 merges two or more PPU partitions 600 into a single PPU partition 600. Additionally or alternatively, PPU 200 splits a PPU partition 600 into two or more PPU partitions 600.

At step 3012, PPU 200 determines whether all VMs executing on a given PPU 200 are idle. If one or more VMs are not idle (active) on the given PPU 200, then the method proceeds to step 3018. If, on the other hand, all VMs executing on a given PPU 200 are idle, then the method 3000 proceeds to step 3014, where PPU 200 determines whether one or more other PPUs 200 have the resources available to execute the idle VMs. If the resources are not available on one or more other PPUs 200, then the method proceeds to step 3018. If, on the other hand, the resources are not available on one or more other PPUs 200, then the method proceeds to step 3016, where PPU 200 migrates the idle VMs to one or more other PPUs 200.

At step 3018, after performing intra-PPU partition changes, inter-PPU partition changes, and/or VM migrations, PPU 200 begins executing the new processing contexts. The method 3000 then terminates. In various embodiments, PPU 200 determines the need to perform intra-PPU changes independently of determining the need to perform inter-PPU changes. Similarly, in various embodiments, PPU 200 determines the need to perform inter-PPU changes independently of determining the need to perform intra-PPU changes.

Privileged Register Address Mapping

As further described herein, PRI hub 512 of FIG. 5 and an internal PRI bus (not shown) enables a CPU 110 and/or any unit in the PPU 200 to read and write privileged registers, also called "PRI registers, that are distributed throughout the PPU 200. In so doing, PRI hub 212 is configured to map PRI bus addresses between a generic address space that covers all the PRI bus registers and an address space defined separately for each sys pipe 230. When communicating over a PCIe link, generally from the CPU, the PRI registers are accessed via a PCIe address space referred to herein as the "base address register 0" space or, more simply, the "BAR0" address space, as is typical for devices attached to PCIe busses. Typically, the addressable memory range of BAR0 address space for the PPU 200 is limited to 16 megabytes (MB), since a large number of devices must all fit in the BAR0 address space. The address range of 16 MB is adequate for accessing the privileged registers for a single SMC engine 700. However, in order to support multiple SMC engines 700, the address range may exceed 16 MB. Therefore, PRI hub 512 provides two addressing modes in order to support execution with multiple SMC engines 300. The first addressing mode, referred to herein as "legacy mode," applies to operations involving a single SMC engine 700. The second addressing mode, referred to herein as "SMC engine address mode," applies to operations involving multiple SMC engines 700. The addressing modes are now described.

Figure 31:
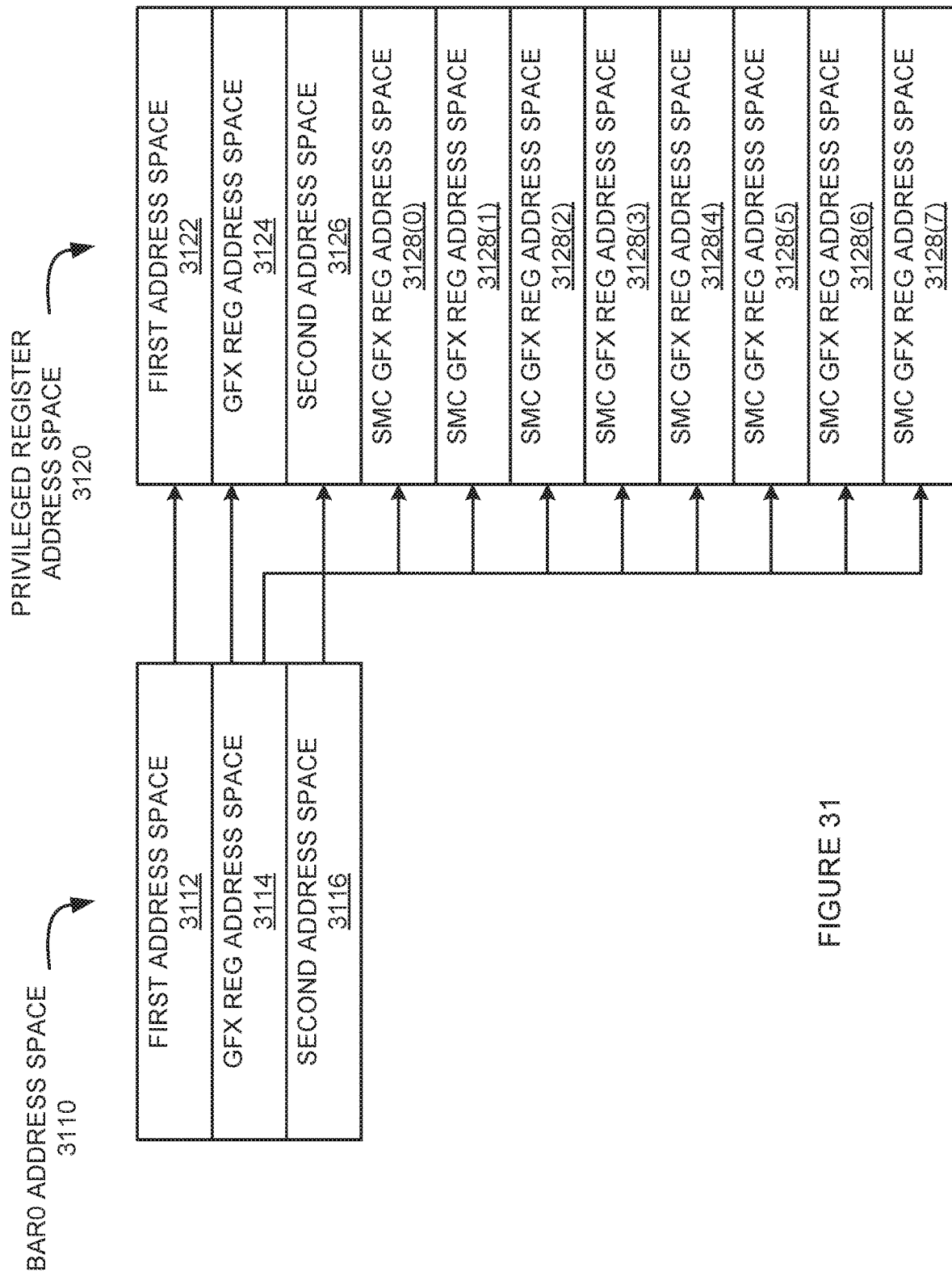
FIG. 31 is a memory map that illustrates how the BAR0 address space maps to the privileged register space within the PPU of FIG. 2, according to various embodiments.

FIG. 31 is a memory map that illustrates how the BAR0 address space 3110 maps to the privileged register address space 3120 within the PPU 200 of FIG. 2, according to various embodiments. BAR0 address space 3110 includes, without limitation, a first address space 3112, a graphics register (GFX REG) address space 3114, and a second address space 3116. Privileged register address space 3120 includes, without limitation, a first address space 3122, a legacy graphics register address space 3124, a second address space 3126, and SMC graphics register address spaces 3128(0)-3128(7). BAR0 address space 3110 supports two addressing modes, legacy addressing mode and SMC addressing mode. In general, the objective of the two modes are: (1) legacy mode where the entire PPU 200 is treated as one engine with one set of PRI Registers; and (2) SMC mode where each PPU partition 600 is addressed as if each PPU partition 600 were a separate engine and as if each PPU partition 600 is an entire PPU 200 in its own right. The SMC mode is allows driver software 122 to be identical when dealing with the entire PPU in legacy mode and when dealing with just one PPU partition 600. That is, the diver may be written once and used in both scenarios, legacy mode and SMC mode.

In legacy addressing mode, PPU 200 executes tasks as a single cluster of hardware resources, and not as separate PPU partitions 600 with separate SMC engines 700. In legacy mode, directing a memory read or write to a memory address towards first address space 3112 or second address space 3116 of BAR0 address space 3110 accesses a corresponding memory address within first address space 3122 or second address space 3126, respectively, of privileged register address space 3120. Similarly, directing a memory read or write to a memory address towards graphics register address space 3114 of BAR0 address space 3110 accesses a corresponding memory address within legacy graphics register address space 3124 of privileged register address space 3120. Legacy graphics register address space 3124 includes an address range for various components within PPU 200, including, without limitation, compute FE 540, graphics FE 542, SKED 550, CWD 560, and PDA/PDB 562. In addition, legacy graphics register address space 3124 includes an address range for each of GPCs 242. GPCs 242 are individually addressable, less any GPCs 242 that have been removed due to floor sweeping, via dedicated address ranges within legacy graphics register address space 3124. Additionally or alternatively, legacy graphics register address space 3124 includes address ranges for concurrently broadcasting data to all of GPCs 242. These GPC broadcast address spaces may be useful when configuring all of GPCs 242 identically.

In SMC addressing mode, PPU 200 executes tasks as separate PPU partitions 600 with separate SMC engines 700. As in legacy mode, directing a memory read or write to a memory address towards first address space 3112 or second address space 3116 of BAR0 address space 3110 accesses a corresponding memory address within first address space 3122 or second address space 3126, respectively, of privileged register address space 3120. In SMC mode, SMC graphics register address spaces 3128(0)-3128(7) are provided to access the various components within each of SMC engines 700(0)-700(7), respectively. These components include, without limitation, compute FE 540(0)-540(7), graphics FE 542(0)-542(7), SKED 550(0)-550(7), CWD 560(0)-560(7), and PDA/PDB 562(0)-562(7). GPCs 242 for a particular corresponding SMC engine 700 are individually addressable, less any GPCs 242 that have been removed due to floor sweeping, via dedicated address ranges within legacy graphics register address space 3124. Additionally or alternatively, legacy graphics register address space 3124 includes an address range for concurrently broadcasting data to all of GPCs 242 for a particular corresponding SMC engine 700. BAR0 address space 3110 provides two mechanisms for accessing SMC graphics register address spaces 3128(0)-3128(7).

In a first mechanism, graphics register address space 3114 of BAR0 address space 3110 maps to one of SMC graphics register address spaces 3128(0)-3128(7) in privileged register address space 3120. A particular address within BAR0 address space 3110 accesses an SMC window register. SMC window register includes two fields. These two fields include an SMC enable field, and an SMC index field. The SMC enable field includes a binary logic value that is either FALSE or TRUE. If the SMC enable field is FALSE, then BAR0 address space 3110 accesses privileged register address space 3120 in legacy addressing mode, as described herein. If the SMC enable field is TRUE, then BAR0 address space 3110 accesses privileged register address space 3120 in SMC addressing mode, based on the values of the SMC index field. The value of the SMC index field specifies which SMC engine 700 is currently mapped to BAR0 address space 3110. For example, if the value of the SMC index field is 0, then SMC graphics register address space 3128(0) of privileged register address space 3120 would be mapped to graphics register address space 3114 of BAR0 address space 3110. Likewise, if the value of the SMC index field is 1, then SMC graphics register address space 3128(1) of privileged register address space 3120 would be mapped to graphics register address space 3114 of BAR0 address space 3110, and so on. Directing a memory read or write to a memory address towards graphics register address space 3114 of BAR0 address space 3110 accesses a corresponding memory address within SMC graphics register address space 3128 specified by the SMC index field. Via this first mechanism, SMC graphics register address space 3128 for SMC engine 700 specified by the SMC index field is accessible, while access to the remaining SMC graphics register address spaces 3128 is prohibited.

In a second mechanism, individual addresses within any of SMC graphics register address spaces 3128(0)-3128(7) are accessible by certain privileged components, such as the hypervisor 124. This second mechanism accesses SMC graphics register address spaces 3128(0)-3128(7) via two particular addresses within BAR0 address space 3110. One of the two addresses accesses an SMC address register. The other of the two addresses accesses an SMC data register. A particular memory address anywhere within SMC graphics register address spaces 3128(0)-3128(7) is accessed in two steps. In a first step, the SMC address register is written with an address that corresponds to an address in SMC graphics register address spaces 3128(0)-3128(7). In a second step, the SMC data register is read or written with a data value. Reading or writing the SMC data register in BAR0 address space 3110 causes a corresponding read or write to privileged register address space 3120 at the memory address specified in the SMC address register. The SMC address register is then dereferenced, thereby enabling the SMC address register and the SMC data register for a subsequent transaction. Reading or writing the SMC address register does not cause a read or write to privileged register address space 3120.

Figure 32:
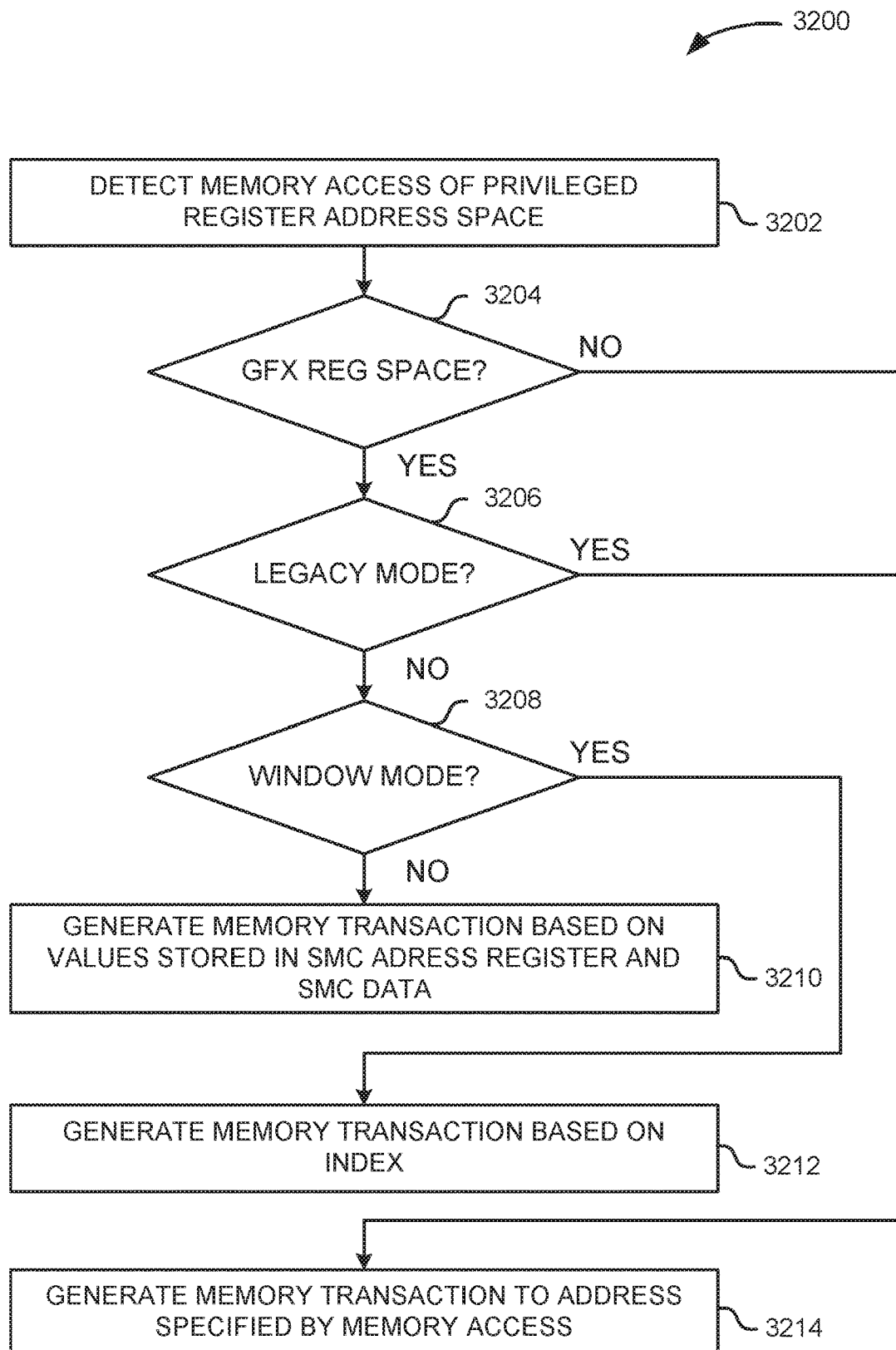
FIG. 32 is a flow diagram of method steps for addressing privileged register address space in the PPU of FIG. 2, according to various embodiments.

FIG. 32 is a flow diagram of method steps for addressing privileged register address space in the PPU 200 of FIG. 2, according to various embodiments. Although the method steps are described in conjunction with the systems of FIGS. 1-17, persons of ordinary skill in the art will understand that any system configured to perform the method steps, in any order, is within the scope of the present disclosure.

As shown, a method 3200 begins at step 3202, where PPU 200 detects a memory access directed towards privileged register address space 3120. More specifically, PPU 200 detects a memory access directed towards BAR0 address space 3110. At step 3204, PPU 200 determines whether the memory access is directed towards graphics register address space 3114. If the memory access is not directed towards graphics register address space 3114, then the method 3200 proceeds to step 3214, where PPU 200 generates a memory transaction to the address specified by the memory access. The method 3200 then terminates.

Returning to step 3204, if the memory access is directed towards graphics register address space 3114, then the method 3200 proceeds to step 3206, where PPU 200 determines whether the memory access is in legacy mode. If the memory access is in legacy mode, then the method 3200 proceeds to step 3214, where PPU 200 generates a memory transaction to the address specified by the memory access. The method 3200 then terminates. If, on the other hand, the memory access is not in legacy mode, then the method 3200 proceeds to step 3208, where PPU 200 determines whether the memory access is in window mode.

If the memory access is in window mode, then the method proceeds to step 3212, where PPU 200 generates a memory transaction based on the value of the SMC index field specified in SMC window register. The value of the SMC index field specifies which SMC engine 700 is currently mapped to BAR0 address space 3110. For example, if the value of the SMC index field is 0, then SMC graphics register address space 3128(0) of privileged register address space 3120 would be mapped to graphics register address space 3114 of BAR0 address space 3110. Likewise, if the value of the SMC index field is 1, then SMC graphics register address space 3128(1) of privileged register address space 3120 would be mapped to graphics register address space 3114 of BAR0 address space 3110, and so on. Directing a memory read or write to a memory address towards graphics register address space 3114 of BAR0 address space 3110 accesses a corresponding memory address within SMC graphics register address space 3128 specified by the SMC index field. Via this first mechanism, SMC graphics register address space 3128 for SMC engine 700 specified by the SMC index field is accessible, while access to the remaining SMC graphics register address spaces 3128 is prohibited. The method 3200 then terminates.

Returning to step 3208, if the memory access is not in window mode, then the method proceeds to step 3210, where PPU 200 generates a memory transaction based on the values of the SMC address register and SMC data register. More specifically, PPU 200 accesses SMC graphics register address spaces 3128(0)-3128(7) via two particular addresses within BAR0 address space 3110. One of the two addresses accesses an SMC address register. The other of the two addresses accesses an SMC data register. A particular memory address anywhere within SMC graphics register address spaces 3128(0)-3128(7) is accessed in two steps. In a first step, the SMC address register is written with an address that corresponds to an address in SMC graphics register address spaces 3128(0)-3128(7). In a second step, the SMC data register is read or written with a data value. Reading or writing the SMC data register in BAR0 address space 3110 causes a corresponding read or write to privileged register address space 3120 at the memory address specified in the SMC address register. The SMC address register is then dereferenced, thereby enabling the SMC address register and the SMC data register for a subsequent transaction. Reading or writing the SMC address register does not cause a read or write to privileged register address space 3120. The method 3200 then terminates.

Performance Monitoring with Multiple SMC Engines

As further discussed herein, performance monitors (PMs), such as PM 236 of FIG. 2, PM 360 of FIG. 3, and PM 430 of FIG. 4, monitor the overall performance and/or resource consumption of the corresponding components included in PPU 200. The performance monitors (PMs) are included in a performance monitoring system that provides performance monitoring and profiling across multiple SMC engines 700. The performance monitoring system simultaneously or substantially simultaneously profiles multiple VMs and processing contexts executing in the VMs. The performance monitoring system isolates the multiple VMs and multiple processing contexts executing in the VMs from each other with respect to how performance data is generated and captured, in order to prevent leakage of performance data between VMs. PMs 232 and associated counters within the performance data monitoring system track attribution of performance data to particular SMC engines 700. In the case of shared resources and units, where attribution are not traceable to a particular SMC engine 700, a device with a higher privilege entity, such as hypervisor 124, gathers performance data for the shared resources and units. The performance monitoring system simultaneously profiles compute engines and graphics engines, and profiles VMs as the VMs migrate to other PPU partitions 600 and/or other PPUs 200. The performance monitoring system is now described.

Figure 33:
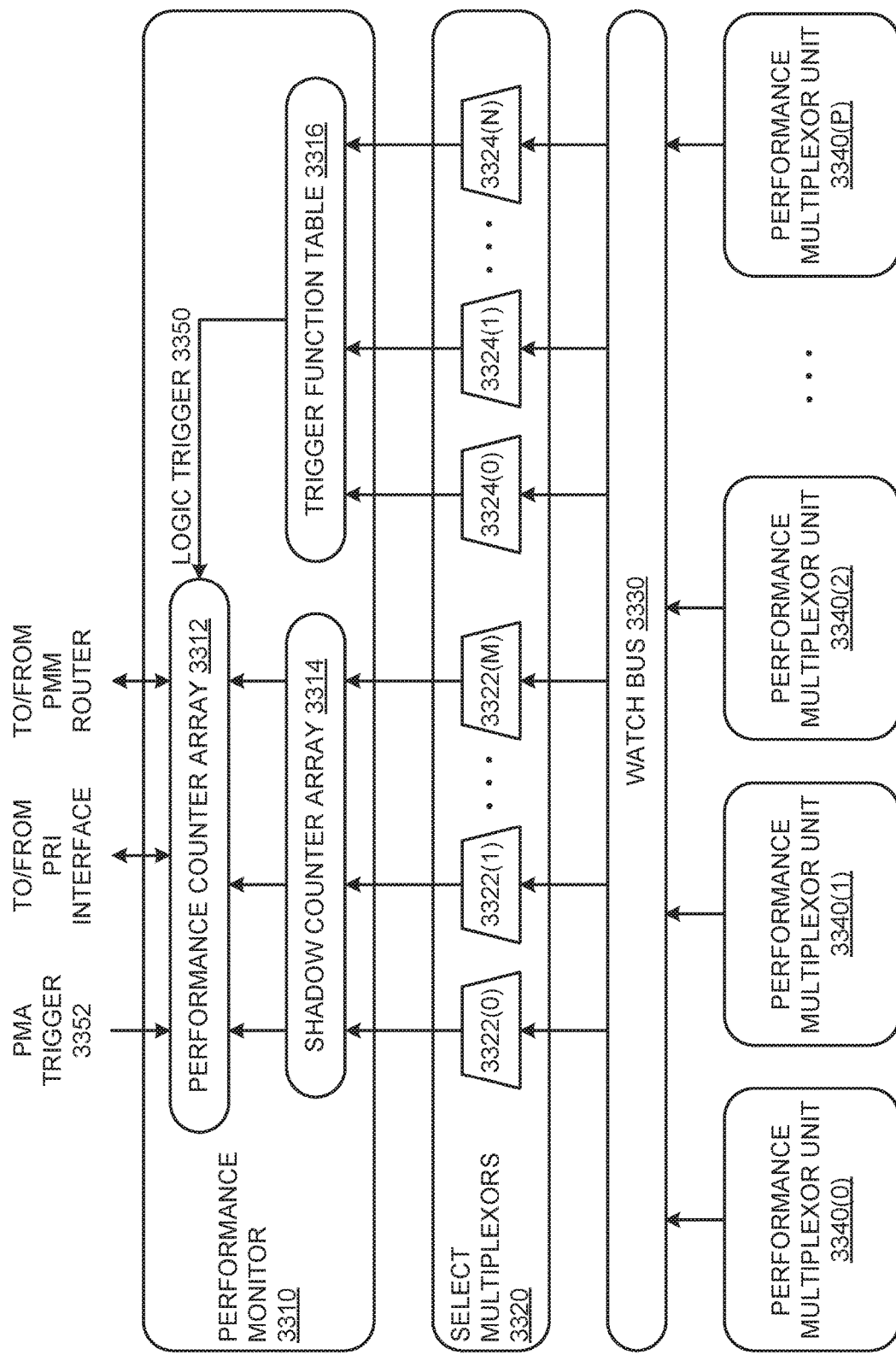
FIG. 33 is a block diagram of a performance monitoring system for the PPU of FIG. 2, according to various embodiments.

FIG. 33 is a block diagram of a performance monitoring system 3300 for the PPU 200 of FIG. 2, according to various embodiments. As shown, the performance monitoring system 3300 includes, without limitation, a performance monitor 3310, select multiplexors 3320, a watch bus 3330, and performance multiplexor units 3340. Taken together, performance monitor 3310 and select multiplexors 3320 constitute a performance monitor module (PMM). Each GPC 242, each partition unit 262, and each sys pipe 230 includes at least one PMM. The performance multiplexor units 3340 are included within each unit that is being monitored. The logic within performance multiplexor units 3340 are included in one or more of FE 540, SKED 550, CWD 560, and/or other suitable functional units. As further described herein, all of the components of the various performance monitoring systems 3300 communicate with a performance monitor aggregator (not shown in FIG. 33). The performance monitoring system 3300 functions substantially the same as PM 236 of FIG. 2, PM 360 of FIG. 3, and PM 430, except as further described below.

In operation, performance multiplexor units 3340(0)-3340(P) enable programmable selection of groups of signals within PPU 200 that can be monitored by a corresponding performance monitor 3340. Each performance multiplexor 3340 may select a group of signals that is transmitted to watch bus 3330. A subset of the signals from watch bus 3330 is selected for monitoring via select multiplexors 3320. Signals from watch bus 3330 that are not selected via select multiplexors 3320 are not monitored. Signals from within PPU 200 are connected to performance multiplexor units 3340(0)-3340(P) in groups such that one group at a time may be selected for monitoring. Performance multiplexor unit 3340 multiplexes the signals such that the signals in a particular signal group are selected as a group. The selection inputs to the multiplexors included in performance multiplexor unit 3340 are programmed via one or more registers included in privileged register address space 3120. As a result, the particular signals transmitted to watch bus 3330 by the performance multiplexor unit 3340 is programmable.

Watch bus 3330 receives signal groups from performance multiplexor units 3340(0)-3340(P). Each signal transmitted to watch bus 3330 is connected as an input to each of the select multiplexors 3320.

Select multiplexors 3320 include a set of individual multiplexors 3322(0)-3322(M) and 3324(0)-3324(N). The input side of each multiplexor 3322(0)-3322(M) and 3324(0)-3324(N) receives all of the signals from watch bus 3330 and selects one signal to transmit. The selection inputs to multiplexors 3322(0)-3322(M) and 3324(0)-3324(N) are programmed via one or more registers included in privileged register address space 3120. As a result, the set of particular signals transmitted by select multiplexors 3320 is programmable. Select multiplexors 3320 transmit the selected signals to performance monitor 3310.

The particular PPU signals monitored by performance monitor 3310 is programmable as a result of the composition of programmable performance multiplexor units 3340 and programmable select multiplexors 3320.

Performance monitor 3310 includes a performance counter array 3312, a shadow counter array 3314, and a trigger function table 3316. Performance monitor 3310 receives signals transmitted by select multiplexors 3320. More specifically, shadow counter array 3314 receives signals transmitted by multiplexors 3322(0)-3322(M). Similarly, trigger function table 3316 receives signals transmitted by multiplexors 3324(0)-3324(N). As further described, counters within the shadow counter array 3314 are updated based on signals received from multiplexors 3322(0)-3322(M) and on various trigger conditions. In general, shadow counter array 3314 includes a set of one or more signal counters, where each counter increments whenever a signal received from a corresponding multiplexor 3322 is in a particular logic state. Values in shadow counter array 3314 are transferred to performance counter array 3312 based on certain signals in the form of trigger conditions. Performance counter array 3312 includes a set of one or more signal counters corresponding to the signal counters included in shadow counter array.

In one mode of operation, the counters in shadow counter array 3314 are reset to zero after transfer to the performance counter array 3312 such that the shadow counter values stored in shadow counter array 3314 always correspond to activity since the previous trigger.

Performance monitor 3310 is configurable according to various counting modes that define the number of counters included in performance counter array 3312 and shadow counter array 3314. The counting modes further define how and when performance counter array 3312 and shadow counter array 3314 are triggered and how data from performance counter array 3312 is transmitted to other devices within PPU 200. These various counting modes may be grouped into two main performance monitoring modes—non-streaming performance monitoring and streaming performance monitoring.

In non-streaming performance monitoring mode, trigger function table 3316 is programmed to combine signals received from multiplexors 3324(0)-3324(N) according to certain specified logical signal expressions. When the conditions of one or more of these logical signal expressions is met, trigger function table 3316, transmits a signal in the form of logic trigger 3350 to performance counter array 3312. In response to receiving the logic trigger 3350, performance counter array 3312 samples and stores the current values in shadow counter array 3314. The values in performance counter array 3312 are then readable via privileged register address space 3120.

In streaming performance monitoring mode, a performance monitor aggregator (PMA) transmits a signal in the form of a PMA trigger 3352 to performance counter array 3312. In response to receiving PMA trigger 3352, performance counter array 3312 samples and stores the current values in shadow counter array 3314. Performance monitor 3310 generates performance monitor (PMM) records that may include, without limitation, the values in performance counter array 3312 at the time PMA trigger 3352 was received from the PMA, a count of the total number of PMA triggers that performance monitor 3310 has responded to, an SMC engine ID, and a PMM ID which uniquely identifies the PMM which generated the record in the system. These PMM records are then transmitted to a PMM router associated with one or more performance monitors 3310. The PMM router, in turn, transmits the PMM records to the PMA. In some embodiments, the PMM ID for each performance monitor 3310 can be programmed via one or more registers included in privileged register address space 3120.

In general, a particular performance monitor 3310 in a particular performance monitoring system 3300 in PPU 200 resides within the same clock frequency domain as the signals being monitored by that particular performance monitor 3310. However, a particular performance monitor 3310 may reside within the same clock frequency domain or within a different clock frequency domain relative to another performance monitor in PPU 200.

Various configurations of performance multiplexor units 3340 are now described.

Figure 34A:
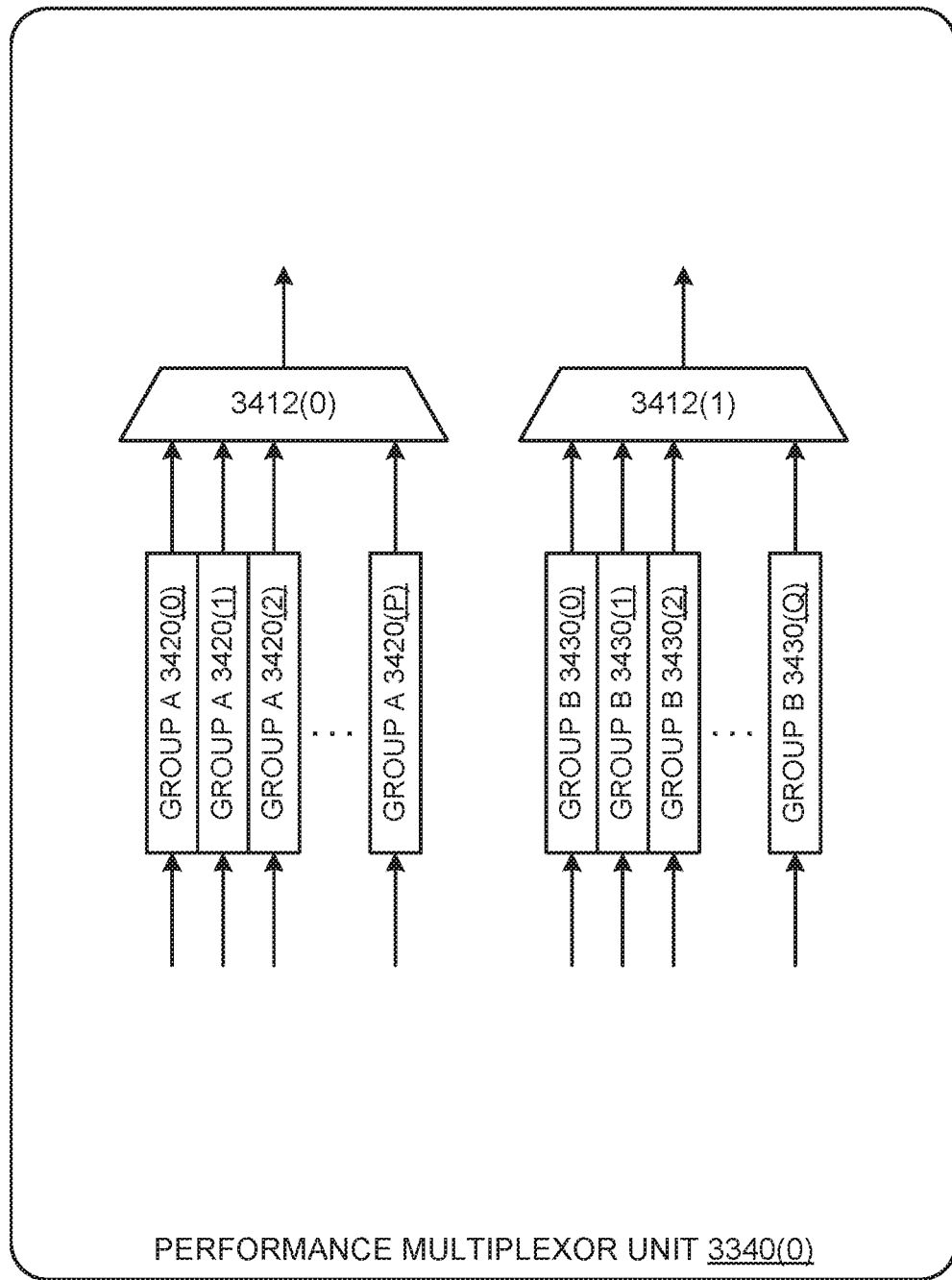
FIGS. 34A-34B illustrate various configurations of the performance multiplexor units of FIG. 33, according to various embodiments.
Figure 34B:
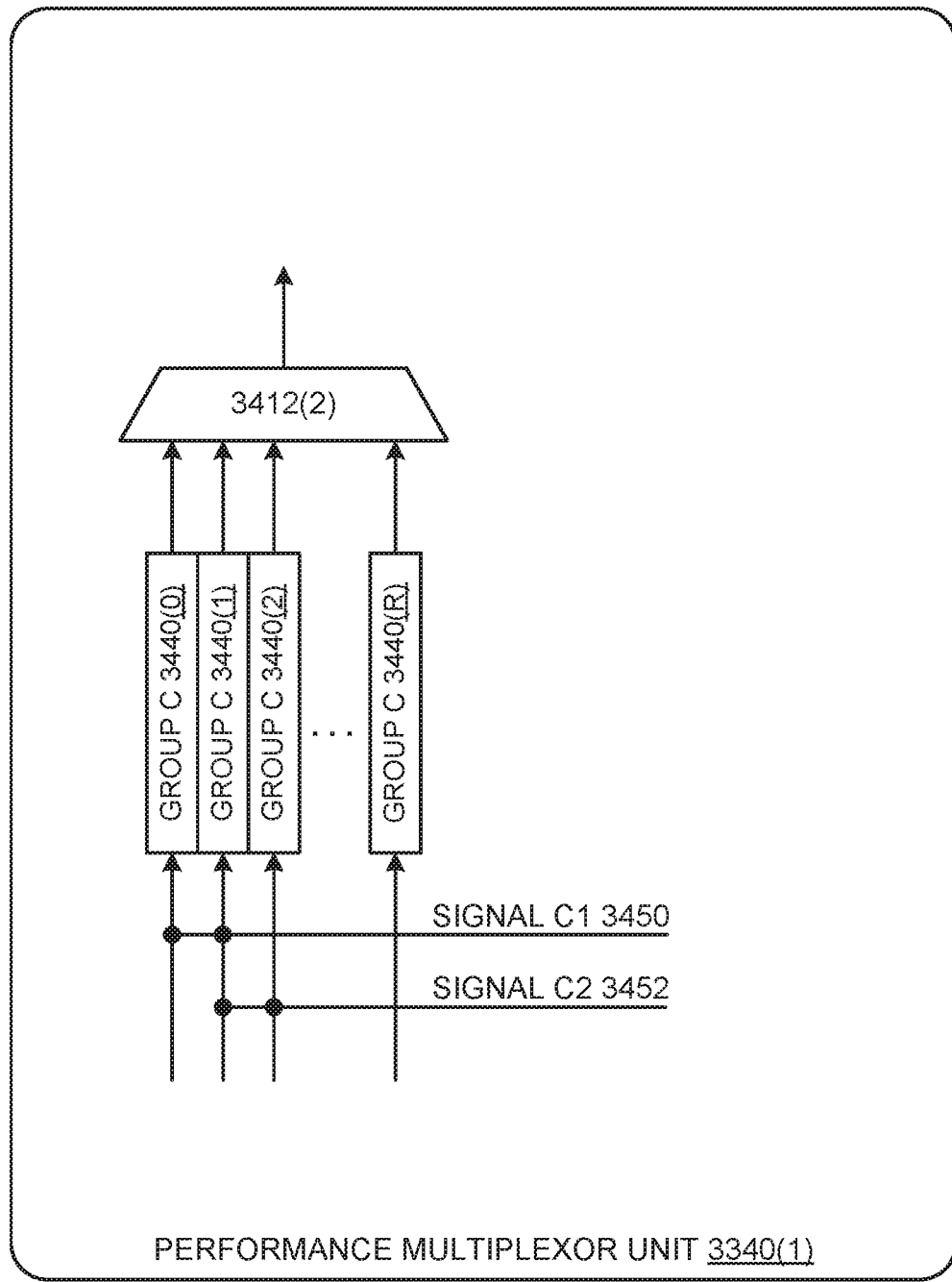

FIGS. 34A-34B illustrate various configurations of the performance multiplexor units 3340 of FIG. 33, according to various embodiments.

As shown in FIG. 34A, a first configuration of a performance multiplexor unit 3340(0) includes, without limitation, signal groups A 3420(0)-3420(P), signal groups B 3430(0)-3430(Q), and multiplexors 3412(0) and 3412(1). In operation, multiplexor 3412(0) selects one of signal groups A 3420(0)-3420(P), where each of signal groups A 3420(0)-3420(P) is a subgroup within a larger signal group C. Multiplexor 3412(0) selects one of signal groups A 3420(0)-3420(P) and transmits the selected signal group to watch bus 3330. Similarly, multiplexor 3412(1) selects one of signal groups B 3430(0)-3430(Q), where each of signal groups B 3430(0)-3430(Q) is a subgroup within a larger signal group D. Multiplexor 3412(1) selects one of signal groups B 3430(0)-3430(Q) and transmits the selected subgroup to watch bus 3330. The selection inputs to multiplexors 3412 included in performance multiplexor unit 3340(0) are programmed via one or more registers included in privileged register address space 3120. As a result, the set of signals transmitted by performance multiplexor unit 3340(0) is programmable.

As shown in FIG. 34B, a second configuration of a performance multiplexor unit 3340(1) includes, without limitation, signal groups C 3440(0)-3440(R) and multiplexor 3412(2). In operation, multiplexor 3412(2) selects one of signal groups C 3440(0)-3440(R), where each of signal groups C 3440(0)-3440(R) is a subgroup within a larger signal group E. Multiplexor 3412(2) selects one of signal groups C 3440(0)-3440(R) and transmits the selected signal group to watch bus 3330. In the configuration of performance multiplexor units 3340(1), several signals are transmitted to multiple signal groups. In particular, signal C1

3450 is transmitted to both signal group C 3440(0) and signal group C 3440(1). Similarly, signal C2 3452 is transmitted to both signal group C 3440(1) and signal group C 3440(2). The selection inputs to multiplexor 3412(2) included in performance multiplexor unit 3340(1) are programmed via one or more registers included in privileged register address space 3120. As a result, the set of signals transmitted by performance multiplexor unit 3340(1) is programmable. The configuration of performance multiplexor unit 3340(1) may be useful where making signals available in multiple signal groups 3440 facilitates visibility of certain signal groups in a single pass of the performance monitoring system 3300.

Figure 35:
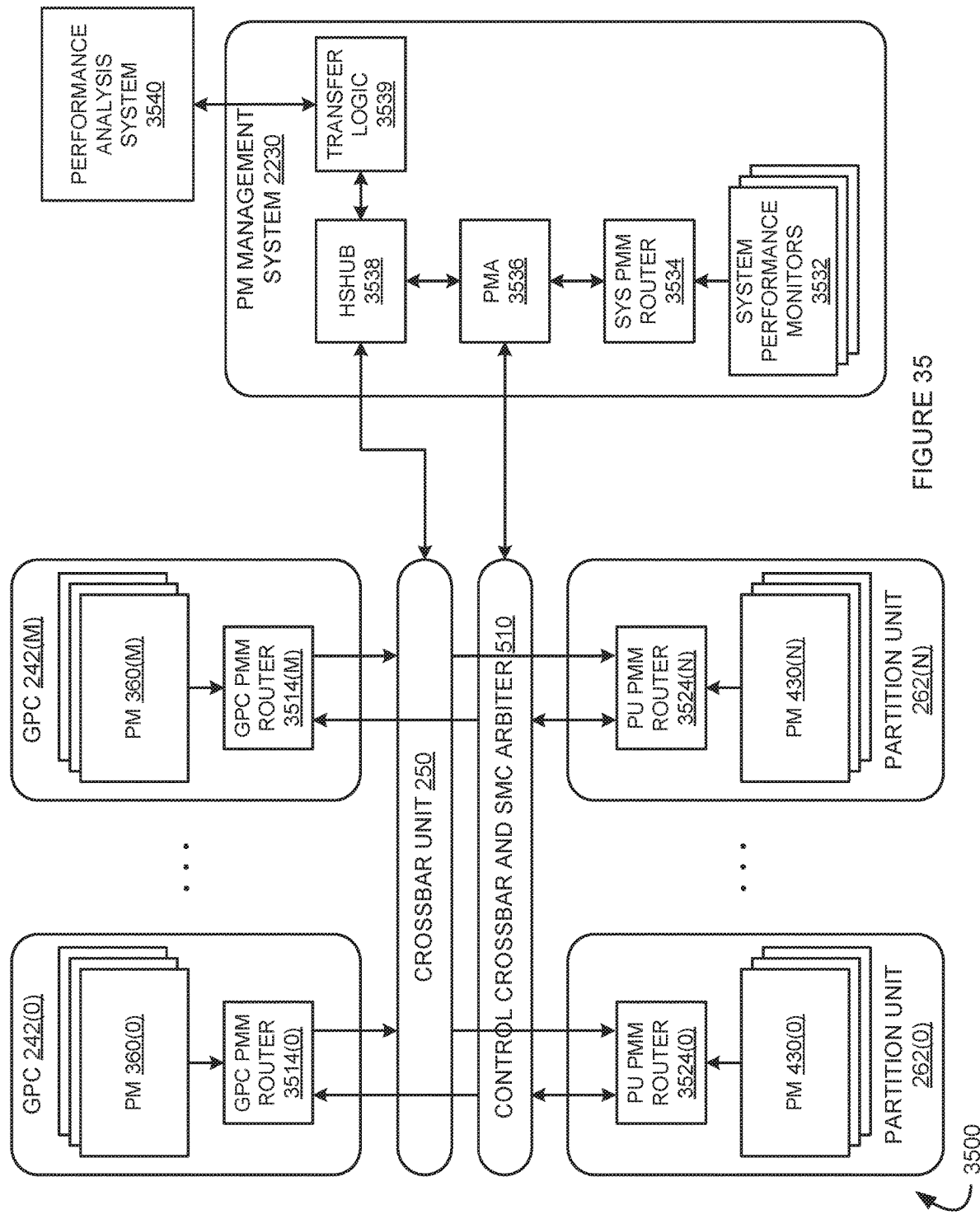
FIG. 35 is a block diagram of a performance monitor aggregation system for the PPU of FIG. 2, according to various embodiments.

FIG. 35 is a block diagram of a performance monitor aggregation system 3500 for PPU 200 of FIG. 2, according to various embodiments. As shown, the performance monitor aggregation system 3500 includes, without limitation, GPCs 242(0)-242(M), partition units 262(0)-262(N), a crossbar unit 250, a control crossbar and SMC arbiter 510, a PM management system 3530, and a performance analysis system 3540.

In operation, GPCs 242(0)-242(M) execute various processing tasks for one or more sys pipes 230. Each GPC 242 includes multiple parallel processing cores capable of executing a large number of threads concurrently and with any degree of independence and/or isolation from other GPCs 242. Each of GPCs 242(0)-242(M) includes one or more PMs 360(0)-360(M) and a GPC PMM router 3514(0)-3514(M). The PMs 360(0)-360(M) function substantially similar to the performance monitor 3310 of FIG. 33. The PMs 360(0)-360(M) generate PMM records that include performance data for the corresponding GPCs 242(0)-242 (M). The PMs 360(0)-360(M) transmit these PMM records to and receive data from the corresponding GPC PMM routers 3514(0)-3514(M). GPC PMM routers 3514(0)-3514 (M) transmit the PMM records to PM management system 3530 via the crossbar unit 250.

Partition units 262(0)-262(N) provide high-bandwidth memory access to DRAMS within PPU memory (not shown in FIG. 35). Each partition unit 262 performs memory access operations with a different DRAM in parallel with one another, thereby efficiently utilizing the available memory bandwidth of PPU memory. Each of partition units 262(0)-262(N) includes one or more PMs 430(0)-430(N) and a partition unit (PU) PMM router 3524(0)-3524(N). The PMs 430(0)-430(N) function substantially similar to the performance monitor 3310 of FIG. 33. The PMs 430(0)-430(N) generate PMM records that include performance data for the corresponding partition units 262(0)-262(N). The PMs 430 (0)-430(N) transmit these PMM records to and receive data from the corresponding PU PMM routers 3524(0)-3524(N). PU PMM routers 3524(0)-3524(N), in turn, transmit the PMM records to PM management system 3530 via the control crossbar and SMC arbiter 510.

PM management system 3530 controls collection of PMM records and stores the PMM records for reporting purposes. PM management system 3530 includes, without limitation, system performance monitors 3532, a system (SYS) PMM router 3534, a performance monitor aggregator (PMA) 3536, a high-speed hub (HSHUB), and transfer logic 3539.

System PMs 3532 function substantially similar to the performance monitor 3310 of FIG. 33. System PMs 3532 generate PMM records that include performance data for system-wide components that are not included within a particular GPC 242 or partition unit 262. System PMs 3532 transmit these PMM records to and receive data from system PMM router 3534. System PMM router 3534, in turn, transmits the PMM records to PMA 3536.

PMA 3536 generates triggers for the various performance monitors, including PMs 360(0)-360(M), PMs 430(0)-430 (N), and system PMs 3532. PMA 3536 generates these triggers via two techniques. In a first technique, PMA 3536 generates triggers in response to signals sent by each of the sys pipes 230 when the sys pipes 230 receive commands from the host interface 220. In a second technique, PMA 3536 generates triggers by periodically transmitting programmatically controlled trigger pulses to the PMs. In general, the performance monitor aggregation system 3500 incudes at least one programmable trigger pulse generator corresponding to each sys pipe 230 in addition to another trigger pulse generator that is independent from any sys pipe 230. PMA 3536 transmits the triggers to GPC PMM routers 3514(0)-3514(M) and PU PMs 3524(0)-3524(N) via the control crossbar and SMC arbiter 510. PMA 3536 transmits the triggers to the system PMM router 3534 directly via a communications link internal to PM management system 3530. The PMM routers transmit the PMA triggers to the corresponding PMs. In some embodiments these triggers take the form of trigger packets described below in conjunction with FIG. 36.

Figure 36:
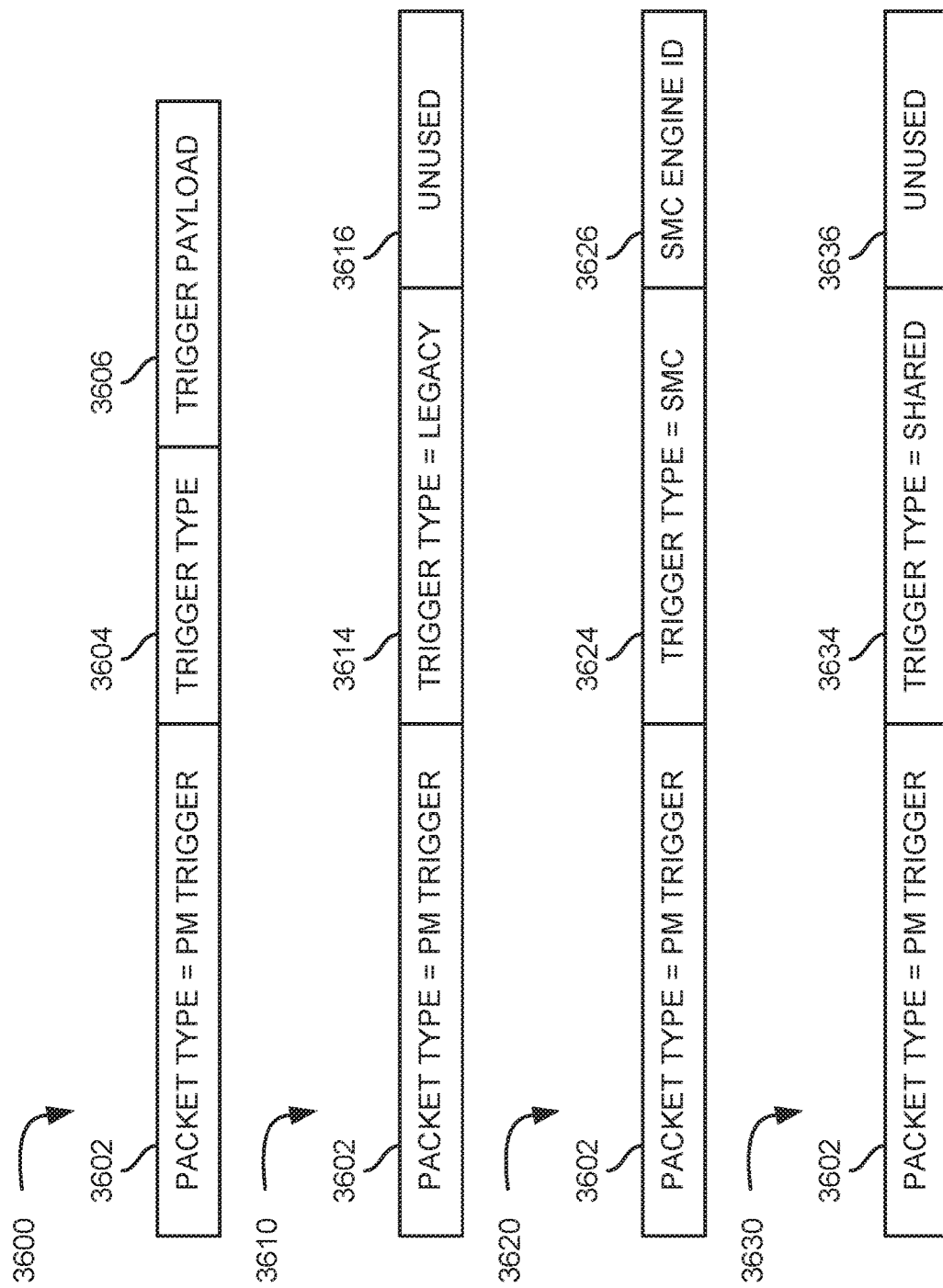
FIG. 36 illustrates the format of trigger packets associated with the performance monitor aggregation system of FIG. 35, according to various embodiments.

FIG. 36 illustrates the format of trigger packets associated with the performance monitor aggregation system 3500 of FIG. 35, according to various embodiments. The purpose of the trigger packets is to convey information about the source of the trigger to performance monitors 3310. Each of the performance monitors 3310 utilizes this information to determine whether or not to respond to a particular trigger. In that regard, trigger packets contain information that may be used by each performance monitor 3310 to determine whether or not to respond to a particular trigger packet. Each performance monitor 3310 that is associated with a particular SMC engine 700 is programmed with an SMC engine ID corresponding to that SMC engine 700. Such a performance monitor 3310 responds to per-SMC trigger packets that include the same SMC engine ID. Each performance monitor 3310 that is not associated with a particular SMC engine 700, or is programmed with an invalid SMC engine ID, does not respond to per-SMC trigger packets. Instead, such performance monitors 3310 respond to shared trigger packets.

Diagram 3600 illustrates the general format of trigger packets. As shown, diagram 3600 includes a packet type 3602 indicating that the packet is a PM trigger, a trigger type 3604, and a trigger payload 3606. The PM trigger type 3604 is an enumerated value that identifies the type of the trigger format. For example, in order to identify three different trigger packet types, the PM trigger type 3604 could be a 2-bit value. The trigger payload 3606 includes data that differs based on the PM trigger type 3604. Three different types of trigger packets are now described, where the three types of trigger packets correspond to the three categories of performance monitoring data (legacy data, per-SMC data, and shared data).

Diagram 3610 illustrates the format of legacy trigger packets. Legacy trigger packets include a packet type 3602 indicating that the packet is a PM trigger and a trigger type 3614 indicating that the trigger packet is a legacy trigger packet. The trigger payload 3606 of the legacy trigger packet includes an unused field 3616.

Diagram 3620 illustrates the format of per-SMC trigger packets. Per-SMC trigger packets include a packet type 3602 indicating that the packet is a PM trigger and a trigger type 3624 indicating that the trigger packet is an SMC trigger packet. The trigger payload 3606 of the per-SMC trigger packet includes an SMC engine ID field. The SMC engine ID field 3626 identifies the particular SMC engine 700 to which the trigger applies.

Diagram 3630 illustrates the format of shared trigger packets. Shared trigger packets include a packet type 3602 indicating that the packet is a PM trigger and a trigger type 3634 indicating that the trigger packet is a shared trigger packet. The trigger payload 3606 of the shared trigger packet includes an unused field.

The type of trigger packet sent by PMA 3536 is determined by the source of the trigger and one or more registers included in the privileged register address space 3120 corresponding to each trigger source that are programmed to indicate the trigger packet type that PMA should send for that source. In one mode of operation, PMA is programmed such that trigger packets generated in response to a source associated with an SMC engine are per-SMC trigger packets with the SMC engine ID set to the corresponding SMC engine, and trigger packets generated in response to sources that are not associated with an SMC engine are shared trigger packets. Trigger packets may be generated at any technically feasible rate, up to and including one trigger packet per compute cycle.

In response to receiving a trigger packet from PMA 3536, each PM checks the trigger type and trigger payload to determine if the PM should respond to the trigger. Every PM responds to legacy trigger packets unconditionally. In the case of per-SMC trigger packets, the PM responds only if the SMC engine ID contained in the trigger payload matches the SMC engine ID the SMC engine ID that has been assigned to the PM via programming of a register privileged register address space 3120. Programming an invalid SMC engine ID in this register ensures that the PM does not respond to per-SMC trigger packets. In the case of shared trigger packets, the PM responds only if the PM has been programmed to do so via a register in privileged register address space 3120. In one mode of operation, all of the PMs that are monitoring units uniquely assigned to an SMC engine are programmed to respond to per-SMC trigger packets with the corresponding SMC engine ID payload, and all other PMs are programmed to respond to shared trigger packets but not to per-SMC trigger packets.

In the case that a PM determines that a response to the trigger is warranted, the PM samples the counters included in the respective PM. The responding PMs then transmit PMM records that include sampled counter values, the total count of triggers responded to, the SMC engine ID assigned to the PM, and the PMM ID that uniquely identifies the PM within the system. The PMM routers, PMA 3536, and/or performance analysis system 3540 utilize the PMM ID to identify which PM transmitted the corresponding PMM record. The PMM routers then transmit said records to PMA 3536. More specifically, GPC PMM routers 3514(0)-3514(M) transmit PMM records to PMA 3536 via crossbar unit 250 and high-speed hub 3538. PU PMM routers 3524(0)-3524(N) transmit PMM records to PMA 3536 via the control crossbar and SMC arbiter 510. System PMM router 3534 transmits PMM records directly via a communications link internal to PM management system 3530. In this manner, PMA 3536 receives PMM records from all the relevant PMs in PPU 200.

In some embodiments, when transmitting a trigger, PMA 3536 additionally generates PMA records. In general, the purpose of a PMA record is to record to a time stamp at which a particular PMA trigger is generated and to associate the corresponding PMM records from the performance monitors 3310 that responded to the PMA trigger at that time stamp. The PMA records include, without limitation, a timestamp, an SMC engine ID associated with the source of the PMA trigger, a total count of triggers generated by sources with the same SMC engine ID, and associated metadata. When performance monitors 3310 receive a trigger, the performance monitors 3310 generate PMM records with a trigger count as well. Subsequently, when parsing PMA records and PMM records, PMM records with a certain trigger count may be associated with PMA records with the same trigger count. In this manner, the time stamp corresponding to PMM records is established based on the time stamp of the associated PMA record. As a result, the behavior of PPU 200 reflected by the PMM records is accurately associated with a range of time delimited by two adjacent PMA triggers from the same source.

Upon receiving PMM records and upon generating PMA records, PMA 3536 stores the PMM records and PMA records into a data store in the form of a record buffer in PPU memory via high-speed hub 3538. High-speed hub 3538 transmits the PMM records and PMA records to partition units 262(0)-262(N). The partition units then store the PMM records and PMA records in the record buffer in PPU memory. Additionally or alternatively, high-speed hub 3538 transmits the PMM records and PMA records to performance analysis system 3540 via transfer logic 3539. In some embodiments, high-speed hub 3538, transfer logic 3539, and performance analysis system 3540 may communicate with each other via a PCIe link. A user may view the PMM records and PMA records on performance analysis system 3540 in order to characterize the behavior of PPU 200 as reflected in the PMM records. Performance analysis system 3540 gathers PMM records and PMA records that have the same trigger count. Then, performance analysis system 3540 uses the time stamp from the PMA record and the performance data from the PMM records that have the same trigger count to determine the time stamp associated with the performance data. In some embodiments, performance analysis system 3540 may access the performance record buffer as virtual memory. As a result of placing performance record buffers in distinct virtual address spaces, performance monitoring data for different SMC engines 700 may be isolated from one another, as now described.

PMA 3536 provides isolation of performance monitoring data between the several SMC engines 700. In particular, PMA 3536 sorts the PMM records and PMA records into categories based on the operating mode. When PPU 200 operates in legacy mode, PPU 200 executes tasks as a single cluster of hardware resources, and not as separate PPU partitions 600 with separate SMC engines 700. In legacy mode, PMA 3536 stores PMM records and PMA records in a single category as a single set of performance monitoring data. When PPU 200 operates in SMC mode, PPU 200 executes tasks as separate PPU partitions 600 with separate SMC engines 700. In SMC mode, PMA 3536 sorts and stores PMM records and PMA records in different categories using the SMC engine ID field of the PMM records and PMA records. Records with each SMC engine ID are stored in a separate data store in the form of a record buffer accessible from a distinct virtual address space that matches the corresponding SMC engine 700. As described above, PMM records and PMA records that are not traceable to a particular SMC engine 700 contain an invalid SMC engine ID. PMA stores these records in a separate data store in the form of a non-SMC record buffer in a virtual address space that is accessible to any authorized entity that has sufficient privilege to access the data of all SMC engines 700. Such authorized entities include, without limitation, a hypervisor 124 in a virtualized environment and a root user or operating system kernel in a non-virtualized environment. Each SMC engine 700 may access some or all of the performance monitoring data in the non-SMC PMA record buffer by requesting the data from the authorized entity.

In some embodiments, PMA 3536 is configured such that triggers corresponding to each SMC engine 700 are generated to coincide with context switch events for the same SMC engine 700. In such embodiments, PMs are configured such that counters in shadow counter array 3314 are reset to zero after each trigger such that the data transmitted from the PMs to PMA 3536 for each SMC engine ID is attributable to an individual context or VM while time-slicing is enabled.

Figure 37:
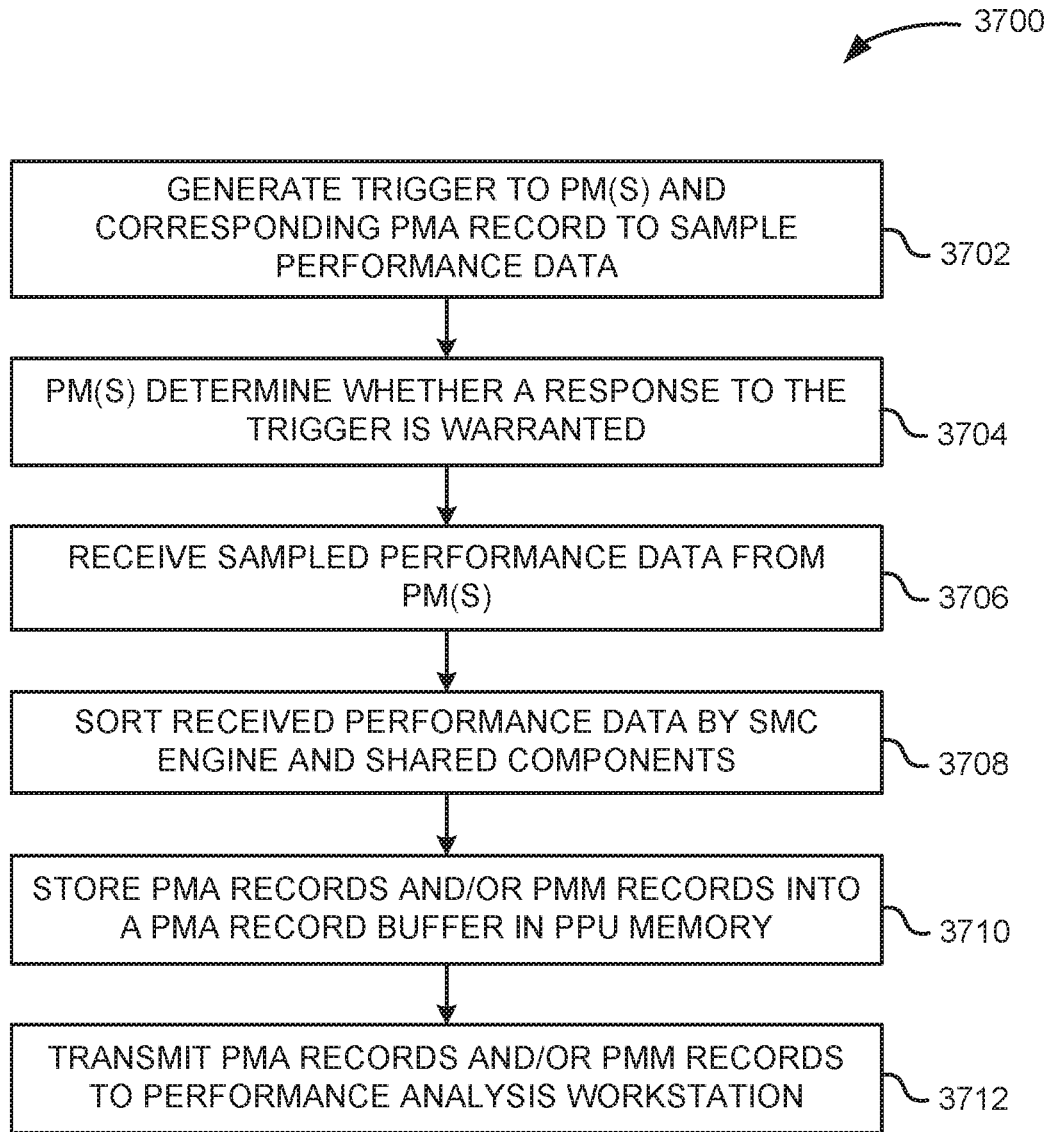
FIG. 37 is a flow diagram of method steps for monitoring performance of the PPU of FIG. 2, according to various embodiments.

FIG. 37 is a flow diagram of method steps for monitoring performance of the PPU 200 of FIG. 2, according to various embodiments. Although the method steps are described in conjunction with the systems of FIGS. 1-23, persons of ordinary skill in the art will understand that any system configured to perform the method steps, in any order, is within the scope of the present disclosure.

As shown, a method 3700 begins at step 3702, where PMA 3536 generates and transmits a trigger to the PMs 3310. Further, PMA 3536 generates a corresponding PMA record that includes a timestamp and, optionally, an SMC engine ID corresponding to the source of the trigger. PMs 3310 receive a trigger to sample performance data.

At step 3704, in response to receiving the trigger, PMs 3310 determine whether a response to the trigger is warranted. Each PM 3310 checks the trigger type and trigger payload from the trigger packet to determine if the PM 3310 should respond to the trigger. Every PM 3310 responds to legacy trigger packets unconditionally. In the case of per-SMC trigger packets, the PM 3310 responds only if the SMC engine ID included in the trigger payload matches the SMC engine ID that has been assigned to the PM 3310 via programming of a register in privileged register address space 3120. Programming an invalid SMC engine ID in this register ensures that the PM 3310 does not respond to per-SMC trigger packets. In the case of shared trigger packets, the PM 3310 responds only if the PM 3310 has been programmed to do so via a register in privileged register address space 3120. In one mode of operation, all of the PMs 3310 that are monitoring units uniquely assigned to an SMC engine 700 are programmed to respond to per-SMC trigger packets with the corresponding SMC engine ID payload. All other PMs 3310 are programmed to respond to shared trigger packets but not to per-SMC trigger packets.

If a response is warranted, performance counter array 3312 samples and stores the current values in shadow counter array 3314. In non-streaming mode, other components may read the values in the performance counter arrays via privileged register interface hub 512.

In streaming mode, the method proceeds to step 3706, where PMs 3310 transmit sampled performance data, and PMA 3536 receives the sampled performance data from the PMs 3310. PMs 3310 generate PMM records that include the values in performance counter array 3312 at the time PMA trigger 3352 was received from PMA 3536. These PMM records are then transmitted to a PMM router associated with the particular performance monitor 3310. The PMM router, in turn, transmits the PMM records to PMA 3536.

At step 3708, PMA 3536 sorts the PMM records and PMA records into categories based on the operating mode. When PPU 200 operates in legacy mode, PMA 3536 sorts PMM records and PMA records in a single category as a single set of performance monitoring data. When PPU 200 operates in SMC mode, PMA 3536 sorts PMM records and PMA records in different categories using the SMC engine ID field of the PMM records and PMA records. As described above, PMM records and PMA records that are not traceable to a particular SMC engine 700 contain an invalid SMC engine ID. PMA 3536 sorts these PMM records and PMA records into a separate category.

At step 3710, PMA 3536 stores the PMM records and/or PMA records into a PMA record buffer in PPU memory. When PPU 200 operates in legacy mode, PMA 3536 stores PMM records and PMA records in a single category as a single set of performance monitoring data. When PPU 200 operates in SMC mode, PMA 3536 stores PMM records and PMA records associated with each SMC engine ID in a separate data store accessible from a distinct virtual address space that matches the corresponding SMC engine 700. PMA 3536 stores PMM records and PMA records that are not traceable to a particular SMC engine 700 in a separate data store in the form of a non-SMC PMA record buffer in a virtual address space that is accessible only to any authorized entity that has sufficient privilege to access the data of all SMC engines 700. Such authorized entities include, without limitation, a hypervisor 124 in a virtualized environment and a root user or operating system kernel in a non-virtualized environment. Each SMC engine 700 may access some or all of the performance monitoring data in the non-SMC PMA record buffer by requesting the data from the authorized entity.

More specifically, PMA 3536 streams the PMM records and PMA records to high-speed hub 3538. High-speed hub 3538 transmits the PMM records and PMA records to partition units 262(0)-262(N). The partition units then store the PMM records and PMA records in the PMA record buffer in PPU memory. The PMA record buffer for each record is chosen based on the SMC engine ID field of the record such that each record ultimately resides in PPU memory that is accessible in a virtual address space that matches the SMC engine to which the PMA record buffer corresponds. PMM records and PMA records that are not traceable to a particular SMC engine 700 in a separate data store that is accessible only to an authorized entity.

At step 3712, PMA 3536 transmits the PMA records and/or PMM records to performance analysis system 3540 via high-speed hub 3538 and transfer logic 3539. Additionally or alternatively, performance analysis system 3540 accesses the PMA records and/or PMM records via one or more virtual addresses in a virtual address space. In general, performance analysis system 3540 includes a software application executing on CPU 110 and/or any other technically feasible processor. Performance analysis system 3540 directly accesses virtual memory to access the PMA records and/or PMM records. The virtual memory may be associated with PPU 200 and or CPU 110. A user may view the PMA records and/or PMM records on performance analysis system 3540 in order to characterize the behavior of PPU 200 as reflected in the PMA records and/or PMM records. The method 3700 then terminates.

Power and Clock Frequency Management with SMC Engines

Complex systems, such as PPU 200 of FIG. 2 may consume significant amounts of power. More specifically, certain components within PPU 200 may have different levels of power consumption from one another at different points in time. In one example, a component in one PPU partition 600 may execute compute and/or graphics intensive tasks, thereby increasing power consumption relative to other PPU partitions 600. In another example, a PPU partition 600 may consume power even when idle, due to leakage current and related factors. Further, increased power consumption may lead to higher operating temperature which, in turn, may lead to reduced performance. As a result, PPU 200 includes power and clock frequency management that considers how power consumption within one PPU partition 600 may negatively impact performance of other PPU partitions 600.

Figure 38:
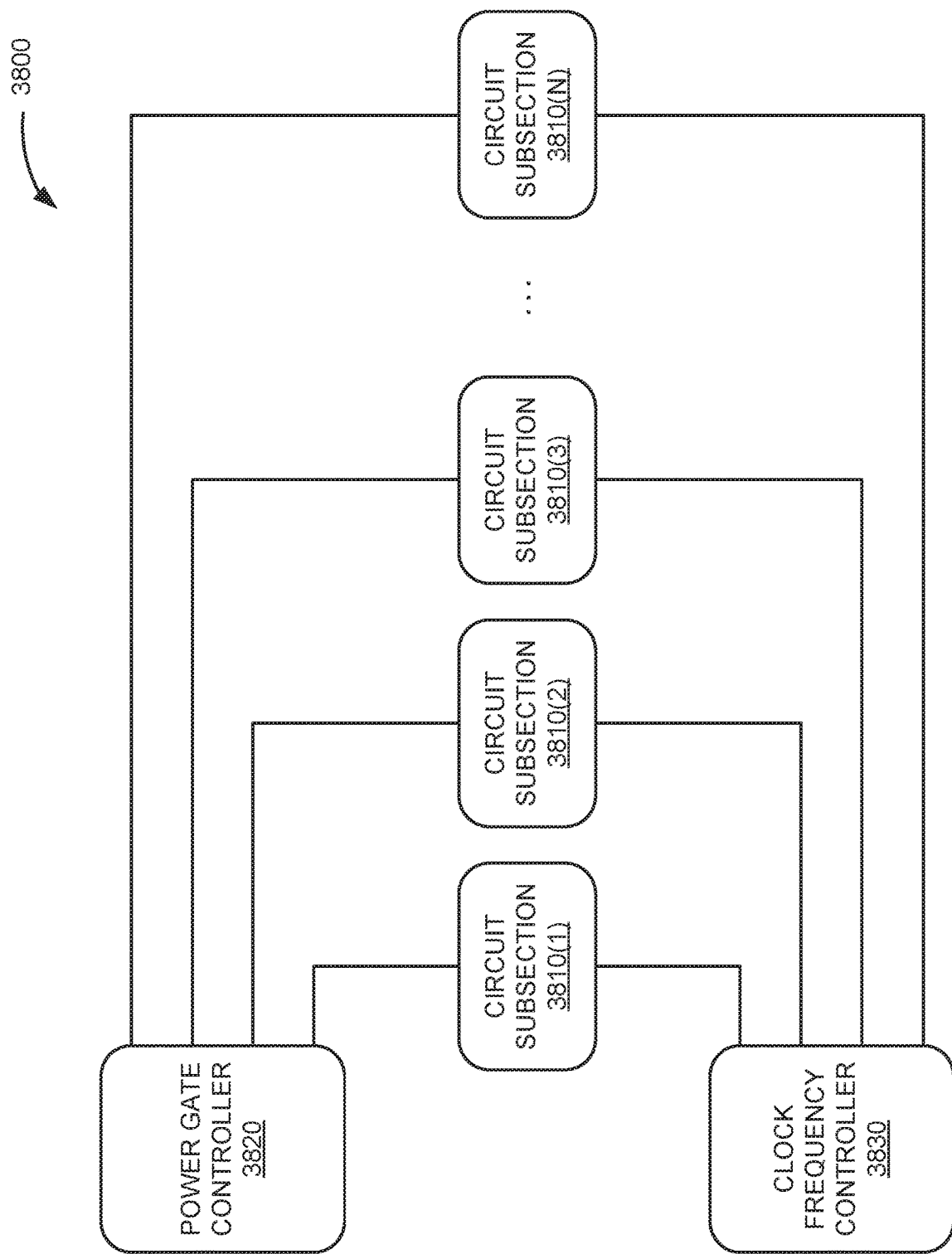
FIG. 38 is a block diagram of a power and clock frequency management system for the PPU of FIG. 2, according to various embodiments.

FIG. 38 is a block diagram of a power and clock frequency management system 3800 for the PPU 200 of FIG. 2, according to various embodiments. The power and clock frequency management system 3800 includes, without limitation, circuit subsections 3810(0)-3810(N), a power gate controller 3820, and a clock frequency controller 3830.

Each of the circuit subsections 3810(0)-3810(N) includes any set of components included in PPU 200 at any level of granularity. In that regard, each of the circuit subsections 3810(0)-3810(N) may include, without limitation, a sys pipe 230, a PPU partition 600, a PPU slice 610, a SMC engine 700, or any technically feasible subset thereof.

In operation, the power gate controller 3820 monitors the activity status of the circuit subsections 3810(0)-3810(N). If the power gate controller 3820 determines that a particular circuit subsection, such as circuit subsection 3810(2), is at idle status, then the power gate controller 3820 reduces the supply voltage to the circuit subsection 3810(2) to a voltage that less than an operation voltage but maintains the data stored in memory. Alternatively, the power gate controller 3820 may remove the power from circuit subsection 3810 (2), thereby shutting down circuit subsection 3810(2). Subsequently, if circuit subsection 3810(2) is needed to perform certain tasks, the power gate controller 3820 increases the supply voltage of circuit subsection 3180(2) to a voltage suitable for operation.

The clock frequency controller 3830 monitors the power consumption of the circuit subsections 3810(0)-3810(N). If the clock frequency controller 3830 determines that a particular circuit subsection, such as circuit subsection 3810(3), is consuming more power relative to other circuit subsections 3810, then the clock frequency controller 3830 reduces the frequency of clock signals associated with circuit subsection 3810(3). As a result, the power consumed by circuit subsection 3810(3) is reduced. Subsequently, if the clock frequency controller 3830 determines that circuit subsection 3810(3) is consuming less power relative to other circuit subsections 3810, then the clock frequency controller 3830 increases the frequency of clock signals associated with circuit subsection 3810(3), thereby increasing the performance of circuit subsection 3810(3).

In this manner, the power gate controller 3820 and clock frequency controller 3830 reduce overall power consumption of PPU 200 and reduce negative impacts of one PPU partition 600 on another PPU partition 600 due to temperature effects.

Figure 39:
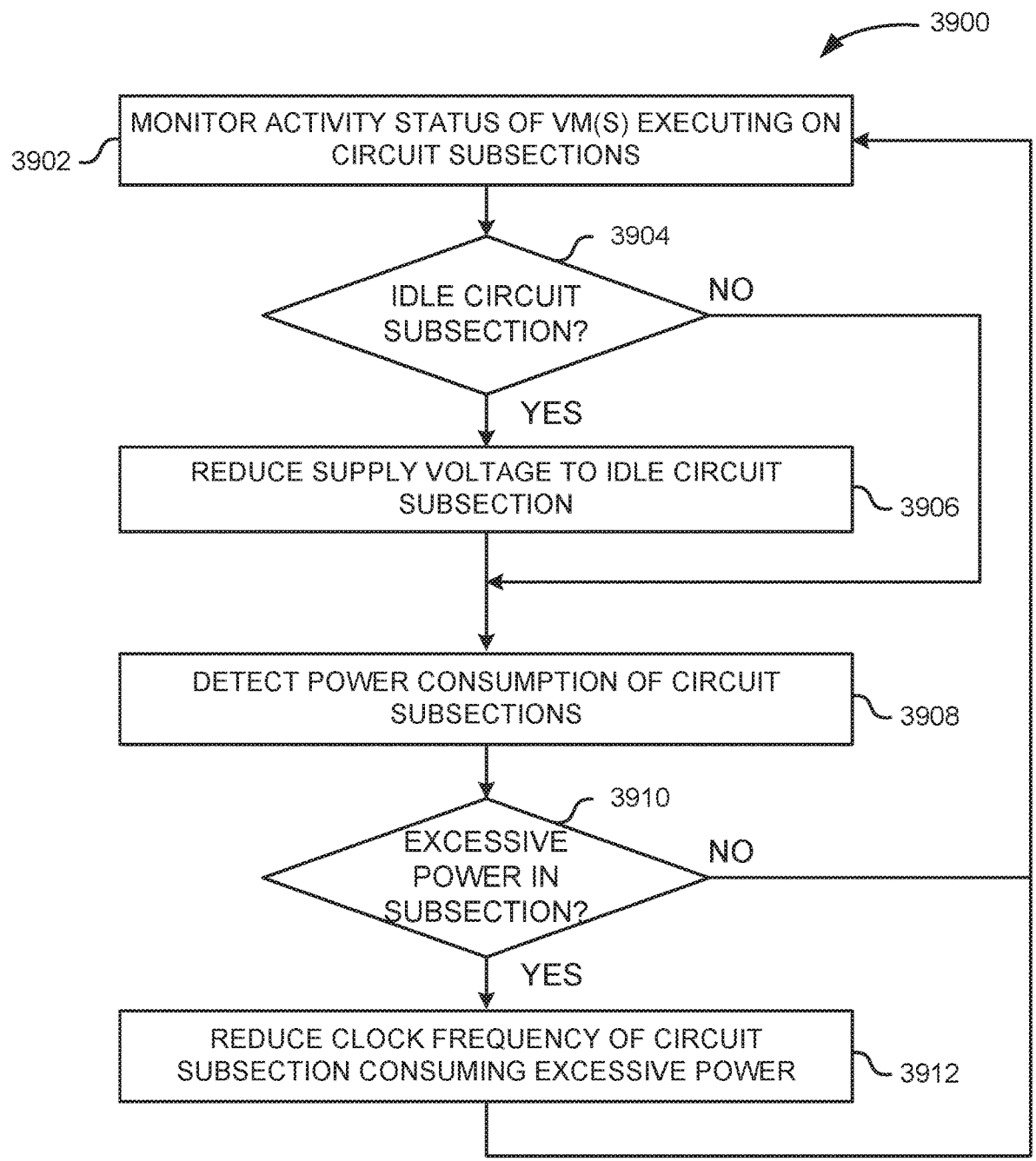
FIG. 39 is a flow diagram of method steps for managing power consumption of the PPU 200 of FIG. 2, according to various embodiments.

FIG. 39 is a flow diagram of method steps for managing power consumption of the PPU 200 of FIG. 2, according to various embodiments. Although the method steps are described in conjunction with the systems of FIGS. 1-25, persons of ordinary skill in the art will understand that any system configured to perform the method steps, in any order, is within the scope of the present disclosure.

As shown, a method 3900 begins at step 3902, where power and clock frequency management system 3800 of PPU 200 monitors activity status of VMs executing on various circuit subsections 3810 of PPU 200. At step 3904, power and clock frequency management system 3800 determines whether any circuit subsection 3810 is idle. If no circuit subsections 3810 are idle, then the method proceeds to step 3908. If, however, one or more circuit subsections 3810 are idle, then the method proceeds to step 3906, where power and clock frequency management system 3800 reduces the supply voltage to the idle circuit subsections 3810. In particular, power gate controller 3820 within power and clock frequency management system 3800 reduces the supply voltage to the circuit subsection 3810(2) to a voltage that less than an operation voltage but maintains the data stored in memory. Alternatively, the power gate controller 3820 may remove the power from circuit subsection 3810 (2), thereby shutting down circuit subsection 3810(2).

At step 3908, power and clock frequency management system 3800 monitors power consumption for each SMC engine 700 within PPU. At step 3910, power and clock frequency management system 3800 determines whether one or more SMC engines 700 are consuming excessive power relative to other SMC engines 700. If no SMC engines 700 are consuming excessive power, then the method proceeds to step 3902 to continue monitoring. If, however, one or more SMC engines 700 are consuming excessive power, then the method proceeds to step 3912, where clock frequency controller 3830 within power and clock frequency management system 3800 reduces the clock frequency to one or more circuit subsections 3810 associated with SMC engines 700 that are consuming excessive power. The method then proceeds to step 3902 to continue monitoring.

In sum, various embodiments include a parallel processing unit (PPU) that can be divided into partitions. Each partition is configured to execute processing tasks associated with multiple processing contexts simultaneously. A given partition includes one or more logical groupings or "slices" of GPU resources. Each slice provides sufficient compute, graphics and memory resources to mimic the operation of the PPU as a whole. A hypervisor executing on a CPU performs various techniques for partitioning the PPU on behalf of an admin user. A guest user is assigned to a partition and can then perform processing tasks within that partition in isolation from any other guest users assigned to any other partitions.

One technological advantage of the disclosed techniques relative to the prior art is that the, with the disclosed techniques, a PPU can support multiple processing contexts simultaneously and in functional isolation from one another. Accordingly, multiple CPU processes can utilize PPU resources efficiently via multiple different processing contexts and without interfering with one another. Another technological advantage of the disclosed techniques is that, because the PPU can be partitioned into isolated computing environments using the disclosed techniques, the PPU can support a more robust form of multitenancy relative to prior art approaches that rely on processing subcontexts to provide multitenancy functionality. Accordingly, a PPU, when implementing the disclosed techniques, becomes more suitable for cloud-based deployments where different and potentially competing entities can be provided access to different partitions within the same PPU. These technological advantages represent one or more technological advancements over prior art approaches.

1. Some embodiments include a computer-implemented method, comprising partitioning a set of memory resources included in a processor to generate a plurality of logical memory partitions, wherein each logical memory partition included in the plurality of logical memory partitions corresponds to at least one engine included in a plurality of engines, receiving a plurality of memory access requests from the plurality of engines, and transmitting each memory access request included in the plurality of memory access requests to a different respective logical memory partition included in the plurality of logical memory partitions, wherein each memory access request is serviced by the respective logical memory partition independently of all other memory access requests included in the plurality of memory access requests.

2. The computer-implemented method of clause 1, wherein partitioning the set of memory resources comprises activating a set of logical boundaries associated with the set of memory resources based on a set of bits, wherein each bit included in the set of bits corresponds to a different logical boundary included in the set of logical boundaries.

3. The computer-implemented method of any of clauses 1-2, wherein a first memory access request included in the plurality of memory access requests is transmitted to a first logical memory partition included in the plurality of logical memory partitions based on a set of bits, wherein the set of memory resources is partitioned based, at least in part, on the set of bits.

4. The computer-implemented method of any of clauses 1-3, further comprising translating a first address associated with a first memory access request included in the plurality of memory access requests based on a set of bits to generate a second address, wherein the second address is associated with a memory location residing within a first logical memory partition included in the plurality of logical memory partitions, and the set of memory resources is partitioned based, at least in part, on the set of bits.

5. The computer-implemented method of any of clauses 1-4, further comprising designating a first portion of the set of memory resources for access by an authorized entity, wherein the first portion of the set of memory resources is not included in the plurality of logical memory partitions, and the authorized entity partitions the set of memory resources to generate the plurality of logical memory partitions.

6. The computer-implemented method of any of clauses 1-5, further comprising determining a first fault associated with a first memory access request that is associated with a memory location residing within a first logical memory partition included in the plurality of logical memory partitions, translating a virtual fault identifier corresponding to the first fault to a global fault identifier corresponding to the first fault, and resetting a first engine based on the global fault identifier, wherein the first engine is included in the plurality of engines and is configured to access the first logical memory partition.

7. The computer-implemented method of any of clauses 1-6, further comprising translating a virtual fault identifier included in a local address space associated with a first logical memory partition included in the plurality of logical memory partitions to generate a global fault identifier included in a global address space associated with the set of memory resources, wherein the virtual fault identifier is generated by the first logical memory partition when servicing a first memory access request included in the plurality of memory access requests.

8. The computer-implemented method of any of clauses 1-7, further comprising configuring a first logical memory partition included in the plurality of logical memory partitions to include a first region of memory that stores data associated with a first engine included in the plurality of engines, and configuring the first logical memory partition to include a second region of memory that stores data associated with a second engine included in the plurality of engines.

9. The computer-implemented method of any of clauses 1-8, wherein the first engine executes a first set of processing tasks associated with a first processing context using the first region of memory, and the second engine executes a second set of processing tasks associated with a second processing context using the second region of memory.

10. The computer-implemented method of any of clauses 1-9, further comprising configuring a first logical memory partition included in the plurality of logical memory partitions to include a first region of memory that stores data associated with a first processing subcontext that is derived from a first processing context, and configuring the first logical memory partition to include a second region of memory that stores data associated with a second processing subcontext that also is derived from the first processing context.

11. Some embodiments include a non-transitory computer-readable medium storing program instructions that, when executed by a processor, cause the processor to perform the steps of partitioning a set of memory resources included in a processor to generate a plurality of logical memory partitions, wherein each logical memory partition included in the plurality of logical memory partitions corresponds to at least one engine included in a plurality of engines, and transmitting each memory access request included in a plurality of memory access requests received from the plurality of engines to a different respective logical memory partition included in the plurality of logical memory partitions, wherein each memory access request is serviced by the respective logical memory partition independently of all other memory access requests included in the plurality of memory access requests.

12. The non-transitory computer-readable medium of clause 11, wherein the step of partitioning the set of memory resources comprises activating a set of logical boundaries associated with the set of memory resources based on a set of bits, wherein each bit included in the set of bits corresponds to a different logical boundary included in the set of logical boundaries.

13. The non-transitory computer-readable medium of any of clauses 11-12, wherein a first memory access request included in the plurality of memory access requests is transmitted to a first logical memory partition included in the plurality of logical memory partitions based on a set of bits, wherein the set of memory resources is partitioned based, at least in part, on the set of bits.

14. The non-transitory computer-readable medium of any of clauses 11-13, further comprising the step of designating a first portion of the set of memory resources for access by an authorized entity, wherein the first portion of the set of memory resources is not included in the plurality of logical memory partitions, and the authorized entity partitions the set of memory resources to generate the plurality of logical memory partitions.

15. The non-transitory computer-readable medium of any of clauses 11-14, further comprising the steps of configuring a first logical memory partition included in the plurality of logical memory partitions to include a first region of memory that stores data associated with a first engine included in the plurality of engines, and configuring the first logical memory partition to include a second region of memory that stores data associated with a second engine included in the plurality of engines, wherein the first engine executes a first set of processing tasks associated with a first processing context using the first region of memory, and the second engine executes a second set of processing tasks associated with a second processing context using the second region of memory.

16. The non-transitory computer-readable medium of any of clauses 11-15, further comprising the steps of configuring a first logical memory partition included in the plurality of logical memory partitions to include a first region of memory that stores data associated with a first processing subcontext that is derived from a first processing context, and configuring the first logical memory partition to include a second region of memory that stores data associated with a second processing subcontext that also is derived from the first processing context.

17. The non-transitory computer-readable medium of any of clauses 11-16, wherein the first engine is configured according to the first processing context to execute a first set of processing tasks associated with the first subcontext using the first region of memory and to execute a second set of processing tasks associated with the second subcontext using the second region of memory.

18. The non-transitory computer-readable medium of any of clauses 11-17, further comprising the steps of receiving partitioning input associated with a host computing environment, and receiving configuration input associated with a guest computing environment, wherein the set of memory resources is partitioned based on the partitioning input, and wherein a first logical memory partition included in the plurality of logical memory is partitioned based on the configuration input.

19. The non-transitory computer-readable medium of any of clauses 11-18, further comprising the steps of receiving a first input associated with a first computing environment, wherein a first set of operations is executed on the processor within the first computing environment based on a first set of permissions, and receiving a second input associated with a second computing environment, wherein a second set of operations is executed on the processor within the second computing environment based on a second set of permissions, and the first set of permissions includes a greater number of permissions than the second set of permissions, wherein the set of memory resources is partitioned based on the partitioning input, and wherein a first logical memory partition included in the plurality of logical memory partitions is configured based on the second input.

20. Some embodiments include a system, comprising a memory storing a software application, and a processor that, when executing the software application, is configured to perform the steps of partitioning a set of memory resources included in a processor to generate a plurality of logical memory partitions, wherein each logical memory partition included in the plurality of logical memory partitions corresponds to at least one engine included in a plurality of engines, receiving a plurality of memory access requests from the plurality of engines, and transmitting each memory access request included in the plurality of memory access requests to a different respective logical memory partition included in the plurality of logical memory partitions, wherein each memory access request is serviced by the respective logical memory partition independently of all other memory access requests included in the plurality of memory access requests.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   partitioning a first portion of a set of memory resources included in a processor to generate a plurality of logical memory partitions, wherein each logical memory partition is associated with at least one engine included in a plurality of engines and corresponds to a different address range within a first set of memory addresses, and wherein each address range is for accessing a different subset of cache slices included in a plurality of cache slices;
   partitioning a second portion of the set of memory resources to generate a memory section that includes a portion of each cache slice in the plurality of cache slices, wherein the second portion is accessed via a second set of memory addresses for accessing any of the plurality of cache slices, and wherein the second portion is inaccessible via the first set of memory addresses;
   receiving a plurality of memory access requests from the plurality of engines; and
   transmitting each memory access request included in the plurality of memory access requests to the memory section or to one of the logical memory partitions, wherein each memory access request is serviced by the memory section or the respective logical memory partition.

2. The computer-implemented method of claim 1, wherein partitioning the first portion of the set of memory resources comprises activating a set of logical boundaries associated with the set of memory resources based on a set of bits, wherein each bit included in the set of bits corresponds to a different logical boundary included in the set of logical boundaries.

3. The computer-implemented method of claim 1, wherein a first memory access request included in the plurality of memory access requests is transmitted to first logical memory partition included in the plurality of logical memory partitions based on a set of bits, wherein the first portion of the set of memory resources is partitioned based, at least in part, on the set of bits.

4. The computer-implemented method of claim 1, further comprising translating a first address associated with a first memory access request included in the plurality of memory access requests based on a set of bits to generate a second address, wherein the second address is associated with a memory location residing within a first logical memory partition included in the plurality of logical memory partitions, and the set of memory resources is partitioned based, at least in part, on the set of bits.

5. The computer-implemented method of claim 1, further comprising designating the second portion of the set of memory resources for access by an authorized entity, wherein the second portion of the set of memory resources is not included in the plurality of logical memory partitions, and the authorized entity partitions the first portion of the set of memory resources to generate the plurality of logical memory partitions.

6. The computer-implemented method of claim 1, further comprising:
   determining a first fault associated with a first memory access request that is associated with a memory location residing within a first logical memory partition included in the plurality of logical memory partitions;
   translating a virtual fault identifier corresponding to the first fault to a global fault identifier corresponding to the first fault; and
   resetting a first engine based on the global fault identifier, wherein the first engine is included in the plurality of engines and is configured to access the first logical memory partition.

7. The computer-implemented method of claim 1, further comprising translating a virtual fault identifier included in a local address space associated with a first logical memory partition included in the plurality of logical memory partitions to generate a global fault identifier included in a global address space associated with the set of memory resources, wherein the virtual fault identifier is generated by the first logical memory partition when servicing a first memory access request included in the plurality of memory access requests.

8. The computer-implemented method of claim 1, further comprising:
   configuring a first logical memory partition included in the plurality of logical memory partitions to include a first region of memory that stores data associated with a first engine included in the plurality of engines; and
   configuring the first logical memory partition to include a second region of memory that stores data associated with a second engine included in the plurality of engines.

9. The computer-implemented method of claim 8, wherein the first engine executes a first set of processing tasks associated with a first processing context using the first region of memory, and the second engine executes a second set of processing tasks associated with a second processing context using the second region of memory.

10. The computer-implemented method of claim 1, further comprising:
    configuring a first logical memory partition included in the plurality of logical memory partitions to include a first region of memory that stores data associated with a first processing subcontext that is derived from a first processing context; and
    configuring the first logical memory partition to include a second region of memory that stores data associated with a second processing subcontext that also is derived from the first processing context.

11. A non-transitory computer-readable medium storing program instructions that, when executed by a processor, cause the processor to perform steps of:
    partitioning a first portion of a set of memory resources included in a processor to generate a plurality of logical memory partitions, wherein each logical memory partition is associated with at least one engine included in a plurality of engines and corresponds to a different address range within a first set of memory addresses, and wherein each address range is for accessing a different subset of cache slices included in a plurality of cache slices;

partitioning a second portion of the set of memory resources to generate a memory section that includes a portion of each cache slice in the plurality of cache slices, wherein the second portion is accessed via a second set of memory addresses for accessing any of the plurality of cache slices, and wherein the second portion is inaccessible via the first set of memory addresses; and transmitting each memory access request included in a plurality of memory access requests received from the plurality of engines to the memory section or to one of the logical memory partitions, wherein each memory access request is serviced by the memory section or the respective logical memory partition.

12. The non-transitory computer-readable medium of claim 11, wherein the step of partitioning the first set of the set of memory resources comprises activating a set of logical boundaries associated with the set of memory resources based on a set of bits, wherein each bit included in the set of bits corresponds to a different logical boundary included in the set of logical boundaries.

13. The non-transitory computer-readable medium of claim 11, wherein a first memory access request included in the plurality of memory access requests is transmitted to a first logical memory partition included in the plurality of logical memory partitions based on a set of bits, wherein the first set of the set of memory resources is partitioned based, at least in part, on the set of bits.

14. The non-transitory computer-readable medium of claim 11, further comprising the step of designating the second portion of the set of memory resources for access by an authorized entity, wherein the second portion of the set of memory resources is not included in the plurality of logical memory partitions, and the authorized entity partitions the first portion of the set of memory resources to generate the plurality of logical memory partitions.

15. The non-transitory computer-readable medium of claim 11, further comprising the steps of:

configuring a first logical memory partition included in the plurality of logical memory partitions to include a first region of memory that stores data associated with a first engine included in the plurality of engines; and configuring the first logical memory partition to include a second region of memory that stores data associated with a second engine included in the plurality of engines, wherein the first engine executes a first set of processing tasks associated with a first processing context using the first region of memory, and the second engine executes a second set of processing tasks associated with a second processing context using the second region of memory.

16. The non-transitory computer-readable medium of claim 11, further comprising the steps of:

configuring a first logical memory partition included in the plurality of logical memory partitions to include a first region of memory that stores data associated with a first processing subcontext that is derived from a first processing context; and configuring the first logical memory partition to include a second region of memory that stores data associated with a second processing subcontext that also is derived from the first processing context.

17. The non-transitory computer-readable medium of claim 16, wherein the first engine is configured according to the first processing context to execute a first set of processing tasks associated with the first subcontext using the first region of memory and to execute a second set of processing tasks associated with the second subcontext using the second region of memory.

18. The non-transitory computer-readable medium of claim 11, further comprising the steps of:

receiving partitioning input associated with a host computing environment; and receiving configuration input associated with a guest computing environment, wherein the set of memory resources is partitioned based on the partitioning input, and wherein a first logical memory partition included in the plurality of logical memory partitions is partitioned based on the configuration input.

19. The non-transitory computer-readable medium of claim 11, further comprising the steps of:

receiving a first input associated with a first computing environment, wherein a first set of operations is executed on the processor within the first computing environment based on a first set of permissions; and receiving a second input associated with a second computing environment, wherein a second set of operations is executed on the processor within the second computing environment based on a second set of permissions, and the first set of permissions includes a greater number of permissions than the second set of permissions, wherein the set of memory resources is partitioned based on the partitioning input, and wherein a first logical memory partition included in the plurality of logical memory partitions is configured based on the second input.

20. A system, comprising:

a memory storing a software application; and one or more processors that, when executing the software application:

partitions a first portion of a set of memory resources included in a processor to generate a plurality of logical memory partitions, wherein each logical memory partition is associated with at least one engine included in a plurality of engines and corresponds to a different address range within a first set of memory addresses, and wherein each address range is for accessing a different subset of cache slices included in a plurality of cache slices;

partitions a second portion of the set of memory resources to generate a memory section that includes a portion of each cache slice in the plurality of cache slices, wherein the second portion is accessed via a second set of memory addresses for accessing any of the plurality of cache slices, and wherein the second portion is inaccessible via the first set of memory addresses, receives a plurality of memory access requests from the plurality of engines, and transmits each memory access request included in the plurality of memory access requests to the memory section or to one of the logical memory partitions, wherein each memory access request is serviced by the memory section or the respective logical memory partition.

\* \* \* \* \*